(12) United States Patent
Moriwaki et al.

(10) Patent No.: US 9,612,490 B2
(45) Date of Patent: Apr. 4, 2017

(54) LIQUID CRYSTAL DISPLAY

(71) Applicant: Sharp Kabushiki Kaisha, Osaka (JP)

(72) Inventors: Hiroyuki Moriwaki, Osaka (JP);
Toshio Ninomiya, Osaka (JP);
Kazutaka Hanaoka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/655,701

(22) PCT Filed: Dec. 20, 2013

(86) PCT No.: PCT/JP2013/084210
§ 371 (c)(1),
(2) Date: Jun. 25, 2015

(87) PCT Pub. No.: WO2014/103911
PCT Pub. Date: Jul. 3, 2014

(65) Prior Publication Data
US 2015/0346564 A1 Dec. 3, 2015

(30) Foreign Application Priority Data
Dec. 28, 2012 (JP) .................................. 2012-287657

(51) Int. Cl.
G02F 1/1343 (2006.01)
G02F 1/1362 (2006.01)
G02F 1/1333 (2006.01)

(52) U.S. Cl.
CPC .... *G02F 1/134363* (2013.01); *G02F 1/13439* (2013.01); *G02F 1/133345* (2013.01);
(Continued)

(58) Field of Classification Search
CPC .............................................. G02F 1/134363
(Continued)

(56) References Cited

U.S. PATENT DOCUMENTS 5,745,207 A 4/1998 Asada et al.
6,208,399 B1 3/2001 Ohta et al.
(Continued)

FOREIGN PATENT DOCUMENTS

JP H7-36058 A 2/1995
JP 11-295764 A 10/1999
(Continued)

*Primary Examiner* — Thanh-Nhan P Nguyen
(74) *Attorney, Agent, or Firm* — Chen Yoshimura LLP

(57) ABSTRACT

The present invention provides a liquid crystal display having the advantage of higher resolution and lower power consumption while having high transmittance. The present invention is a liquid crystal display provided with a first substrate, a second substrate and a horizontal orientation-type liquid crystal layer. The first substrate includes a plurality of source bus lines, a plurality of gate bus lines, a pixel electrode, a first common electrode, a first interlayer insulation film on the plurality of source bus lines, a first conductive layer on the first interlayer insulation film, a second interlayer insulation film on the first conductive layer and a second conductive layer on the second interlayer insulation film. The first common electrode includes a plurality of first linear portions having a linear shape. The pixel electrode includes one or more second linear portions. The plurality of first linear portions and one or more second linear portions are alternately disposed. All or every other two or more of the first linear portions are disposed on the source bus lines or the gate bus lines in parallel therewith, and are provided in one of the first and second conductive layers. The second linear portions are transparent, and are provided in the other of the first and second conductive layers.

17 Claims, 78 Drawing Sheets

(52) U.S. Cl.
CPC .. *G02F 1/134309* (2013.01); *G02F 1/136286* (2013.01); *G02F 2001/134381* (2013.01)

(58) Field of Classification Search
USPC .......................................................... 349/141
See application file for complete search history.

(56) References Cited

U.S. PATENT DOCUMENTS

| | | | |
|---|---|---|---|
| 6,341,003 B1 | 1/2002 | Ashizawa et al. | |
| 2001/0050745 A1 | 12/2001 | Liu et al. | |
| 2005/0078262 A1* | 4/2005 | Ono | G02F 1/134363 349/141 |
| 2006/0290868 A1* | 12/2006 | Cho | G02F 1/134363 349/141 |
| 2012/0249941 A1* | 10/2012 | Yamamoto | G02F 1/134309 349/123 |

FOREIGN PATENT DOCUMENTS

| | | |
|---|---|---|
| JP | 2001-330847 A | 11/2001 |
| JP | 2002-023185 A | 1/2002 |
| JP | 2002-328388 A | 11/2002 |
| JP | 2011-53720 A | 3/2011 |
| JP | 2012-212083 A | 11/2012 |
| WO | 98/47044 | 10/1998 |

* cited by examiner

Embodiment 1 (First Pixel Structure; Initial Orientation Angle=79°)

No BM

Transmittance: 21.58%

BM present

Transmittance: 14.97%

Orientation

| | |
|---|---|
| Tr(V) | 14.97% |
| Aperture Ratio | 50.65% |
| Mode Efficiency | 84.42% |
| Capacitance [fF] | |
| Tr (0) | 0.0075% |
| CR | 2006.6 |
| Applied Voltage | 5.4V |

Embodiment 1 (First Pixel Structure; Initial Orientation Angle=65°; 6.0V)

Embodiment 1 (First Pixel Structure; Initial Orientation Angle=3°)

| Tr(V) | 14.12% |
|---|---|
| Aperture Ratio | 50.65% |
| Mode Efficiency | 79.67% |
| Capacitance [fF] | |
| Tr (0) | 0.0075% |
| CR | 1895.2 |
| Applied Voltage | 5.1V |

Embodiment 1 (First Pixel Structure; Initial Orientation Angle=7°)

| Tr(V) | 14.17% |
|---|---|
| Aperture Ratio | 50.65% |
| Mode Efficiency | 79.96% |
| Capacitance [fF] | |
| Tr (0) | 0.0075% |
| CR | 1902.1 |
| Applied Voltage | 5.1V |

Embodiment 1 (First Pixel Structure; Initial Orientation Angle=11°)

Transmittance: 14.19%

| | |
|---|---|
| Tr(V) | 14.19% |
| Aperture Ratio | 50.65% |
| Mode Efficiency | 80.05% |
| Capacitance [fF] | |
| Tr (0) | 0.0075% |
| CR | 1904.2 |
| Applied Voltage | 5.1V |

Embodiment 1 (First Pixel Structure; Initial Orientation Angle=15°)

Transmittance: 14.12%

| | |
|---|---|
| Tr(V) | 14.17% |
| Aperture Ratio | 50.65% |
| Mode Efficiency | 79.64% |
| Capacitance [fF] | |
| Tr (0) | 0.0075% |
| CR | 1894.5 |
| Applied Voltage | 5.4V |

Embodiment 1 (First Pixel Structure; Initial Orientation Angle=20°)

Transmittance: 14.02%

| | |
|---|---|
| Tr(V) | 14.02% |
| Aperture Ratio | 50.65% |
| Mode Efficiency | 79.12% |
| Capacitance [fF] | |
| Tr (0) | 0.0075% |
| CR | 1882.2 |
| Applied Voltage | 5.4V |

Embodiment 1 (First Pixel Structure; Initial Orientation Angle=25°)

Transmittance: 13.70%

| | |
|---|---|
| Tr(V) | 13.85% |
| Aperture Ratio | 50.65% |
| Mode Efficiency | 78.11% |
| Capacitance [fF] | |
| Tr (0) | 0.0075% |
| CR | 1858.3 |
| Applied Voltage | 5.7V |

Embodiment 1 (Sixteenth Pixel Structure)

No BM — Transmittance: 18.92%

BM present — Transmittance: 13.51%

Orientation

| | |
|---|---|
| Tr(V) | 13.51% |
| Aperture Ratio | 50.65% |
| Mode Efficiency | 76.20% |
| Capacitance [fF] | |
| Tr (0) | 0.0073% |
| CR | 1837.9 |
| Applied Voltage | 5.0V |

LIQUID CRYSTAL DISPLAY

TECHNICAL FIELD

The present invention relates to a liquid crystal display. More specifically, the present invention relates to a liquid crystal display suitable for a horizontal orientation mode liquid crystal display.

BACKGROUND ART

In recent years, there has been vigorous development of flat panel displays, and among those, liquid crystal displays have garnered attention due to advantages such as being light weight, and having a thin profile and low power consumption. In particular, among active matrix type liquid crystal displays having switching elements in each pixel, modes relying on horizontal electric fields (including fringe fields) such as in-plane switching (IPS) mode and fringe field switching (FFS) mode have garnered attention. Moreover, especially recently, higher resolution displays have been sought mainly in portable electronic devices such as smartphones and tablet PCs in order to improve display quality, and further reduction in power consumption is demanded in order for the battery to last longer.

Liquid crystal displays of a horizontal electric field-driven mode such as IPS mode and FFS mode include pixel electrodes and a common electrode (opposite electrode) formed on an array substrate, and liquid crystal molecules are switched by an electric field substantially parallel to the main surface of the array substrate. In addition, a pair of polarizing plates are disposed on the array substrate and the opposite substrate, the pair of polarizing plates being disposed such that the respective polarizing axes thereof are perpendicular to each other. By such an arrangement of polarizing plates, a black screen is displayed when no voltage is being applied, and a white screen is displayed by gradually increasing the transmittance by applying a voltage corresponding to an image signal to the pixel electrodes, for example. In such a liquid crystal display, the liquid crystal molecules rotate on a plane substantially parallel to the respective main surfaces of the array substrate and the opposite substrate, and thus, the polarizing state of the transmitted light does not greatly change depending on the angle of incidence of the light. Thus, such liquid crystal displays have characteristics such as having a low dependence on the viewing angle, and having a wide viewing angle.

IPS mode liquid crystal displays have gate electrodes, drain electrodes, source electrodes, semiconductor films, gate insulating films, a common electrode, and a protective insulating film formed on a glass substrate, for example, and among horizontal electric field-driven liquid crystal displays in which images are displayed by driving liquid crystal molecules by an electric field substantially parallel to the glass substrate surface, a liquid crystal display is disclosed in which the common electrode, and the source electrode and drain electrode are separated by an insulating film, thereby placing them in different layers, and a portion of the common electrode and source electrode overlap across the insulating film to form additional capacitance (see Patent Document 1, for example).

Furthermore, among active matrix type liquid crystal displays, a technique is disclosed in which the opposite electrode and the pixel electrodes are formed in a linear fashion so as not to overlap in a plan view to be able to generate an electric field parallel to the substrate surfaces, an insulating film having a relative permittivity of 4 or less is formed on the source bus line, and the opposite electrode is formed on the insulating film so as to cover the source bus line (see Patent Document 2, for example).

Additionally disclosed is a liquid crystal display including an array substrate having pixel electrodes disposed for the respective pixels, an opposite substrate disposed opposite to the array substrate and including an opposite electrode common to the plurality of pixels, and a liquid crystal layer held between the array substrate and the opposite substrate, the pixel electrodes having strip-shaped linear portions, the opposite electrode including strip-shaped linear portions disposed alternately and in parallel with the linear portions of the pixel electrodes so as to be able to form a horizontal electric field with the linear portions of the pixel electrodes (see Patent Document 3, for example).

RELATED ART DOCUMENTS

Patent Documents

Patent Document 1: Japanese Patent Application Laid-Open Publication No. H7-36058
Patent Document 2: WO 98/47044
Patent Document 3: Japanese Patent Application Laid-Open Publication No. 2011-53720

SUMMARY OF THE INVENTION

Problems to be Solved by the Invention

However, in conventional IPS mode liquid crystal displays, the pixel electrodes and the common electrodes were formed by patterning the same conductive film by photolithography, and were disposed in the same layer. In such a case, for reasons related to the accuracy of photolithography, it was difficult to make the electrode pattern smaller, and thus, it was difficult to achieve a higher resolution. FIGS. 1 and 2 of Patent Document 2, for example, disclose a liquid crystal display in which the pixel electrodes and the opposite electrode are formed of the same transparent conductive film on the same organic film.

Furthermore, in conventional IPS mode liquid crystal displays, in order to form storage capacitance, storage capacitance lines and electrodes facing the storage capacitance lines across an insulating film were formed, but both were formed of non-transparent conductive films. Thus, the aperture ratio of the pixels was reduced, and it was difficult to improve transmittance. FIGS. 1 and 4 of Patent Document 2, for example, disclose a storage capacitor being formed by opposite voltage signal lines formed of a conductive film made of a material such as a chromium-molybdenum alloy film, and electrodes formed of a conductive film made of a material such as a chromium-molybdenum alloy film. In addition, FIGS. 1 and 2 of Patent Document 1 disclose a common electrode made of Cr, and source electrodes made of Mo and functioning as pixel electrodes. Additionally, FIG. 3 of Patent Document 3 discloses an auxiliary capacitance wiring line formed of a conductive material such as aluminum, molybdenum, tungsten, and titanium. However, all of those materials are non-transparent, and thus, the aperture ratio decreases. In particular, in the liquid crystal display disclosed in Patent Document 1, the common electrode and the source electrode are disposed towards the pixel center side of the drain electrode functioning as the source bus line, which greatly reduces the aperture ratio.

Additionally, in the liquid crystal display disclosed in Patent Document 3, the array substrate has pixel electrodes and the opposite substrate has a common electrode. Thus, in this liquid crystal display, compared to a typical IPS mode liquid crystal display, the distance between the pixel electrodes and the common electrode increases by an amount equal to the thickness of the liquid crystal layer, thus increasing the drive voltage. In other words, this liquid crystal display is unsuited to reducing power consumption.

The present invention was made in view of the situation above, and an object thereof is to provide a liquid crystal display having a higher resolution and lower power consumption while having a high transmittance.

Means for Solving the Problems

One aspect of the present invention may a liquid crystal display having a plurality of pixels arranged in a matrix, including:

a first substrate;

a second substrate facing the first substrate; and a horizontal orientation-type liquid crystal layer sandwiched between the first substrate and the second substrate, wherein the first substrate includes a plurality of source bus lines, a plurality of gate bus lines intersecting with the plurality of source bus lines, pixel electrodes, a first common electrode, a first interlayer insulating film provided on the plurality of source bus lines, and a second interlayer insulating film provided on the first interlayer insulating film, wherein the first common electrode includes a plurality of first linear portions having a linear shape, wherein the pixel electrodes each include one or more second linear portions having a linear shape, wherein the plurality of first linear portions of the first common electrode and the one or more second linear portions of the pixel electrodes are arranged alternately, wherein all or every other two or more of the plurality of first linear portions of the first common electrode are arranged on and along the plurality of source bus lines or the plurality of gate bus lines, wherein the plurality of first linear portions of the first common electrode are provided either between the first and second interlayer insulating films or on the second interlayer insulating film, and wherein the one or more second linear portions of the pixel electrodes are transparent and provided on the second interlayer insulating film or between the first and second interlayer insulating film in which the plurality of first linear portions of the first common electrodes are absent.

Below, such a liquid crystal display is also referred to as the liquid crystal display of the present invention.

Preferred embodiments of the liquid crystal display of the present invention will be described below. The preferred embodiments below may be combined as appropriate, and embodiments formed by combining two or more of the preferred embodiments below are also preferred embodiments.

The pixel electrodes may be provided between the first and second interlayer insulating films, and the first common electrode may be provided on the second interlayer insulating film.

The first common electrode may include a first connecting portion connected to the plurality of first linear portions, each of the pixel electrodes may include a second connecting portion connected to one edge portion of the one or more second linear portions, the first connecting portion may overlap a portion of the second connecting portion across the second interlayer insulating film, the array substrate may include one or more first regions and one or more second regions, the one or more first regions may each be a region between the second linear portions and the first linear portions adjacent to each other, and be each located to one side of the second linear portions, the one or more second regions may each be a region between the second linear portions and the first linear portions adjacent to each other, and be each located to another side of the second linear portions, the second connecting portions may have one or more first edge portions respectively facing the one or more first regions, and one or more second edge portions respectively facing the one or more second regions, and the first connecting portion may be arranged in a position recessed from the one or more first edge portions and the one or more second edge portions.

An angle $\theta 1$ between each of the one or more first edge portions and the second linear portion immediately adjacent thereto may be greater than 90°, and an angle $\theta 2$ between each of the one or more second edge portions and the second linear portion immediately adjacent thereto may be greater than 90°.

The array substrate may include thin film transistors having source electrodes and drain electrodes, the first interlayer insulating film may include a photosensitive resin film having openings formed therein, and the pixel electrodes may be respectively connected electrically to the drain electrodes through the openings.

A width of each of the one or more second linear portions may be 1 μm or greater.

A width of each of the one or more second linear portions may be 2 μm or less.

The pixel electrodes may be provided in the second conductive layer, and the first common electrode may be provided in the first conductive layer.

The first common electrode may include one or more capacitance electrode portions having a linear shape, and the one or more capacitance electrode portions may each be arranged to be parallel to and below the second linear portion corresponding thereto.

The one or more capacitance electrode portions may each be arranged so as not to protrude from under the corresponding second linear portion in a plan view.

All of the plurality of first linear portions may be arranged on the plurality of source bus lines or the plurality of gate bus lines, and the pixel electrodes may include only one of the second linear portions between two adjacent first linear portions.

The liquid crystal layer may contain liquid crystal molecules having negative dielectric anisotropy.

An angle formed between a long axis direction of the liquid crystal molecules in a plan view when no voltage is being applied and a lengthwise direction of each of the one or more second linear portions may be 60° to 80° inclusive.

The plurality of first linear portions may be transparent.

The second substrate may include a second common electrode, the second common electrode may include a plurality of third linear portions having a linear shape, and the plurality of third linear portions may face the plurality of first linear portions.

A main surface of the second substrate opposite to a surface facing the liquid crystal layer need not include a shield electrode.

The plurality of pixels may each be sub-pixels.

Effects of the Invention

According to the present invention, it is possible to realize a liquid crystal display having higher resolution and lower power consumption while having high transmittance.

DETAILED DESCRIPTION OF EMBODIMENTS

Embodiments are presented below and the present invention is described in further detail with reference to the drawings, but the present invention is not limited to these embodiments.

Below, a liquid crystal mode will be described in which an array substrate has pixel electrodes, the array substrate and the opposite substrate respectively include common electrodes, and the liquid crystal molecules are switched primarily using an electric field formed therebetween (an electric field substantially parallel to the respective main surfaces of the array substrate and the opposite substrate).

In this present specification, if a certain object (includes portions of that object; the same applies below in this paragraph) is transparent, this refers to a state in which an object beyond the transparent object can be seen, or in other words, that light radiated from beyond the transparent object can be seen. More quantitatively, it is preferable that the transmittance of the object to at least high visibility light at a wavelength λ of 550 nm be 70% to 100% inclusive.

(Embodiment 1)

Figure 1:
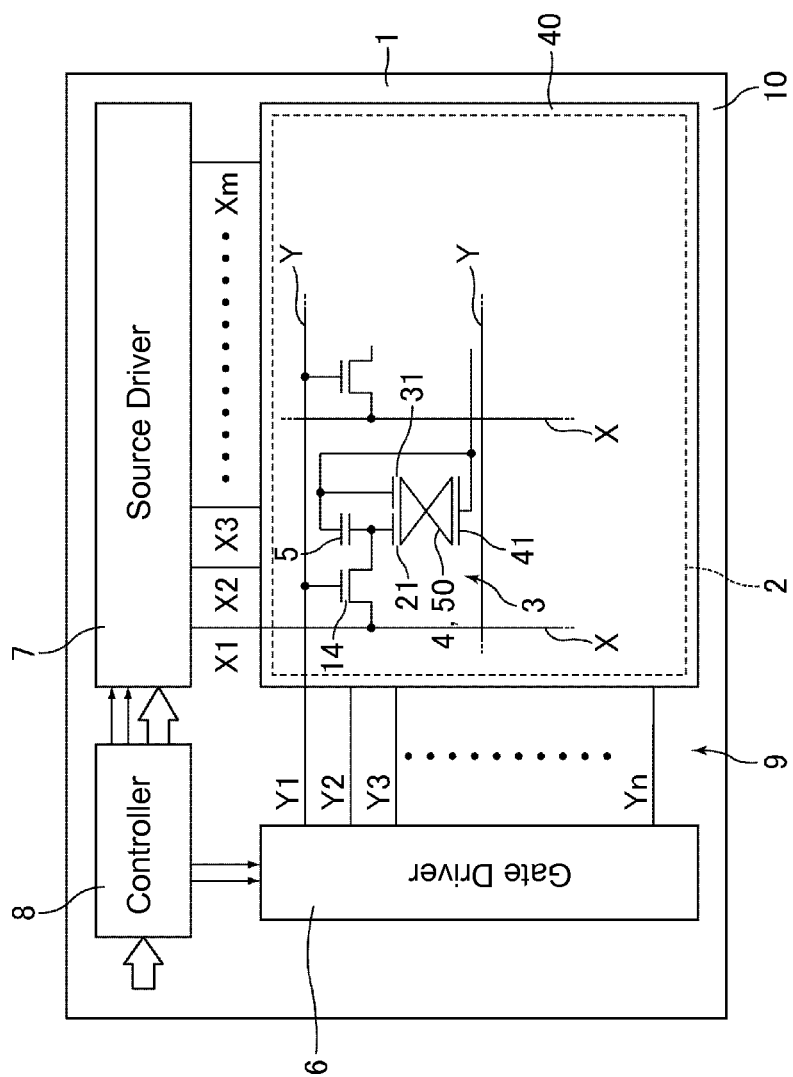
FIG. 1 is a schematic view showing a configuration of a liquid crystal display of Embodiment 1.
Figure 2:
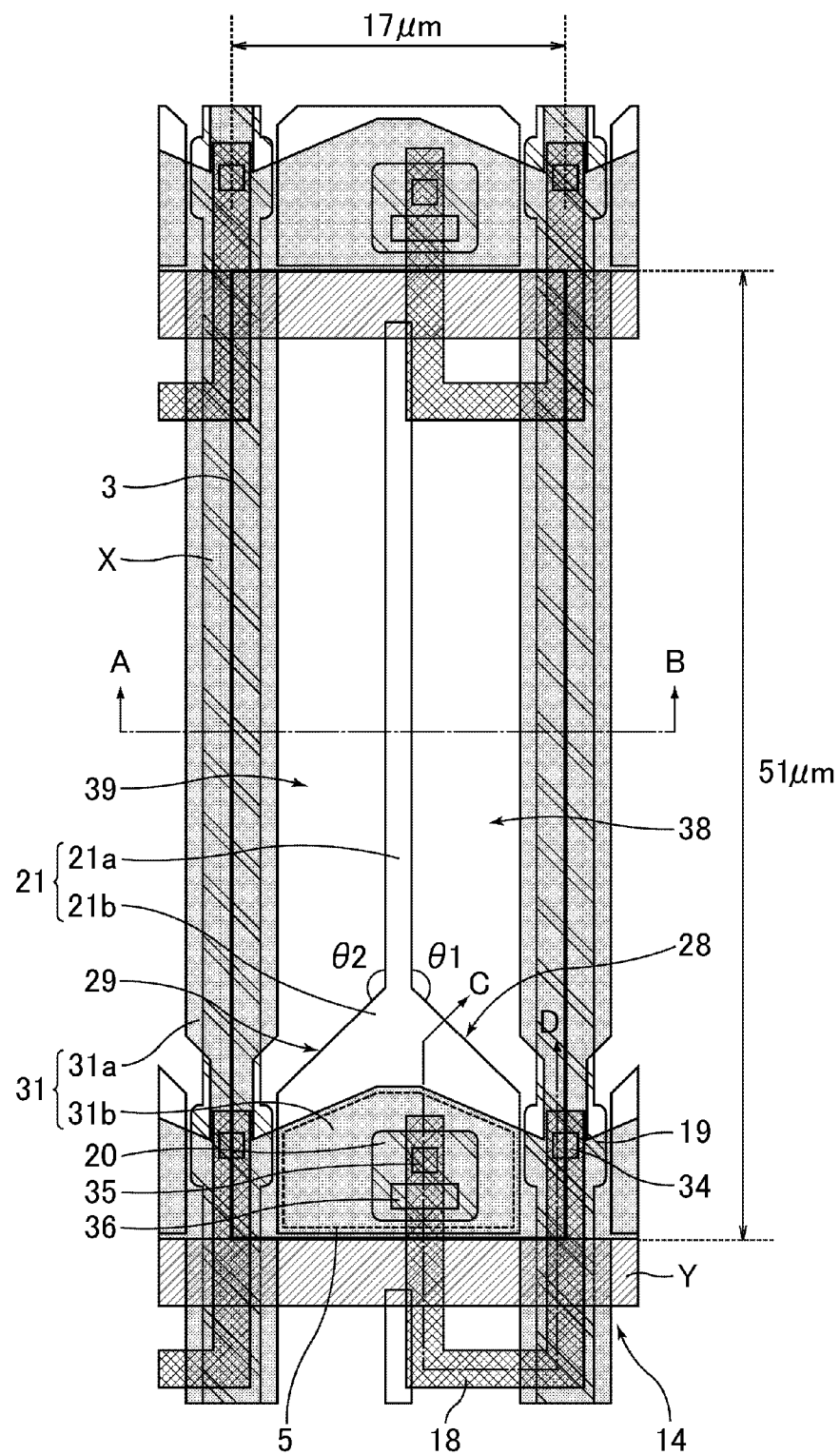
FIG. 2 is a schematic plan view showing the structure of a sub-pixel in a liquid crystal display of Embodiment 1, and shows the internal structure of an array substrate.
Figure 3:
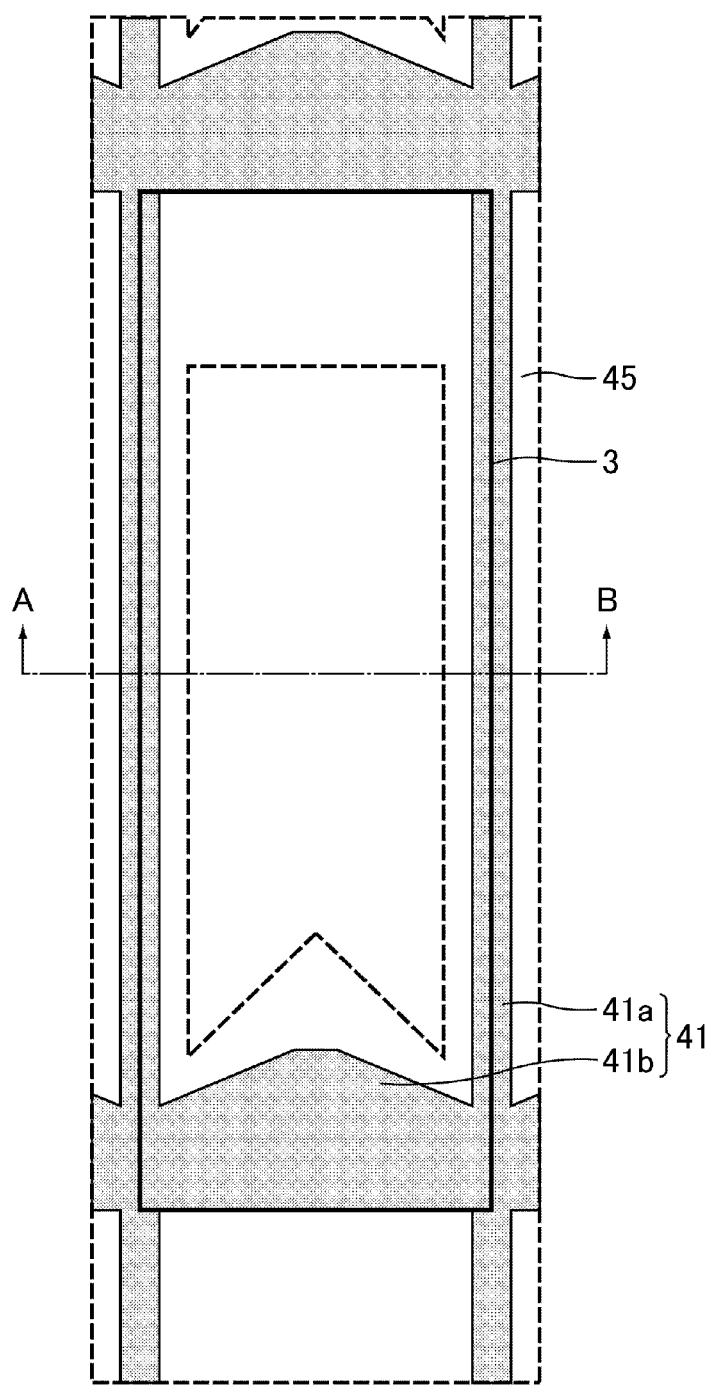
FIG. 3 is a schematic plan view showing the structure of a sub-pixel in a liquid crystal display of Embodiment 1, and shows the internal structure of an opposite substrate.
Figure 4:
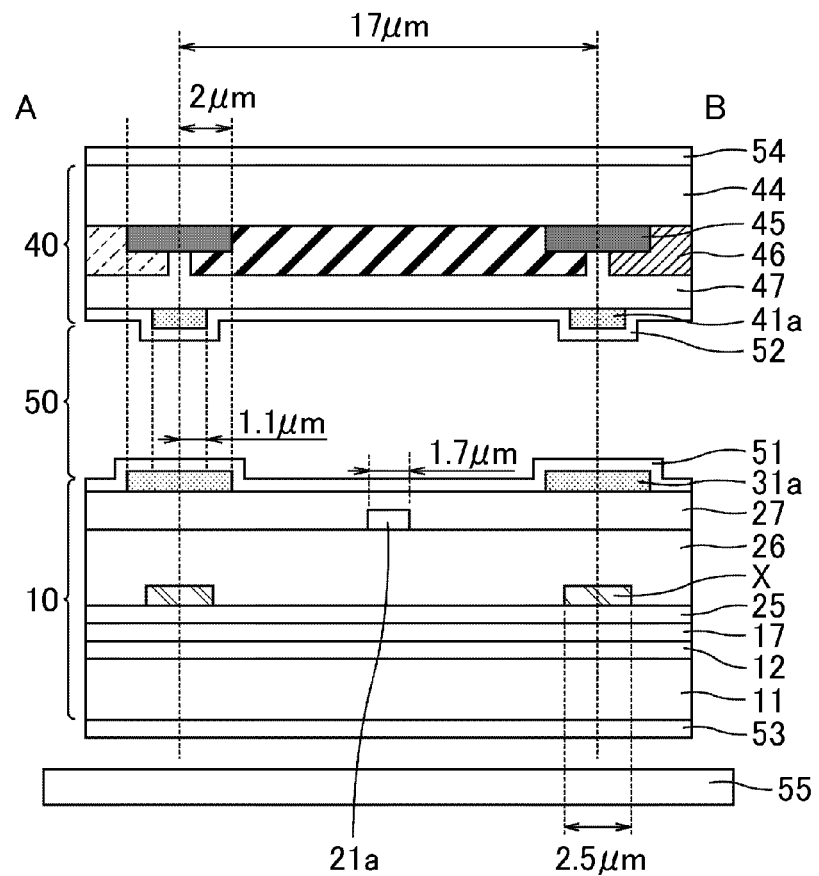
FIG. 4 is a schematic view showing the cross-sectional structure of the liquid crystal display of Embodiment 1, and shows the cross-sectional structure along the line A-B of FIGS. 2 and 3.
Figure 5:
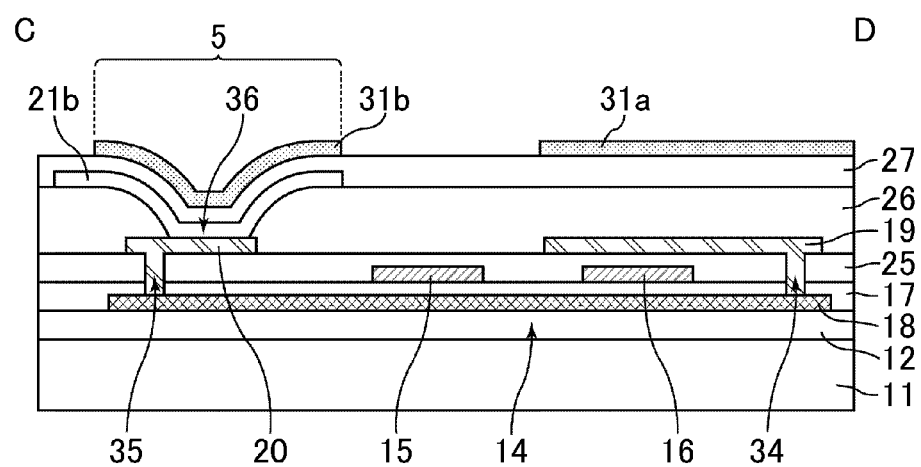
FIG. 5 is a schematic view showing the cross-sectional structure of the array substrate in the liquid crystal display of Embodiment 1, and shows the cross-sectional structure along the line C-D of FIG. 2.
Figure 6:
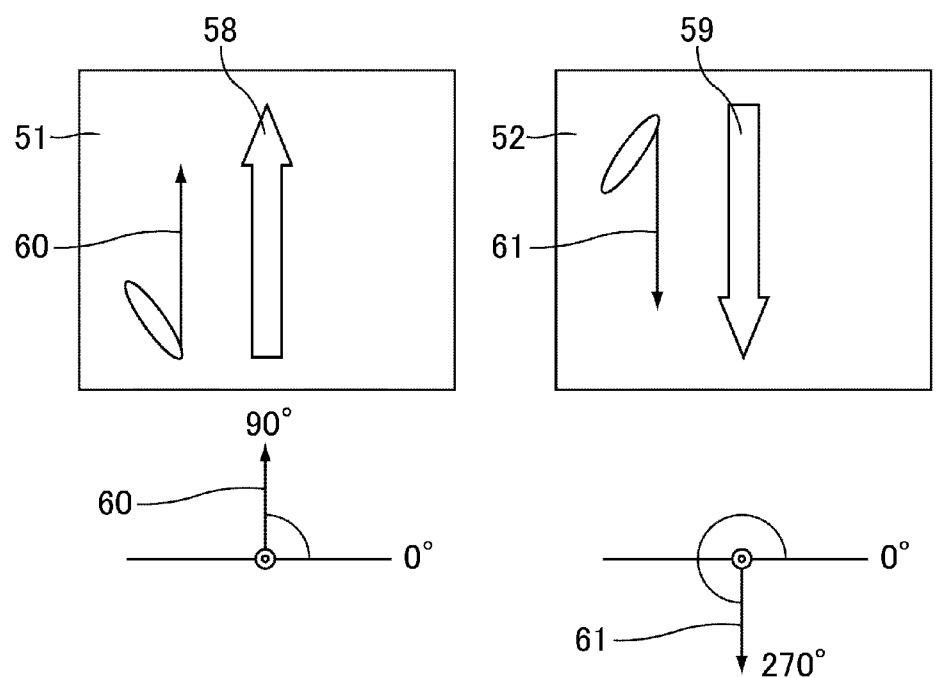
FIG. 6 is a schematic view for describing the directions of alignment treatment on first and second alignment films in Embodiment 1.
Figure 7:
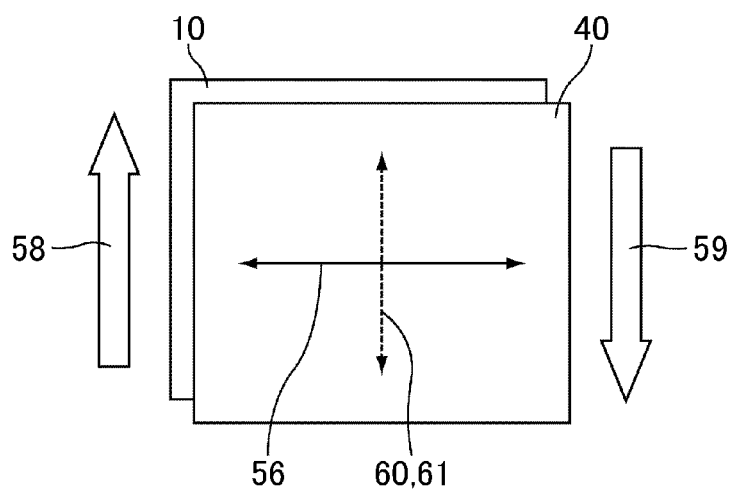
FIG. 7 is a schematic view for describing the relation between the directions of alignment treatment and the polarizing axes of the polarizing plates in Embodiment 1.
Figure 8:
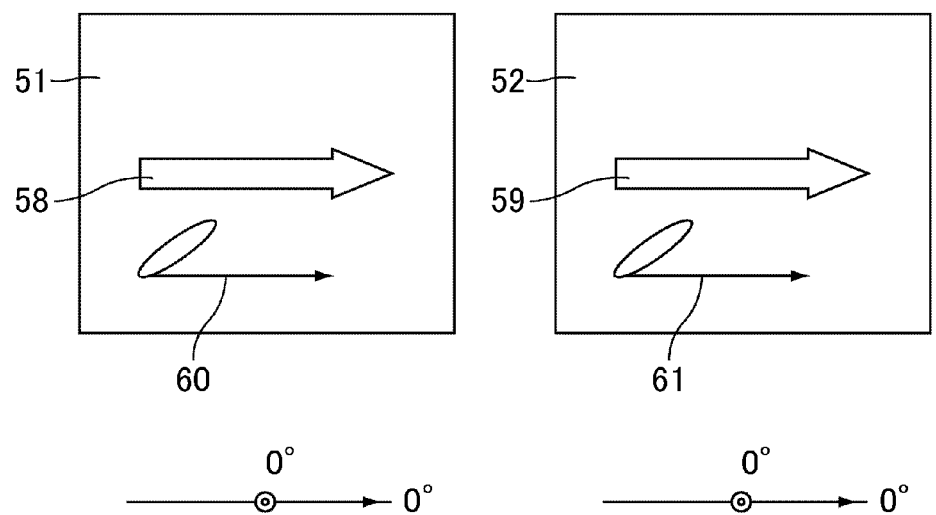
FIG. 8 is a schematic view for describing the directions of alignment treatment on first and second alignment films in Embodiment 1.
Figure 9:
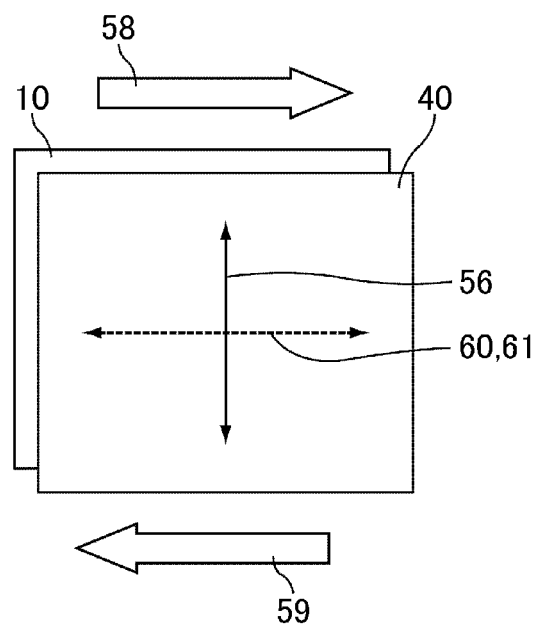
FIG. 9 is a schematic view for describing the relation between the directions of alignment treatment and the polarizing axes of the polarizing plates in Embodiment 1.

FIG. 1 is a schematic view showing a configuration of a liquid crystal display of Embodiment 1. FIG. 2 is a schematic plan view showing the structure of a sub-pixel in a liquid crystal display of Embodiment 1, and shows the internal structure of an array substrate. FIG. 3 is a schematic plan view showing the structure of a sub-pixel in a liquid crystal display of Embodiment 1, and shows the internal structure of an opposite substrate. FIG. 4 is a schematic view showing the cross-sectional structure of the liquid crystal display of Embodiment 1, and shows the cross-sectional structure along the line A-B of FIGS. 2 and 3. FIG. 5 is a schematic view showing the cross-sectional structure of the array substrate in the liquid crystal display of Embodiment 1, and shows the cross-sectional structure along the line C-D of FIG. 2. FIGS. 6 and 8 are schematic views for describing the directions of alignment treatment on first and second alignment films in Embodiment 1. FIGS. 7 and 9 are schematic views for describing the relation between the directions of alignment treatment and the polarizing axes of the polarizing plates in Embodiment 1. FIGS. 2 and 4 show an example of dimensions of the respective members in the present embodiment. The dimensions assume a resolution of 550 ppi.

As shown in FIGS. 1 to 5, the liquid crystal display of the present embodiment is of an active matrix-driven type, is a transmissive liquid crystal display, and includes a liquid crystal panel 1. The liquid crystal panel 1 includes an array substrate 10 corresponding to the first substrate, an opposite substrate 40 disposed opposite to the array substrate 10, and a horizontal orientation-type liquid crystal layer 50 held between these substrates 10 and 40. In addition, the liquid crystal display of the present embodiment has a display area 2 where images are displayed, and the display area 2 is constituted of m×n sub-pixels 3 arranged in a matrix. The one pixel is constituted of a plurality of sub-pixels 3 (respectively corresponding to the three colors of red, green, and blue, for example).

The array substrate 10 includes a light-transmissive insulating substrate 11 made of a material such as a glass substrate or a quartz substrate. On the insulating substrate 11 and in the display area 2, m×n pixel electrodes 21 provided for each sub-pixel 3, an n number of gate bus lines Y (Y1 to Yn) respectively extending in the row direction, an m number of source bus lines X (X1 to Xm) respectively extending in the column direction, m×n switching elements disposed in the respective sub-pixels 3 in the vicinity of the intersections between the source bus lines X and the gate bus lines Y, and a first common electrode 31 supplying a common signal to all of the sub-pixels 3 are formed. Each switching element is made of a thin film transistor 14 (TFT), for example. Each sub-pixel 3 has formed therein a liquid crystal capacitor 4 and a storage capacitor 5 (pixel auxiliary capacitance) electrically connected in parallel with the liquid crystal capacitor 4. Top gate and bottom gate are the main types of TFTs 14. Below, a case in which a top gate type is used will be mainly described, but the TFT 14 may be of the bottom gate type.

The array substrate 10 further includes at least a portion of a gate driver 6 electrically connected to the gate bus lines Y and at least a portion of a source driver 7 electrically connected to the source bus lines X in a driver circuit region 9 in the periphery of the display area 2. The gate driver 6 sequentially supplies a scan signal (driving signal) to the n number of gate bus lines Y under the control of a controller 8. The source driver 7 supplies image signals (driving signals) to the m number of source bus lines X under the control of the controller 8 when the switching elements of each row turn ON due to the scan signal. In this manner, a potential matching the image signal supplied through the switching element of each pixel electrode 21 of each row is set, an electric charge accumulates in the liquid crystal capacitor 4 and the storage capacitor 5, and the plurality of sub-pixels 3 are individually and independently driven.

A base insulating film 12 is formed on the insulating substrate 11. The base insulating film 12 is formed of an insulating film containing an inorganic insulating material such as silicon nitride ($SiN_x$) or silicon oxide. The base insulating film 12 may be formed of a multilayer film including these insulating films.

A semiconductor layer 18 of each TFT 14 is formed on the base insulating film 12. The semiconductor layer 18 is formed in an angular U-shape in a plan view, and can be formed of a material such as a group 14 semiconductor such as polysilicon or amorphous silicon film, or an oxide semiconductor. There is no special limitation on the crystalline state of the semiconductor layer 18; the semiconductor layer 18 may be monocrystalline, polycrystalline, amorphous, or microcrystalline, or may include two or more of such crystalline structures. Microcrystalline refers to a mix between amorphous and polycrystalline states.

An oxide semiconductor is suitable as the material for the semiconductor layer 18. The oxide semiconductor is particularly suited to cases in which the TFT 14 is of a bottom gate type. It is preferable that the oxide semiconductor contain oxygen and at least one element selected from among a group including indium (In), gallium (Ga), aluminum (Al), copper (Cu), zinc (Zn), magnesium (Mg), and cadmium (Cd), and it is more preferable that the oxide semiconductor contain indium (In), gallium (Ga), zinc (Zn), and oxygen (O). The mobility of the TFT 14 can be made greater with the use of the oxide semiconductor compared to using amorphous silicon. Thus, even if the resolution were made higher and the ON period of the TFT 14 of each sub-pixel were made shorter, sufficient voltage can be applied to the pixel electrode 21. In addition, the leakage current of the TFT 14 in the OFF state (OFF leakage) can be reduced with the use of the oxide semiconductor compared to using amorphous silicon. Thus, regardless of whether or not the display is high resolution, it is possible to drive the pixels by low frequency driving, by a driving mode with pauses therein, or the like, and thus, it is possible to reduce power consumption. In the present embodiment, it is difficult to ensure a capacitance of the storage capacitor compared to FFS mode, and thus, a decrease in display quality due to flickering is of concern. However, by using an oxide semiconductor, OFF leakage current can be reduced, and thus, even if the capacitance of the storage capacitor is small, it is possible to mitigate a decrease in display quality due to flickering.

Specific examples of an oxide semiconductor include IGZO (In—Ga—Zn—O, indium gallium zinc oxide), $InGaO_3(ZnO)_5$, $Mg_xZn_{1-x}O$, $Cd_xZn_{1-x}O$, and CdO. Amorphous, polycrystalline, or microcrystalline ZnO doped with at least one element (impurity element) selected from among a group including a group 1 element, a group 13 element, a group 14 element, a group 15 element, and a group 17 element, or an amorphous, polycrystalline, or microcrystalline ZnO that has not been doped with the impurity element may be used.

The semiconductor layer 18 is covered by a gate insulating film 17. The gate insulating film 17 is formed of an insulating film containing an inorganic insulating material such as silicon nitride ($SiN_x$) or silicon oxide. The gate insulating film 17 may be formed of a multilayer film including these insulating films.

If the semiconductor layer 18 is formed of polysilicon, then it is preferable that the doping step described below be performed after the gate insulating film 17 is formed. That is, after the formation of the gate insulating film 17, the entire surface of the substrate is doped with an impurity (such as boron) by method such as ion doping. As a result, it is possible to control the threshold of an N channel TFT and a P channel TFT. If there is no need to control the threshold of the P channel TFT, then this doping step need not be performed. Next, after forming a resist film by photolithography or the like to cover a P channel TFT formation region, only an N channel TFT formation region is doped with an impurity (such as boron) by a method such as ion doping. As a result, it is possible to control the threshold of the N channel TFT. The concentration of doped impurity may, as necessary, be different between the inner channel region below the gate electrode and areas outside the channel region.

A conductive layer including the gate bus lines Y (also referred to as the "gate layer" below) is disposed on the gate insulating film 17. Each TFT 14 has a double gate structure, and is formed such that the linearly formed gate bus line Y traverses the semiconductor layer 18. The two intersections between the gate bus line Y and the semiconductor layer 18 function respectively as the gate electrodes 15 and 16 of the TFT 14. In this manner, the gate electrodes 15 and 16 are connected to the gate bus line Y by being formed integrally with the gate bus line Y.

If the semiconductor layer 18 is formed of polysilicon, then it is preferable that the doping step and the thermal activation process described below be performed after the gate layer is formed. That is, after forming the gate layer, first, a resist film of a desired shape (pattern) is formed by a method such as photolithography so as to cover the P channel TFT formation region, and then, by a method such as ion doping, regions to be the source region and the drain region of the N channel TFT are doped to a high concentration with a pentavalent atom such as phosphorus. After removing the resist film, a new resist film of a desired shape (pattern) is formed by a method such as photolithography so as to cover the N channel TFT formation region, and then, by a method such as ion doping, regions to be the source region and the drain region of the P channel TFT are doped to a high concentration with a trivalent atom such as boron. As a result, it is possible to form the source region and the drain region of the N channel TFT and the P channel TFT. A lightly doped drain (LDD) structure may be formed as necessary. Next, by a thermal activation process (heat treatment), the impurity ions present in the semiconductor layer 18 are activated. As a result, it is possible to improve the electric conductivity of the source and drain regions. Besides heat treatment, excimer laser irradiation is also a method to activate impurity ions.

In the display area 2, the gate layer is covered by an interlayer insulating film 25. The interlayer insulating film 25 is formed of an insulating film containing an inorganic insulating material such as silicon nitride ($SiN_x$) or silicon oxide. The interlayer insulating film 25 may be formed of a multilayer film including these insulating films.

A conductive layer including the source bus lines X (also referred to as the "source layer" below) is disposed on the interlayer insulating film 25. Each TFT 14 includes a source electrode 19 and a drain electrode 20 disposed on the interlayer insulating film 25, and the source electrode 19 and the drain electrode 20 are respectively disposed on one end and the other end of the semiconductor layer 18. The source electrode 19 is electrically connected to the source bus line X by being integrally formed therewith, and is in contact with one end of the semiconductor layer 18 (source region) through a contact hole 34 that penetrates the gate insulating film 17 and the interlayer insulating film 25. The drain electrode 20 is electrically connected to the pixel electrode 21, and is in contact with the other end of the semiconductor layer 18 (drain region) through a contact hole 35 that penetrates the gate insulating film 17 and the interlayer insulating film 25. The source bus line X is disposed so as to intersect with the gate bus line Y in a substantially perpendicular manner with the interlayer insulating film 25 therebetween.

If the semiconductor layer 18 is formed of polysilicon, then heat treatment may be performed after the interlayer insulating film 25 is formed. In this manner, it is possible to have the interface between the channel region and the gate insulating film 17 be hydrogen-terminated. The source of the hydrogen is that contained in the interlayer insulating film 25.

The gate layer and the source layer can be formed of a conductive material containing molybdenum (Mo), titanium (Ti), aluminum (Al), copper (Cu), tungsten (W), tantalum (Ta), chromium (Cr), an alloy thereof, or a nitride thereof, for example. The gate layer and the source layer may be formed of a multilayer film in which a plurality of types of conductive films are layered. The gate layer may be formed by layering a tantalum nitride (TaN) layer and a W layer in this order, and the source layer may be formed by layering a Ti layer, an Al layer, and a Ti layer in this order.

In the display area 2, the source layer is covered by an interlayer insulating film 26 corresponding to the first interlayer insulating film. The interlayer insulating film 26 contains a photosensitive resin film, and thus, can be formed to planarize the surface of the array substrate 10. A photosensitive acrylic resin film and a photosensitive polyimide are examples of materials for the photosensitive resin film. The photosensitive resin is 1.0 μm to 4.0 μm in thickness (preferably 2.0 μm to 3.0 μm). It is preferable that the interlayer insulating film 26 be as thick as possible. This is in order to reduce the susceptibility of the liquid crystal layer 50 to being affected by unwanted electric fields from the wiring lines in the source layer (source bus lines X, for example). The photosensitive resin film may be a photosensitive acrylic resin film that is 2.5 μm in thickness. The interlayer insulating film 26 may further include an inorganic insulating film containing an inorganic insulating material such as silicon oxide, or may include a multilayer film including an inorganic insulating film and a photosensitive resin film.

A conductive layer including the pixel electrodes 21, which corresponds to the first conductive layer (also referred to as a "lower conductive layer"), is disposed on the interlayer insulating film 26. As shown in FIG. 2, each pixel electrode 21 has a linear portion 21a corresponding to the second linear portion, and a connecting portion 21b corresponding to the second connecting portion. Each pixel electrode 21 is electrically connected to the drain electrode 20 by the connecting portion 21b being in contact with the drain electrode 20 through a contact hole 36 formed in the interlayer insulating film 26. The linear portion 21a is transparent and formed linearly (preferably in a straight line), and is disposed in parallel with the column direction. There is one linear portion 21a per sub-pixel 3, the linear portion 21a being disposed in the center of the sub-pixel 3, or in other words, equidistant respectively to the source bus lines X on the left and right thereof. The connecting portion 21b is transparent, is disposed so as to cover the drain electrode 20, and is connected to one end (the lower end, for example) of the linear portion 21a.

In the display area 2, lower conductive layer is covered by an interlayer insulating film 27 corresponding to the second interlayer insulating film. The interlayer insulating film 27 is formed of an insulating film containing an inorganic insulating material such as silicon nitride ($SiN_X$) or silicon oxide. The interlayer insulating film 27 may be formed of a multilayer film including these insulating films. The interlayer insulating film 27 is 50 nm to 500 nm in thickness (preferable 100 nm to 300 nm). The interlayer insulating film 27 may be a $SiN_X$ film 100 nm in thickness. In order to increase the capacitance of the storage capacitor 5, it is preferable that the interlayer insulating film 27 be as thin as possible. On the other hand, if the interlayer insulating film 27 is too thin, then a decreasing yield due to shorting between the pixel electrode 21 and the first common electrode 31 is of concern. Thus, from the perspective of balancing the need to ensure sufficient capacitance in the storage capacitor 5 and preventing a decrease in yield, it is preferable that the thickness of the interlayer insulating film 27 be within the above-mentioned range.

A conductive layer including the first common electrode 31, which corresponds to the second conductive layer (also referred to as a "upper conductive layer" below), is disposed on the interlayer insulating film 27. The first common electrode 31 is electrically connected to a common wiring line (not shown) outside the display area 2, and a common signal is supplied to the common wiring line. As shown in FIG. 2, the first common electrode 31 has a plurality of linear portions 31a corresponding to the first linear portion, and a connecting portion 31b corresponding to the first connecting portion and connecting adjacent linear portions 31a. The linear portion 31a is transparent and formed linearly (preferably in a straight line), and is disposed in parallel with the column direction. All of the linear portions 31a are disposed to overlap and be in parallel with the source bus lines X. In addition, the linear portions 31a are arranged in parallel with the linear portion 21a of the pixel electrode 21 therebetween, and the linear portions 21a and 31a are disposed alternately in the row direction with a gap therebetween in a plan view. The linear portion 21a of each pixel electrode 21 is disposed substantially equidistant to the linear portions 31a to the left and right thereof.

In each sub-pixel 3, an opening region 38 corresponding to the first region is formed between the linear portion 21a of the pixel electrode 21 and the linear portion 31a to the right thereof, and between the linear portion 21a and the linear portion 31a to the left thereof, an opening region 39 corresponding to the second region is formed. The opening regions 38 and 39 are respectively located to the left and right of the linear portion 21a. The connecting portion 21b of the pixel electrode 21 is formed to be wider than the linear portion 21a and has a first edge portion 28 and a second edge portion 29 respectively facing the opening regions 38 and 39. The connecting portion 21b has the shape of a home plate, and the first edge portion 28 and the second edge portion 29 are straight line portions corresponding to the diagonal lines of the connecting portion 21b shaped like a home plate. The first edge portion 28 and the second edge portion 29 are connected to one end (lower end, for example) of the linear portion 21a. The first edge portion 28 extends from the linear portion 21a towards the right linear portion 31a and the second edge portion 29 extends from the linear portion 21a towards the left linear portion 31a.

The connecting portion 31b of the first common electrode 31 is transparent, faces the connecting portion 21b of the pixel electrode 21, and overlaps a portion of the connecting portion 21b across the interlayer insulating film 27. The storage capacitor 5 is formed by the connecting portions 21b and 31b and the interlayer insulating film 27 therebetween, and the connecting portions 21b and 31b also function as electrodes for the storage capacitor with the interlayer insulating film 27 functioning as the dielectric of the storage capacitor.

The lower conductive layer and the upper conductive layer respectively include at least a transparent conductive film, and the pixel electrode 21 is formed from the transparent conductive film of the lower conductive layer, and the first common electrode 31 is formed from the transparent conductive film of the upper conductive layer. The transparent conductive film can be formed of ITO (indium tin oxide), IZO (indium zinc oxide), CuI, $SnO_2$, ZnO, GZO (gallium zinc oxide), a conductive polymer such as PEDOT (poly(3,4-ethylenedioxythiophene)) or polyaniline, or such a conductive polymer doped with an acceptor. The transparent conductive film may be an ITO film 100 nm in thickness.

However, in each pixel electrode 21, portions other than the linear portions 21a may be non-transparent. In such a case, the lower conductive layer may include a transparent conductive film and a non-transparent conductive film layered together, and the non-transparent portions of the pixel electrode 21 may be formed of a non-transparent conductive film or a multilayer film including a transparent conductive film and a non-transparent conductive film. In addition, the first common electrode 31 includes an overlapping portion where the source bus line X, the gate bus line Y, and light-shielding members such as the black matrix to be mentioned later overlap in a plan view, and the overlapping portion may be transparent or non-transparent. If the overlapping portion is non-transparent, the upper conductive layer may include a transparent conductive film and a non-transparent conductive film layered together, and the overlapping portion may be formed of a non-transparent conductive film or a multilayer film including a transparent conductive film and a non-transparent conductive film. In this manner, it is possible to lower the resistance of the first common electrode 31. On the other hand, from the perspective of transmittance, it is preferable that the first common electrode 31, and in particular, that the linear portion 31a thereof be transparent. The non-transparent conductive film can be formed of a conductive material containing molybdenum (Mo), titanium (Ti), aluminum (Al), copper (Cu), tungsten (W), tantalum (Ta), chromium (Cr), an alloy thereof, or a nitride thereof, for example.

As described above, if the linear portions 21a and 31a and the connecting portions 21b and 31b are transparent, the linear portion 21a and the connecting portion 21b can be formed integrally and of the same material, and the linear portion 31a and the connecting portion 31b can be formed integrally and of the same material.

In the display area 2, the upper conductive layer is covered by a first alignment film 51.

Meanwhile, the opposite substrate 40 includes a light-transmissive insulating substrate 44 made of a glass plate, a quartz plate, or the like, and in the display area 2 on the insulating substrate 44, a black matrix 45 (BM) functioning as a light-shielding member, color filters 46 of a plurality of colors, a transparent overcoat film 47 covering the color filters 46 and the BM 45, a second common electrode 41 disposed on the overcoat film 47, and a plurality of columnar spacers (not shown) are formed.

The BM 45 is formed in regions in the periphery of the display area 2, and is formed so as to shield the following regions from light: regions facing the source bus lines X and the gate bus lines Y, regions facing the switching elements, and regions facing the connecting portions 21b of the pixel electrodes 21. The BM 45 is formed of a light-shielding material such as black colored resin.

The color filters 46 of the respective colors are provided in the display area 2, and are respectively formed in areas delineated by the BM 45, or in other words, so as to cover the openings of the BM 45. In the manner, the color filters 46 of the respective colors are provided for each sub-pixel 3, and the sub-pixels 3 are delineated by the BM 45. The color filters 46 are formed of colored resins formed by dyeing the colored resins different colors (red, blue, and green colored resins, for example). The color filters 46 may be disposed on the array substrate 10 instead of the opposite substrate 40.

The overcoat film 47 is provided so as to reduce the surface roughness of (planarize) the opposite substrate 40. The overcoat film 47 is formed of a transparent insulating film including an organic insulating material such as an acrylic resin or polyimide.

A conductive layer including the second common electrode 41 (also referred to as an "opposite conductive layer" below) is disposed on the overcoat film 47. The second common electrode 41, like the first common electrode 31, is electrically connected to the common wiring line outside of the display area 2. Thus, the common electrode 31 and 41 are supplied the same common signal. In order to electrically connect the second common electrode 41 on the opposite substrate 40 to the common wiring line on the array substrate 10, the so-called "transfer" technique is used. A sealing member containing a conductive paste referred to as a common transfer material or conductive beads is used to electrically connect the second common electrode 41 to the common wiring line. Specific examples of a common transfer material generally include a silver paste and a carbon paste, and specific examples of conductive beads include gold pearls and the like.

As shown in FIG. 3, the second common electrode 41 has substantially the same plan view shape as the first common electrode 31, and has a plurality of linear portions 41a facing the linear portion 31a of the first common electrode 31, the linear portions 41a corresponding to the third linear portion, and a connecting portion 41b that connects adjacent linear portions 41a to each other. The linear portion 41a is transparent and formed linearly (preferably in a straight line), and is disposed in parallel with the column direction so as to face the source bus line X. Furthermore, the linear portions 41a are arranged in parallel with the linear portion 21a of the pixel electrode 21, and the linear portions 21a and 41a are disposed alternately in the row direction with a gap therebetween in a plan view. The linear portion 21a of each pixel electrode 21 is disposed substantially equidistant to the linear portions 41a to the left and right thereof. The connecting portion 41b is transparent and faces the connecting portion 31b of the first common electrode 31.

The opposite conductive layer includes at least a transparent conductive film, and the second common electrode 41 is formed of the transparent conductive film. The transparent conductive film can be formed of ITO (indium tin oxide), IZO (indium zinc oxide), CuI, SnO2, ZnO, GZO (gallium zinc oxide), a conductive polymer such as PEDOT (poly(3, 4-ethylenedioxythiophene)) or polyaniline, or such a conductive polymer doped with an acceptor. The transparent conductive film may be an ITO film 100 nm in thickness.

The second common electrode 41 includes an overlapping portion where the source bus line X, the gate bus line Y, and light-shielding members such as the BM 45 overlap in a plan view, and the overlapping portion may be transparent or non-transparent. If the overlapping portion is non-transparent, the upper conductive layer may include a transparent conductive film and a non-transparent conductive film layered together, and the overlapping portion may be formed of a non-transparent conductive film or a multilayer film including a transparent conductive film and a non-transparent conductive film. In this manner, it is possible to lower the resistance of the second common electrode 41. On the other hand, from the perspective of transmittance, it is preferable that the second common electrode 41, and in particular, the linear portion 41a thereof be transparent. The non-transparent conductive film can be formed of a conductive material containing molybdenum (Mo), titanium (Ti), aluminum (Al), copper (Cu), tungsten (W), tantalum (Ta), chromium (Cr), an alloy thereof, or a nitride thereof, for example.

As described above, if the linear portions 41a and the connecting portion 41b are transparent, then it is possible to form these integrally and of the same material.

Spacers are disposed on the opposite conductive layer. The spacers are members for maintaining a prescribed gap between the array substrate 10 and the opposite substrate 40, and are disposed within the light-shielding region on the BM 45.

In the display area 2, the opposite conductive layer is covered by a second alignment film 52.

The first alignment film 51 and the second alignment film 52 are provided with an alignment treatment such as rubbing treatment or photoalignment treatment. In this manner, it is possible to orient the liquid crystal molecules in the vicinity of each alignment film in a prescribed direction. The alignment films 51 and 52 can be formed a resin material such as polyimide.

When the opposite substrate 40 and the array substrate 10 are disposed such that the first alignment film 51 and the second alignment film 52 face each other, the spacers form a prescribed gap. The liquid crystal layer 50 is formed by sealing a liquid crystal composition containing nematic liquid crystal in this gap. The liquid crystal layer 50 is sealed between the substrates 10 and 40 by a sealing member (not shown) provided so as to surround the display area 2. In addition, the sealing member bonds the substrates 10 and 40 to each other.

The liquid crystal molecules included in the liquid crystal layer 50 may have positive or negative dielectric anisotropy, but it is preferable that liquid crystal molecules having negative dielectric anisotropy be used in order to realize a higher transmittance. As liquid crystal molecules having positive dielectric anisotropy, it is possible to use those that can be used in FFS mode, and specifically, it is possible to use liquid crystal molecules having a permittivity $\in$ perpendicular in the short axis direction of the liquid crystal molecules of 3.1, a permittivity $\in$ parallel in the long axis direction of the liquid crystal molecules of 10.1, and a dielectric anisotropy $\Delta\in$ of 7. As liquid crystal molecules having negative dielectric anisotropy, it is possible to use those that can be used in FFS mode, and specifically, it is possible to use liquid crystal molecules having a permittivity ∈ perpendicular in the short axis direction of the liquid crystal molecules of 8.8, a permittivity ∈ parallel in the long axis direction of the liquid crystal molecules of 3.8, and a dielectric anisotropy Δ∈ of −5.

The liquid crystal molecules are oriented by the restraining force of the first alignment film 51 and the second alignment film 52. In a state in which no potential difference is present between the pixel electrode 21 and the first common electrode 31 and no potential difference is present between the pixel electrode 21 and the second common electrode 41, or in other words, when no electric field has formed between the pixel electrode 21 and the first common electrode 31 or between the pixel electrode 21 and the second common electrode 41 (also referred to as the period when no voltage is applied), the liquid crystal molecules are oriented such that the long axis direction thereof faces a prescribed direction. When no voltage is applied, the long axis direction substantially matches the direction of alignment treatment (rubbing direction, for example).

Moreover, the liquid crystal molecules are oriented such that the long axis direction thereof is substantially parallel to the main surfaces of the array substrate 10 and the opposite substrate 40. The pretilt angle of the liquid crystal layer 50 is 0.5° to 3.0° inclusive (preferable 1.0° to 2.5° inclusive).

With the angle in a plan view formed between the long axis direction of the liquid crystal molecules and the lengthwise direction of the linear portion 21a of the pixel electrode 21 as the initial orientation angle, it is preferable that the initial orientation angle be 0° to 45° inclusive if the dielectric anisotropy of the liquid crystal molecules is positive, and that the initial orientation angle be 45° to 90° inclusive if the dielectric anisotropy of the liquid crystal molecules is negative.

Optical elements 53 and 54 are bonded respectively to the main surfaces of the array substrate 10 and the opposite substrate 40 opposite to the surfaces thereof facing the liquid crystal layer 50. The optical elements 53 and 54 include polarizing plates, and these polarizing plates are generally arranged in a crossed Nicols state. When the liquid crystal panel is viewed in a plan view, the transmittance axis of one of the polarizing plates is parallel to the long axis direction of the liquid crystal molecules when no voltage is applied, and the transmittance axis of the other polarizing plate is perpendicular to the long axis direction of the liquid crystal molecules when no voltage is applied. As shown in FIG. 6, if the dielectric anisotropy of the liquid crystal molecules is positive, the direction of alignment treatment on the first alignment film 51 (rubbing direction 58, for example) is set to be opposite and parallel (antiparallel) to the direction of alignment treatment on the second alignment film 52 (rubbing direction 59, for example). As a result, prior to and after bonding of the array substrate 10 to the opposite substrate 40, the pretilt direction 60 of the liquid crystal molecules in the vicinity of the first alignment film 51 becomes opposite and parallel (antiparallel) to the pretilt direction 61 of the liquid crystal molecules in the vicinity of the second alignment film 52. In addition, in this case, as shown in FIG. 7, when viewing the liquid crystal panel in a plan view, the polarizing axis 56 (transmittance axis) of the polarizing plate included in the optical element 54 is perpendicular to the direction of alignment treatment of the second alignment film 52 (rubbing direction 59, for example). On the other hand, as shown in FIG. 8, if the dielectric anisotropy of the liquid crystal molecules is negative, the direction of alignment treatment on the first alignment film 51 (rubbing direction 58, for example) is set to be in the same direction as and parallel to the direction of alignment treatment on the second alignment film 52 (rubbing direction 59, for example). As a result, after bonding of the array substrate 10 to the opposite substrate 40, the pretilt direction 60 of the liquid crystal molecules in the vicinity of the first alignment film 51 becomes opposite and parallel (antiparallel) to the pretilt direction 61 of the liquid crystal molecules in the vicinity of the second alignment film 52. Furthermore, in this case, as shown in FIG. 9, when viewing the liquid crystal panel in a plan view, the polarizing axis 56 (transmittance axis) of the polarizing plate included in the optical element 54 is perpendicular to the direction of alignment treatment of the second alignment film 52 (rubbing direction 59, for example).

In the present embodiment, normally black mode is realized, and when no voltage is being applied, the transmittance is at its lowest level. That is, a black screen is displayed. More specifically, the liquid crystal display of the present embodiment includes a backlight unit 55 disposed to the rear of the liquid crystal panel 1, and when no voltage is being applied, the light radiated from the backlight unit 55 is converted to polarized light by passing through the polarizing plate of the optical element 53. This polarized light passes through the liquid crystal layer 50 mostly unchanged in polarization, and is then blocked by the polarizing plate of the optical element 54.

In each sub-pixel 3, the respective distances (gaps) between the linear portion 21a and the linear portions 31a to the left and right thereof are set to be sufficiently large compared to the gap between the substrates 10 and 40. The respective distances are 2 μm to 8 μm (preferably 3 μm to 6 μm), and the gap between the substrates 10 and 40 is 1.5 μm to 5.0 μm (preferably 2.5 μm to 4.0 μm). In addition, the first common electrode 31 and the second common electrode 41 are supplied the same common signal, and thus, the potentials thereof are substantially equal. Therefore, when a potential difference occurs between the pixel electrode 21 and the first common electrode 31 and a potential difference occurs between the pixel electrode 21 and the second common electrode 41, or in other words, when a voltage differing from the common electrodes 31 and 41 is applied to the pixel electrode 21 (also referred to as voltage application time below), electric fields including many electric field components parallel to the main surfaces (also referred to as horizontal electric fields) of the substrates 10 and 40 are formed between the linear portions 21a and 31a and between the linear portions 21a and 41a.

Moreover, if differing voltages are applied between the pixel electrode 21 and the common electrodes 31 and 41, the liquid crystal molecules in the horizontal electric field rotate in a plane substantially parallel to the main surfaces of the substrates 10 and 40. Liquid crystal molecules having positive dielectric anisotropy rotate such that the long axis direction thereof is parallel to the direction of the horizontal electric field (that is the lines of electric force) and liquid crystal molecules having negative dielectric anisotropy rotate such that the long axis direction thereof is perpendicular to the horizontal electric field. When the long axis direction of the liquid crystal molecules changes, the transmittance of light passing through the liquid crystal panel 1 changes. The liquid crystal display of the present embodiment controls the transmittance of light from the backlight unit 55 for each sub-pixel 3 in this manner, and displays images in the display area 2.

In the present embodiment, the linear portion 21a of the pixel electrode 21 is provided in the lower conductive layer and the linear portion 31a of the first common electrode 31 is provided in the upper conductive layer; thus, the linear portions 21a and 31a are formed in different conductive layers from each other. Therefore, there is no need to form the linear portions 21a and 31a by patterning the same conductive film. In addition, the linear portion 21a is provided between two adjacent linear portions 31a; thus, only one linear portion 21a is present per sub-pixel 3. All linear portions 31a are formed over the source bus lines X, and thus, there is no need to form the linear portions 31a and the source bus lines X by patterning the same conductive film. Thus, the liquid crystal display of the present embodiment has the advantage of higher resolution.

The linear portion 21a is transparent, and as shown in simulations to be described later, regions where the linear portions 21a are present can also transmit light. Furthermore, all linear portions 31a are disposed over the source bus lines X so as to be parallel therewith, and thus, it is possible to widen the opening regions 38 and 39, which primarily contribute to transmittance. Thus, the liquid crystal display of the present embodiment can realize high transmittance.

However, the orientation of the liquid crystal molecules does not change much over the linear portion 21a as compared to the opening regions 38 and 39, and the linear portion 21a does not contribute as much to transmittance as the opening regions 38 and 39. Thus, from the perspective of transmittance, it is preferable that the linear portion 21a be as thin as possible, and more specifically, that the width of each linear portion 21a be 2 μm or less. The thinner the linear portion 21a is, the more electric field components parallel to the main surfaces of the substrates 10 and 40 are present in relation to the electric field components in the vertical direction (thickness direction of the liquid crystal layer 50), and thus, the tilt angle of the liquid crystal molecules with respect to the main surfaces of the substrates 10 and 40 can be made smaller. Thus, it is possible to more effectively perform optical compensation. On the other hand, if the linear portion 21a is too thin, then it becomes difficult to accurately form the linear portion 21a by the common photolithography technique. Thus, it is preferable that the linear portion 21a be 1 μm or greater in thickness from the perspective of transmittance, optical compensation, and productivity.

Additionally, in the liquid crystal display disclosed in Patent Document 3, the array substrate has pixel electrodes and the opposite electrode has a common electrode. Thus, in this liquid crystal display, compared to a typical IPS mode liquid crystal display, the distance between the pixel electrodes and the common electrode increases by an amount equal to the thickness of the liquid crystal layer, thus increasing the drive voltage. In other words, this liquid crystal display is unsuited to reducing power consumption.

By contrast, in the liquid crystal display of the present embodiment, the linear portion 21a of the pixel electrode 21 and the linear portion 31a of the first common electrode 31 are formed on the same array substrate 10, and thus, it is possible to reduce the drive voltage compared to the liquid crystal display disclosed in Patent Document 3. Therefore, the liquid crystal display of the present embodiment has the advantage of lower power consumption than the liquid crystal display disclosed in Patent Document 3.

Furthermore, in the present embodiment, the pixel electrode 21 is provided in the lower conductive layer, and the first common electrode 31 is provided in the upper conductive layer. Thus, there is no need to form a contact hole for electrically connecting the pixel electrode 21 to the drain electrode 20 in the interlayer insulating film 27, and thus, it is possible to use this portion as the storage capacitor 5. In addition, there is no need to use the linear portion 21a of the pixel electrode 21 as an electrode for the storage capacitor, and thus, even if the linear portion 21a is made thin, there is no variation in the storage capacitor 5 depending on the sub-pixel and/or product.

In addition, an opening functioning as the contact hole 36 is formed in the photosensitive resin film included in the interlayer insulating film 26, and the pixel electrode 21 is electrically connected to the drain electrode 20 through this opening. As a result, it is possible to form the walls of the photosensitive resin film surrounding the opening in a smooth taper shape, and it is possible to have the thickness of the interlayer insulating film 27 be substantially even over the opening. Thus, it is possible to mitigate insulation breakdown in the storage capacitor 5 formed on the opening, and it is possible to efficiently use the region over the opening as a region for forming storage capacitance. It is preferable that the walls of the photosensitive resin film surrounding the opening have a shallow incline, and more specifically, it is preferable that the taper angle thereof be approximately 20° to 70° (approximately 45°, for example). The photosensitive resin film having such a taper angle can be formed by performing exposure, developing, and annealing on a general photosensitive resin film.

From the perspective of increasing capacitance in the storage capacitor 5, it is preferable that the area of overlap between the connecting portion 31b and the connecting portion 21b be as large as possible. On the other hand, from the perspective of transmittance, it is preferable that the connecting portion 31b be located in a position recessed from the edge portions 28 and 29 of the connecting portion 21b of the pixel electrode 21. If the positions of the edge portions of the connecting portion 31b match the positions of the edge portions 28 and 29, this results in a wide dark line forming in the center of the sub-pixel 3, but by withdrawing the connecting portion 31b from the edge portions 28 and 29, it is possible to move the dark line to the end of the sub-pixel and improve transmittance.

From the perspective of further improving transmittance, it is preferable that the angle θ1 between the linear portion 21a and the edge portion 28 and the angle θ2 between the linear portion 21a and the edge portion 29 be 90° or greater. It is more preferable that θ1 and θ2 be 110° to 160° inclusive, and even more preferable that θ1 and θ2 be 120° to 150° inclusive.

If a common electrode is not formed on the opposite substrate 40, only the orientation of liquid crystal molecules near the array substrate 10 is controlled, but in the present embodiment, the linear portion 41a of the second common electrode 41 is disposed opposite to the linear portion 31a of the first common electrode 31. Thus, it is possible to also orient the liquid crystal molecules near the opposite substrate 40. Therefore, it is possible to further reduce drive voltage and further reduce power consumption.

Furthermore, from the perspective of reducing drive voltage and further reducing power consumption, it is preferable that the linear portion 31a of the first common electrode 31 be disposed as close as possible to the linear portion 21a of the pixel electrode 21 without protruding from the BM 45. Thus, it is preferable that the edge portion of the linear portion 31a substantially match the position of the edge portion of the BM 45 in a plan view.

In conventional horizontal electric field-driven liquid crystal displays such as those of IPS mode or FFS mode, the pixel electrodes and the common electrode are formed on the array substrate, and thus, it was necessary to form a shield electrode on the main surface of the opposite substrate opposite to the surface facing the liquid crystal layer and perform electromagnetic shielding using the shield electrode. This is because without the shield electrode on the opposite substrate, static electricity enters the liquid crystal layer from outside through the opposite substrate, which results in worsened display quality. However, it was necessary to form the shield electrode after bonding the array substrate and opposite substrate together and thinning the insulating substrate of the opposite substrate as necessary. Thus, the manufacturing process becomes more complex in order to form the shield electrode, which results in higher cost. In liquid crystal displays of vertical alignment (VA) mode or twisted nematic (TN) mode in which the common electrode is formed on the opposite substrate, the common electrode can double as a shield electrode.

In the present embodiment, the second common electrode 41 can double as the shield electrode, and thus, the liquid crystal display of the present embodiment need not include a shield electrode on the main surface of the opposite substrate 40 opposite to the liquid crystal layer 50. The second common electrode 41 can be formed continuously with members such as the BM 45, the color filters 46, and the overcoat film 47, and thus, from the perspective of simplifying the manufacturing process and reducing cost, it is preferable that the second common electrode 41 be formed instead of the shield electrode.

Patent Document 2 discloses using a conductive polarizing plate instead of a shield electrode, but patterning conductive portions on a polarizing plate as in the second common electrode 41 is difficult. Even if patterning were possible, it is difficult to accurately bond the polarizing plate onto the opposite substrate, or in other words, to bond the polarizing plate onto the opposite substrate such that the conductive portions face the first common electrode 31. Thus, it is preferable that the second common electrode 41 be used instead of a conductive polarizing plate.

Here, results of various simulations will be described. In the simulations below, a 3D liquid crystal simulator "ExpertLCD" made by Jedat was used.

Figure 10:
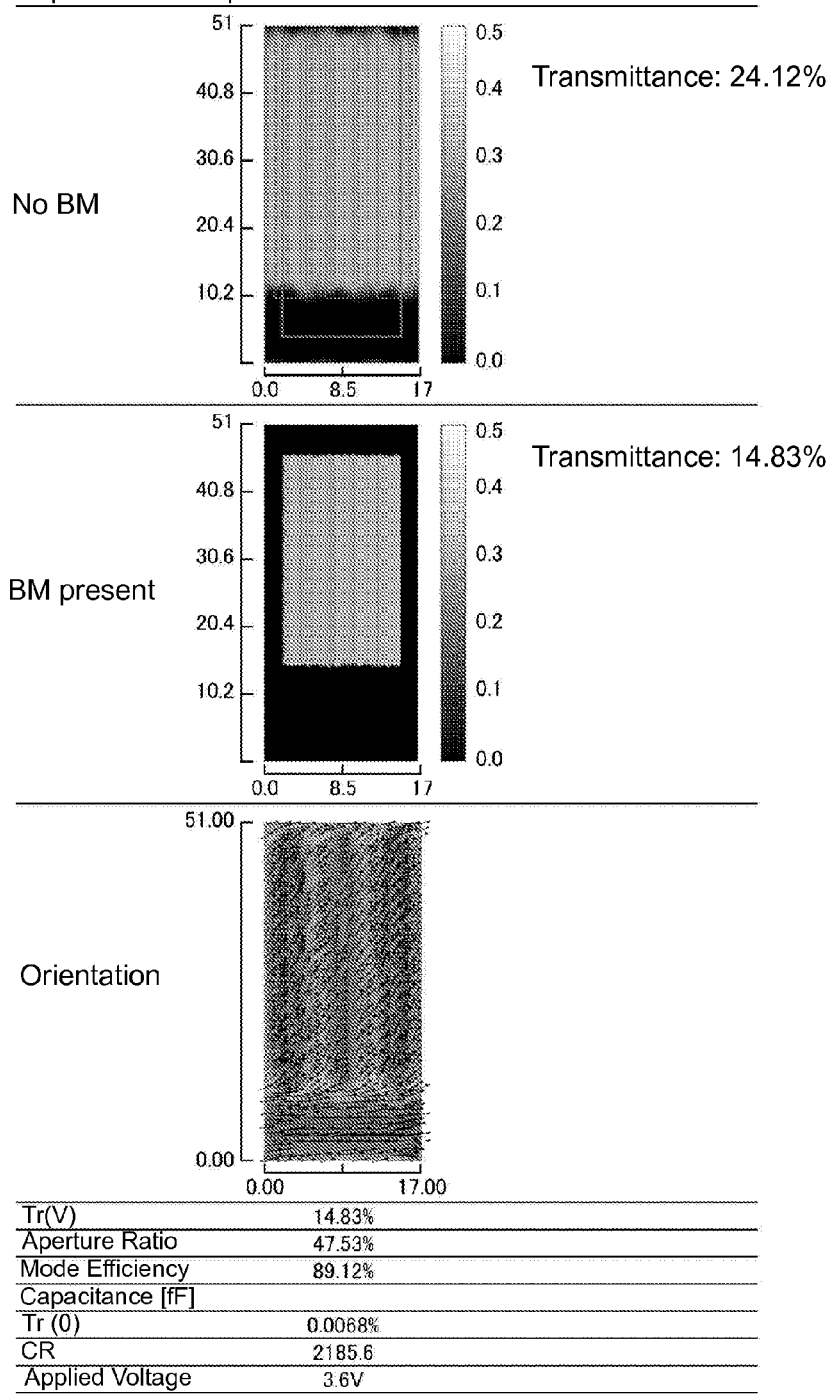
FIG. 10 shows simulation results of a liquid crystal display of Comparison Example 1.

First, a simulation was performed of a liquid crystal display of Comparison Example 1. The sub-pixels in the liquid crystal display of Comparison Example 1 have the same structure as sub-pixels of a typical FFS mode liquid crystal display, and this structure was designed such that maximum transmittance is exhibited. FIG. 10 shows simulation results of a liquid crystal display of Comparison Example 1. FIG. 10 shows respective values for a state in which 3.6V was applied to sub-pixels with and without a BM being formed, and the orientation state of the liquid crystal molecules when 3.6V was applied. Here, the angle between the slit of the pixel electrode and the long axis direction of the liquid crystal molecules when no voltage is being applied was set to 83°, and for the liquid crystal material, negative nematic liquid crystal (dielectric anisotropy $\Delta\epsilon=-5$, refractive index anisotropy $\Delta n=0.097$, refractive index for extraordinary light $ne=1.577$, refractive index for ordinary light $no=1.480$) was used.

The mode efficiency (%) is an index representing the shutter performance of liquid crystal with no polarizing plate being provided, and is calculated by the following formula: transmittance/aperture ratio/0.35×100. The value 0.35 represents the effect of the polarizing plate on transmittance. The aperture ratio (%) represents the proportion of the sub-pixel taken up by the region through which light can pass without being blocked by light-shielding members such as bus lines and the BM. The transmittance (%) is calculated by the following formula: (amount of light emitted from the liquid crystal panel)/(amount of light entering the liquid crystal panel)×100. Tr(V) is the transmittance for when the voltage written in the "applied voltage" row is applied to the pixel electrode, and Tr(0) is the transmittance for when no voltage is being applied. The contrast ratio (CR) is calculated by Tr(V)/Tr(0). These values are for when the BM is formed.

As shown in FIG. 10, in the liquid crystal display of Comparison Example 1, it was possible to thin out the dark lines by using the negative liquid crystal material and to improve mode efficiency. In addition, it was possible to achieve a relatively high transmittance.

Next, the simulation result for the liquid crystal display of the present embodiment will be described. Specifically, simulations were conducted for three sub-pixel structures (first to third pixel structures). Below, unless otherwise noted, the liquid crystal material was a negative nematic liquid crystal (dielectric anisotropy $\Delta\epsilon=-5$, refractive index anisotropy $\Delta n=0.097$, refractive index for extraordinary light $ne=1.577$, refractive index for ordinary light $no=1.480$).

Figure 11:
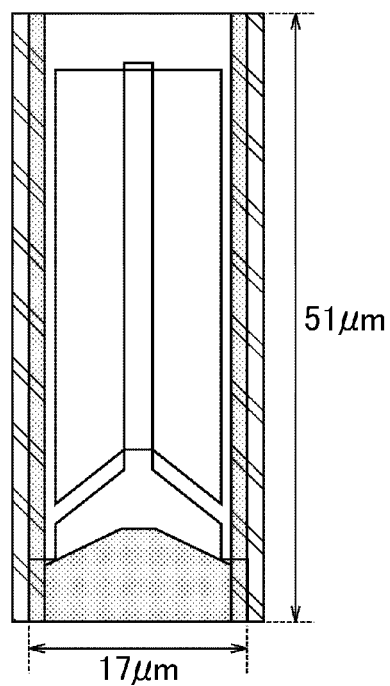
FIG. 11 is a schematic plan view of a first pixel structure of Embodiment 1 used in a simulation.
Figure 12:
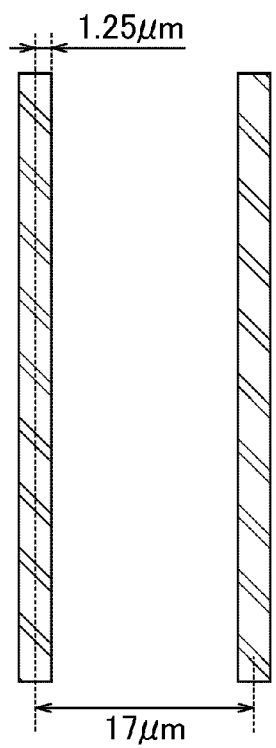
FIG. 12 is a schematic plan view of source bus lines in the first pixel structure.
Figure 13:
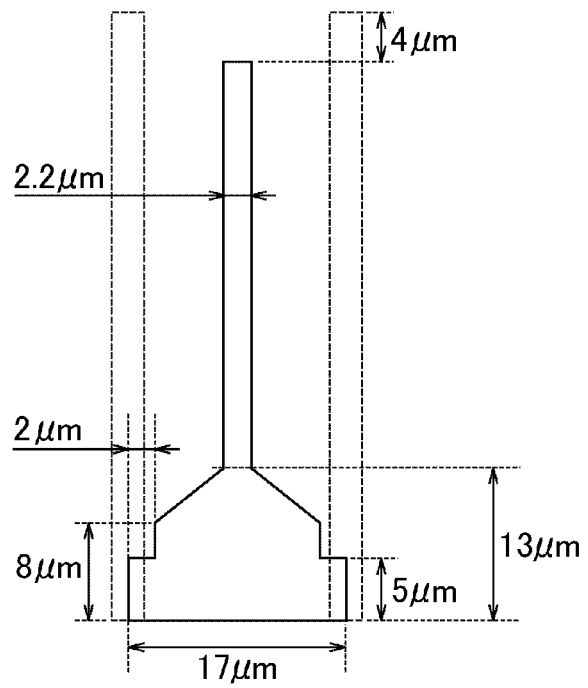
FIG. 13 is a schematic plan view of a pixel electrode in the first pixel structure.
Figure 14:
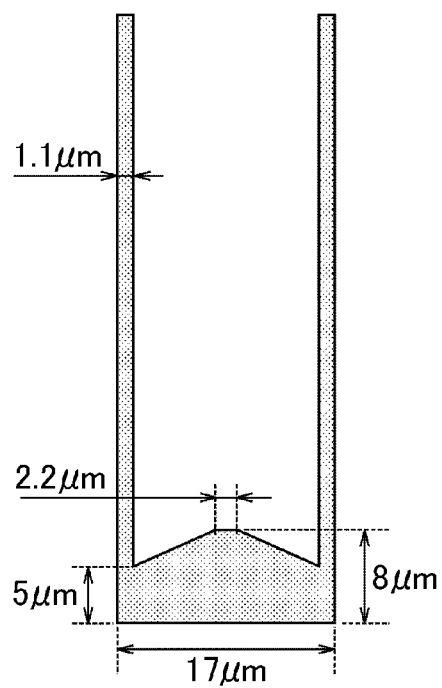
FIG. 14 is a schematic plan view of a first common electrode in the first pixel structure.
Figure 15:
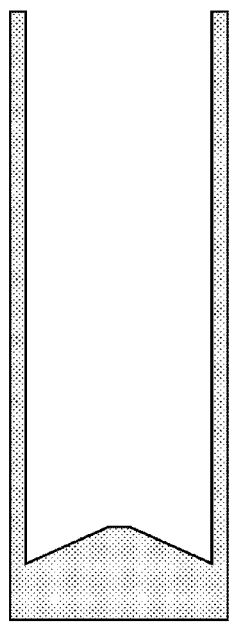
FIG. 15 is a schematic plan view of a second common electrode in the first pixel structure.
Figure 16:
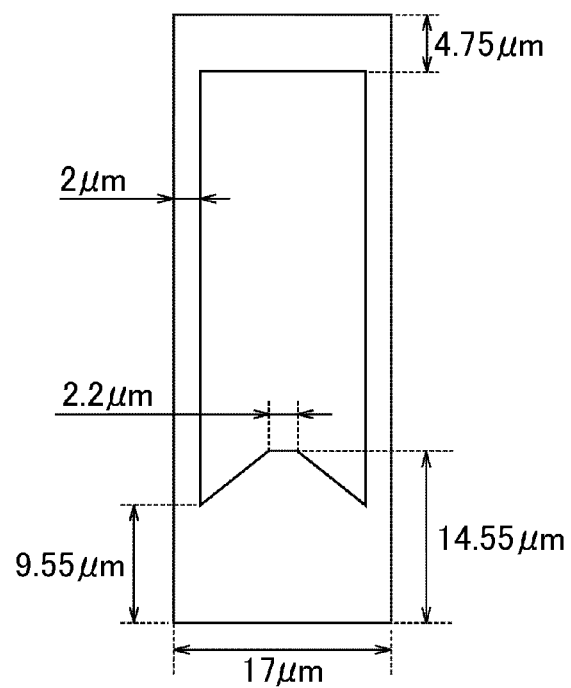
FIG. 16 is a schematic plan view of a BM in the first pixel structure.

FIG. 11 is a schematic plan view of a first pixel structure of Embodiment 1 used in a simulation. FIG. 12 is a schematic plan view of source bus lines in the first pixel structure. FIG. 13 is a schematic plan view of a pixel electrode in the first pixel structure. FIG. 14 is a schematic plan view of a first common electrode in the first pixel structure. FIG. 15 is a schematic plan view of a second common electrode in the first pixel structure. FIG. 16 is a schematic plan view of a BM in the first pixel structure. The broken lines in FIG. 13 show the source bus lines. The second common electrode has the same shape and size as the first common electrode.

Figure 17:
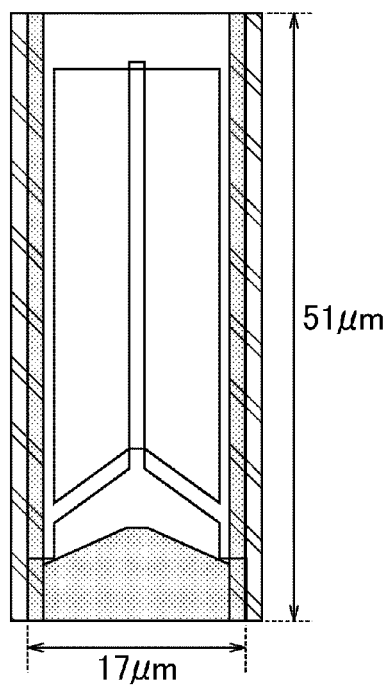
FIG. 17 is a schematic plan view of a second pixel structure of Embodiment 1 used in a simulation.
Figure 18:
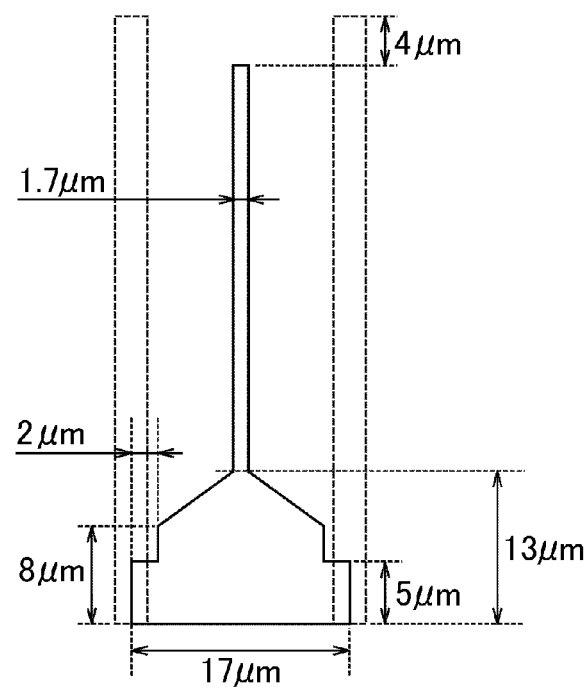
FIG. 18 is a schematic plan view of a pixel electrode in the second pixel structure.

FIG. 17 is a schematic plan view of a second pixel structure of Embodiment 1 used in a simulation. FIG. 18 is a schematic plan view of a pixel electrode in the second pixel structure. The broken lines in FIG. 18 show the source bus lines. The second pixel structure is the same as the first pixel structure other than that the linear portion of the pixel electrode was made thinner.

Figure 19:
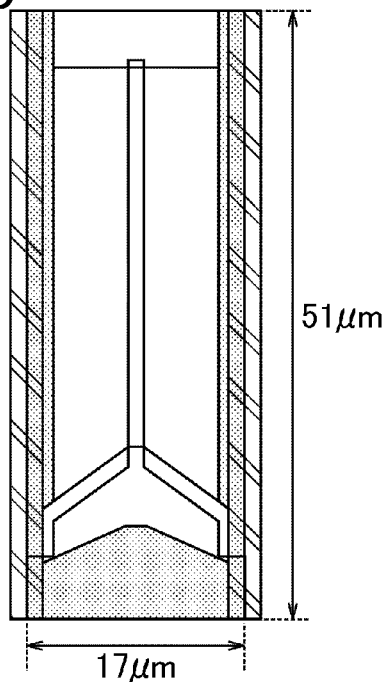
FIG. 19 is a schematic plan view of a third pixel structure of Embodiment 1 used in a simulation.
Figure 20:
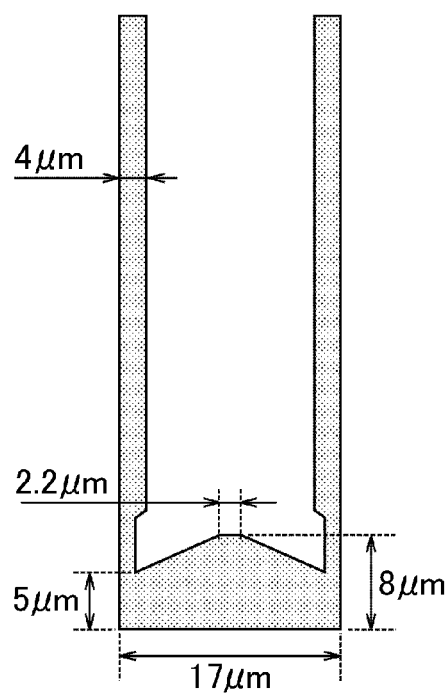
FIG. 20 is a schematic plan view of a first common electrode in the third pixel structure.

FIG. 19 is a schematic plan view of a third pixel structure of Embodiment 1 used in a simulation. FIG. 20 is a schematic plan view of a first common electrode in the third pixel structure. The third pixel structure is the same as the second pixel structure except that the linear portions of the first common electrode were made wider and that the edge portions of the linear portions of the first common electrode were made to match the position of the edge portions of the BM.

Figure 21:
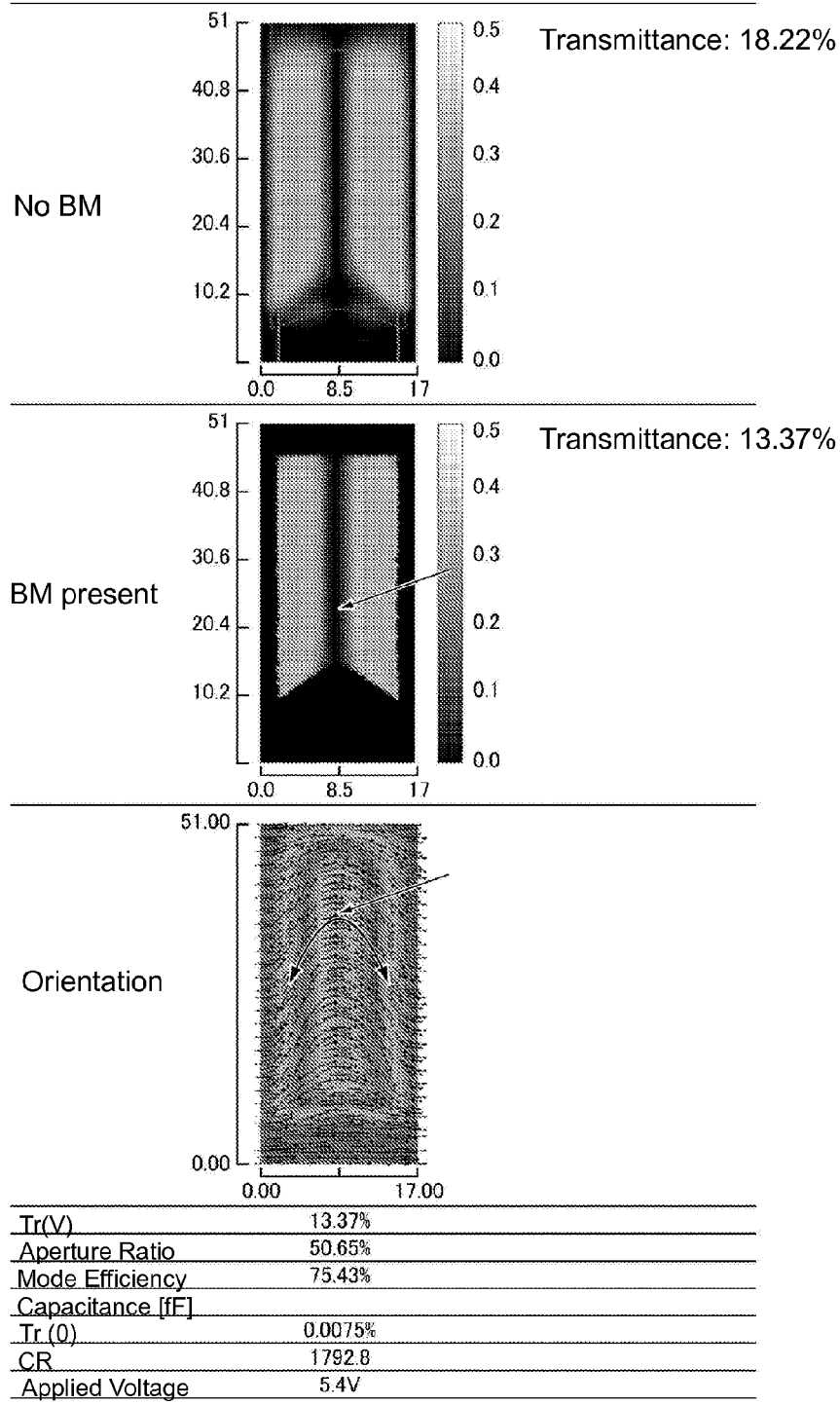
FIG. 21 shows simulation results of the first pixel structure.
Figure 22:
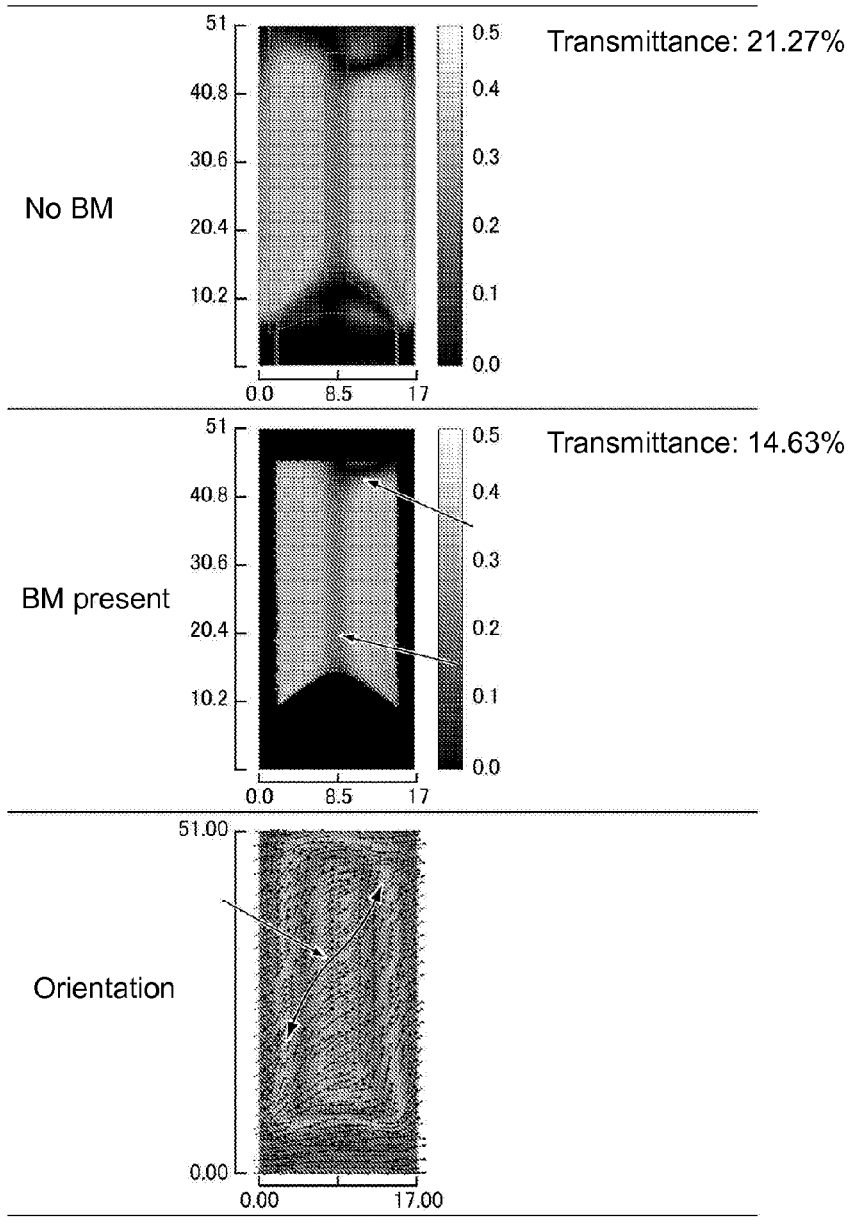
FIG. 22 shows simulation results of the first pixel structure.
Figure 23:
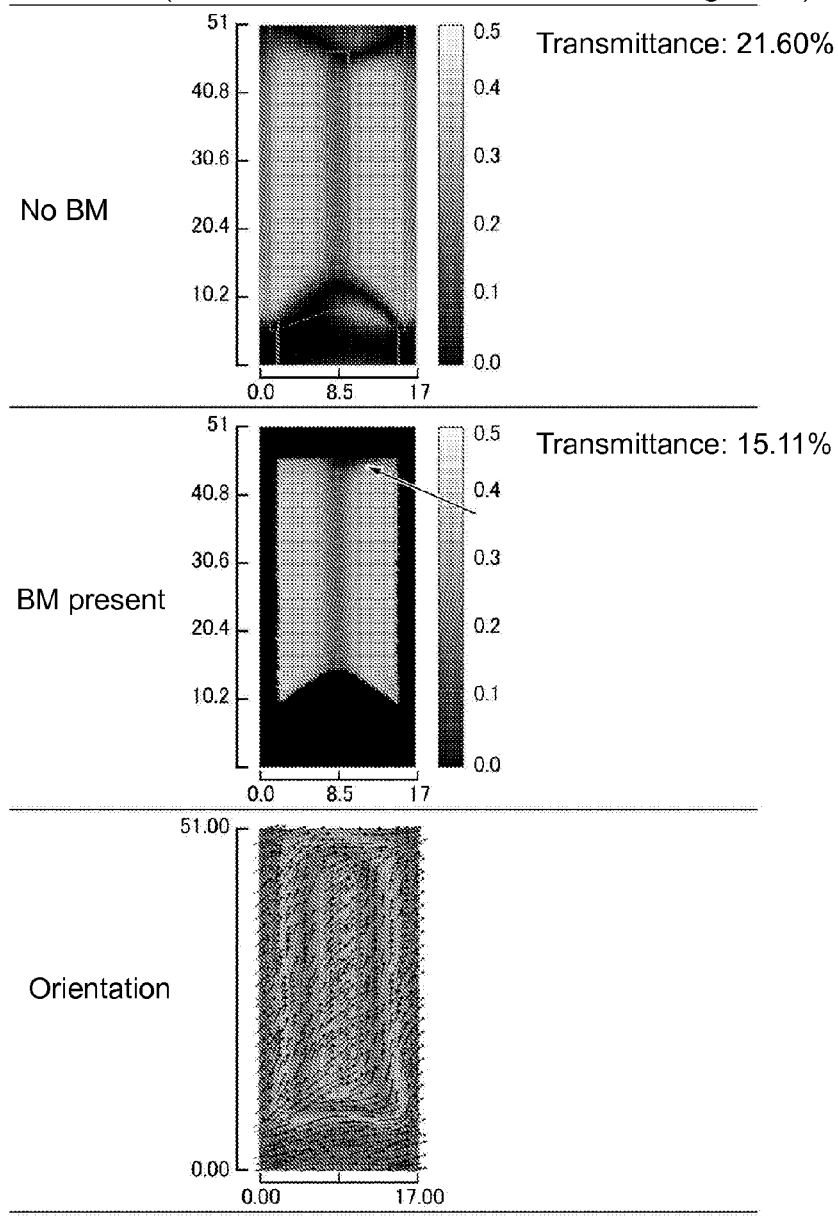
FIG. 23 shows simulation results of the first pixel structure.
Figure 24:
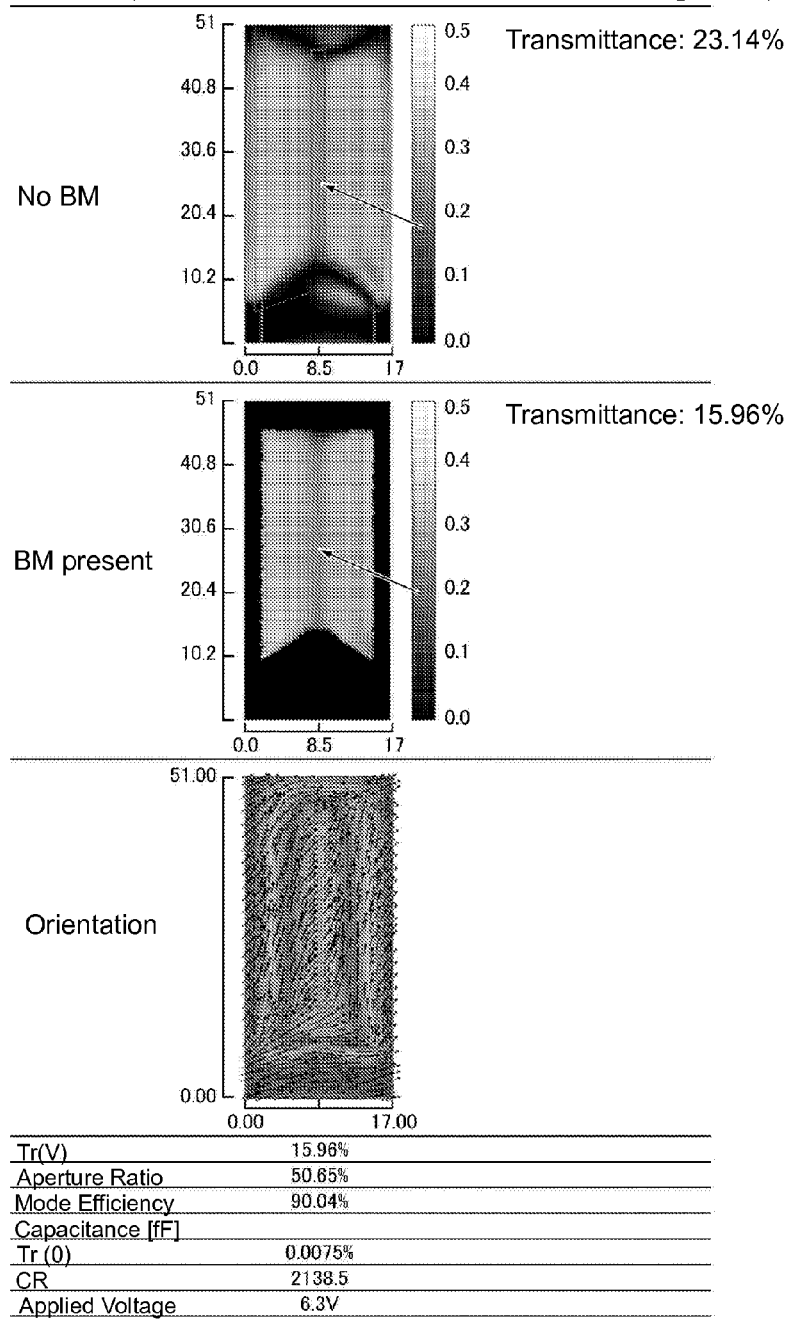
FIG. 24 shows simulation results of the second pixel structure.
Figure 25:
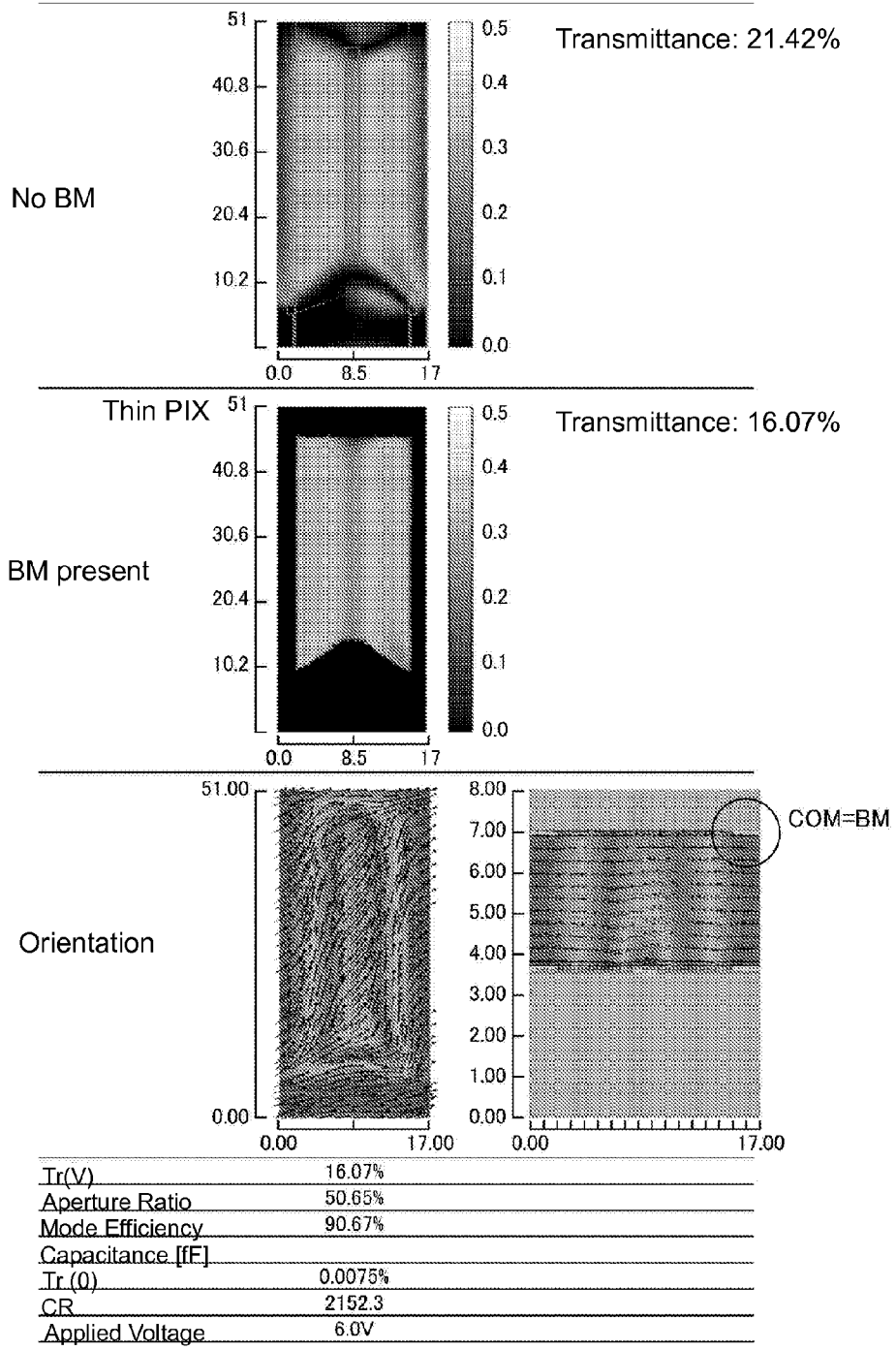
FIG. 25 shows simulation results of the third pixel structure.
Figure 26:
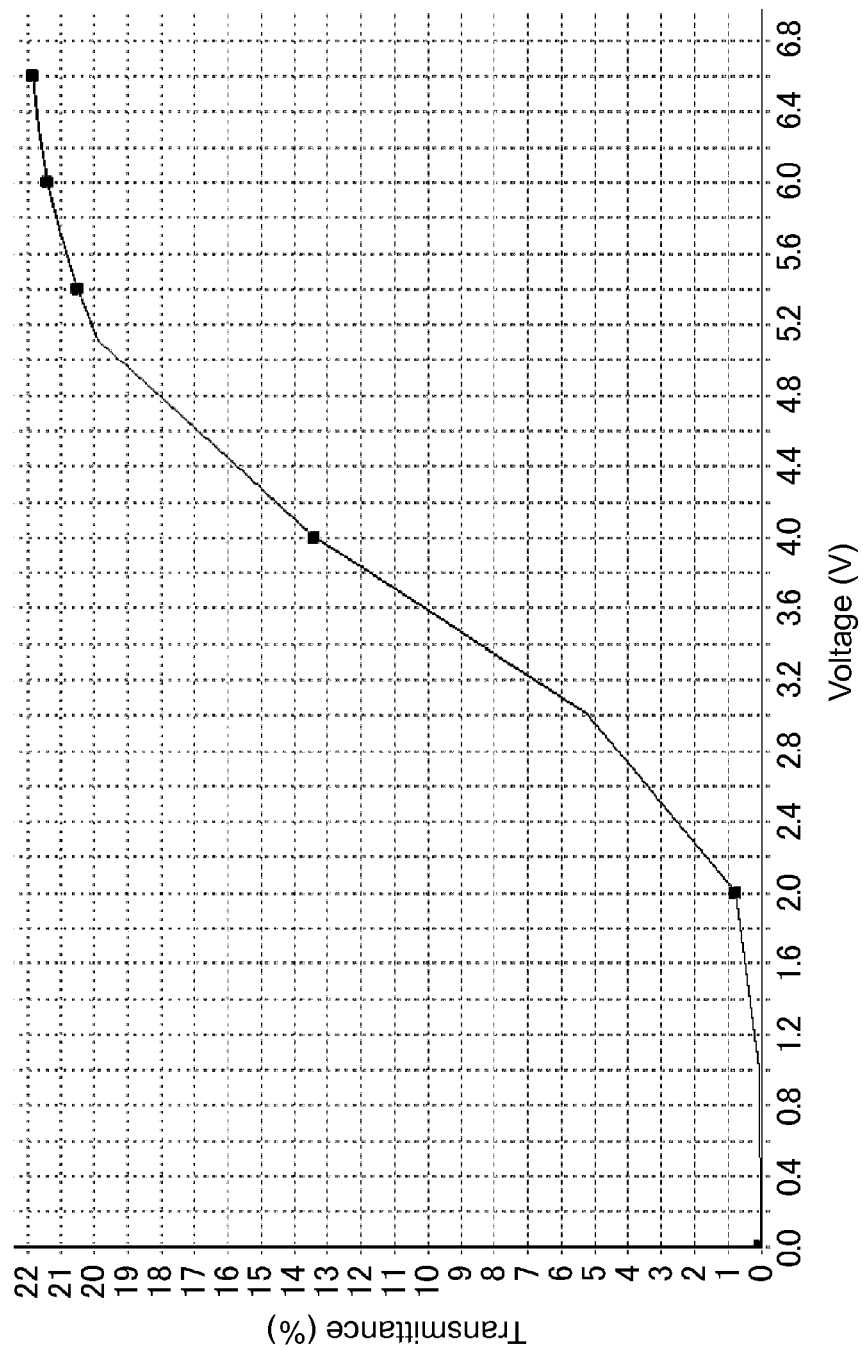
FIG. 26 is a graph showing voltage-transmittance characteristics (V-T curve) of the third pixel structure for a case in which a BM is not formed.
Figure 27:
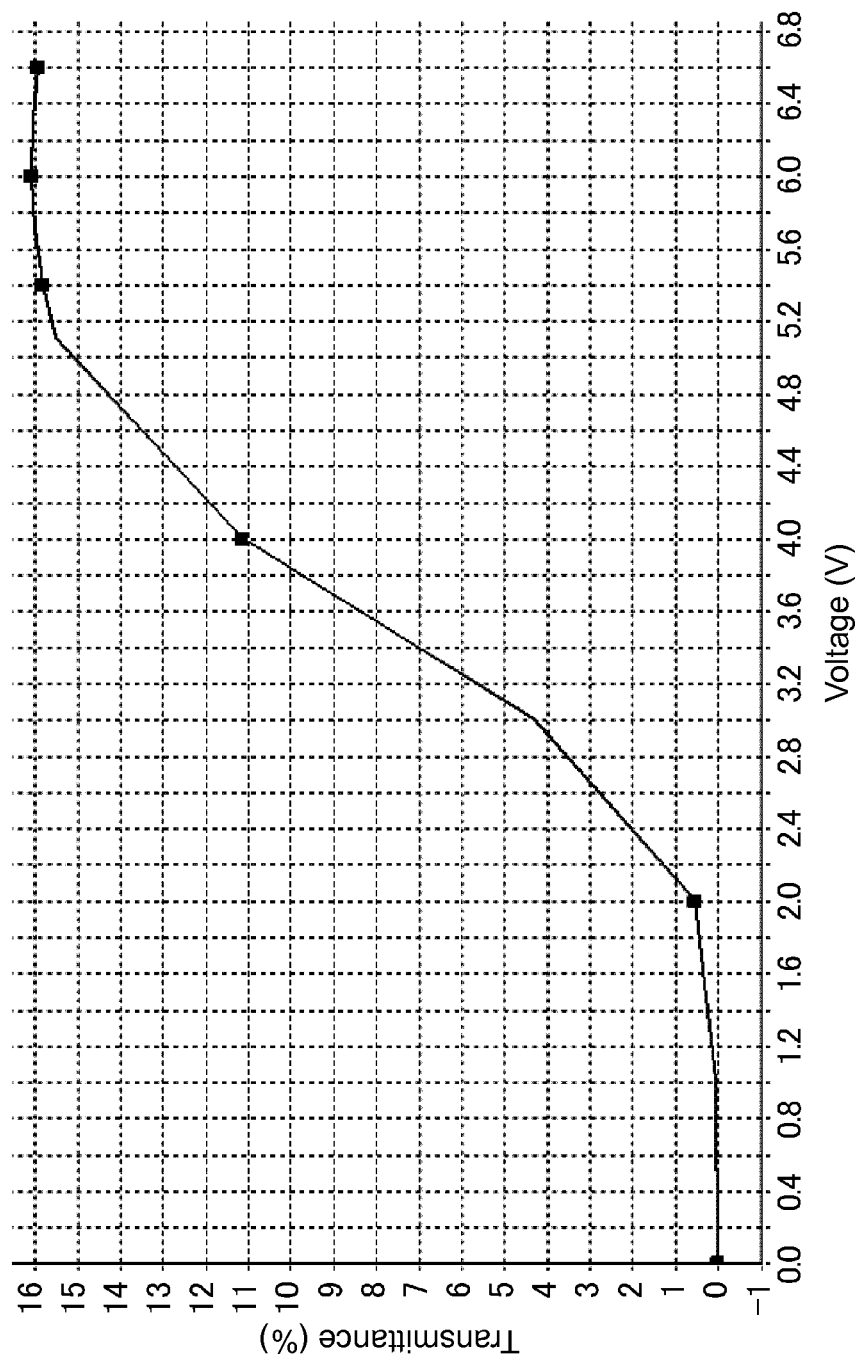
FIG. 27 is a graph showing voltage-transmittance characteristics (V-T curve) of the third pixel structure for a case in which a BM is formed.

FIGS. 21 to 23 show simulation results of the first pixel structure, FIG. 24 shows simulation results of the second pixel structure, and FIG. 25 shows simulation results of the third pixel structure. In the respective drawings, respective values are shown for a state in which a voltage (the voltage written in the "applied voltage" row) was applied to sub-pixels with and without a BM being formed, and the orientation state of the liquid crystal molecules when the voltage (the voltage written in the "applied voltage" row) was applied. In FIGS. 21, 22, and 23, the initial orientation angles (angle formed between the long axis direction of the liquid crystal molecules and the lengthwise direction of the linear portions of the pixel electrode in a plan view when no voltage is being applied) were respectively set to 90°, 83°, and 70°, and in FIGS. 24 and 25, the initial orientation angle was set to 70°. FIG. 26 is a graph showing the voltage-transmittance characteristics (V-T curve) for the third pixel structure when no BM is formed, and FIG. 27 is a graph showing the voltage-transmittance characteristics (V-T curve) for the third pixel structure when a BM has been formed.

As shown in FIG. 21, there is a great difference in orientation direction of the liquid crystal molecules between the first pixel structure and a typical FFS mode structure. Thus, it is thought that the mode efficiency is less for the first pixel structure than in the typical FFS mode sub-pixel structure.

As shown in FIG. 22, by offsetting the orientation direction of the liquid crystal molecules from the extension direction of the linear portion of the pixel electrode, it was possible to have the orientation directions of the liquid crystal molecules match when a voltage is being applied. As a result, it was possible to thin out the dark line on the linear portion and to improve transmittance. However, a new dark line was formed in the corner of the sub-pixel.

As shown in FIG. 23, by reducing the initial orientation angle to 70°, it was possible to reduce the appearance of the dark line in the corner. However, the applied voltage increased.

As shown in FIG. 24, by thinning out the linear portion of the pixel electrode, it was possible to further improve transmittance. This is thought to be because it was possible to further thin out the dark line on the linear portion and to almost completely eliminate the dark line in the corner.

On the other hand, in a typical FFS mode liquid crystal display, the capacitance of the storage capacitor formed in portions where the pixel electrode and the common electrode overlap changes as a result of minute changes in the pixel electrode width, and thus, thinning out the pixel electrodes results in display unevenness. However, in the present embodiment, the capacitance of the storage capacitor does not change even if the width of the linear portion of the pixel electrode changes, and thus, it is possible to thin out the linear portion of the pixel electrode.

As shown in FIG. 25, by forming the linear portions of the first common electrode closer to the linear portion of the pixel electrode, it was possible to reduce the applied voltage and further improve the transmittance.

Next, the relation between the initial orientation angle and the transmittance in the present embodiment will be explained. Here, a simulation was performed while changing the initial orientation angle within a range of 90° to 55° in the first pixel structure.

Figure 28:
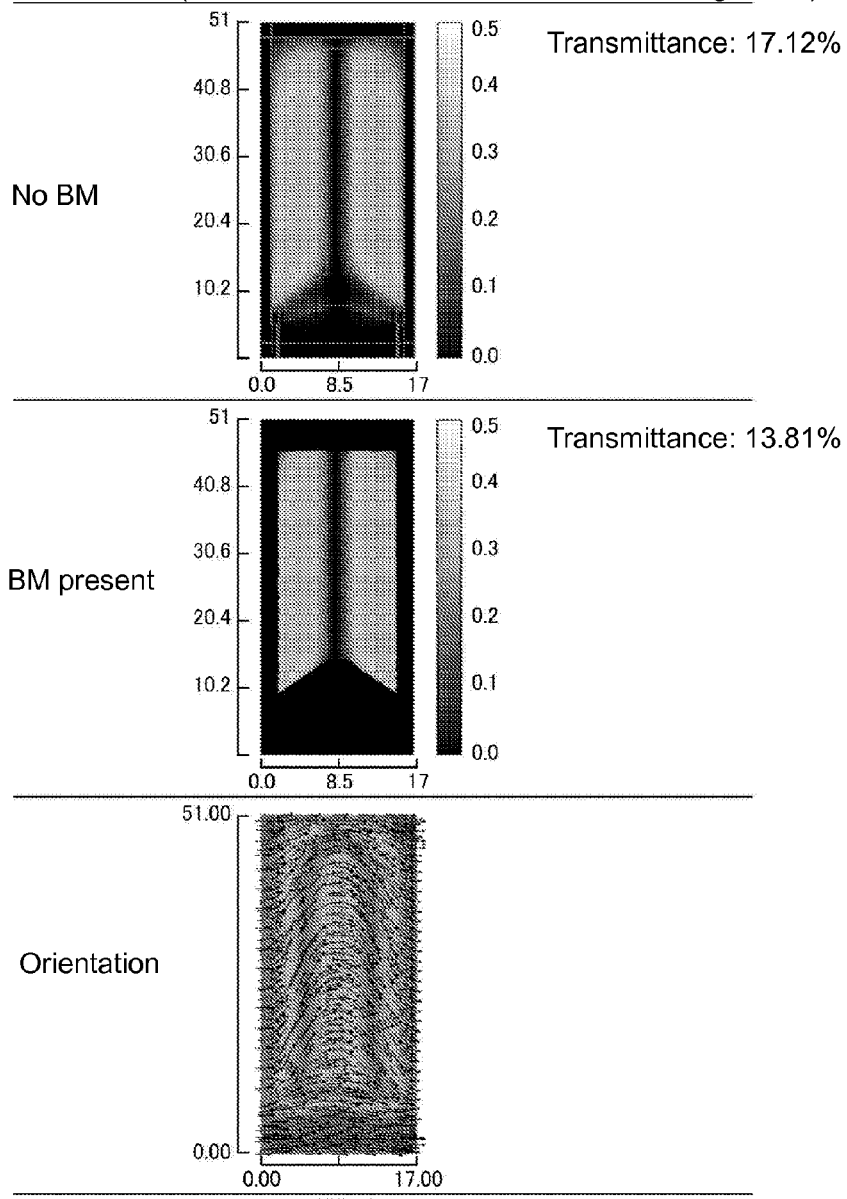
FIG. 28 shows simulation results of the first pixel structure.
Figure 29:
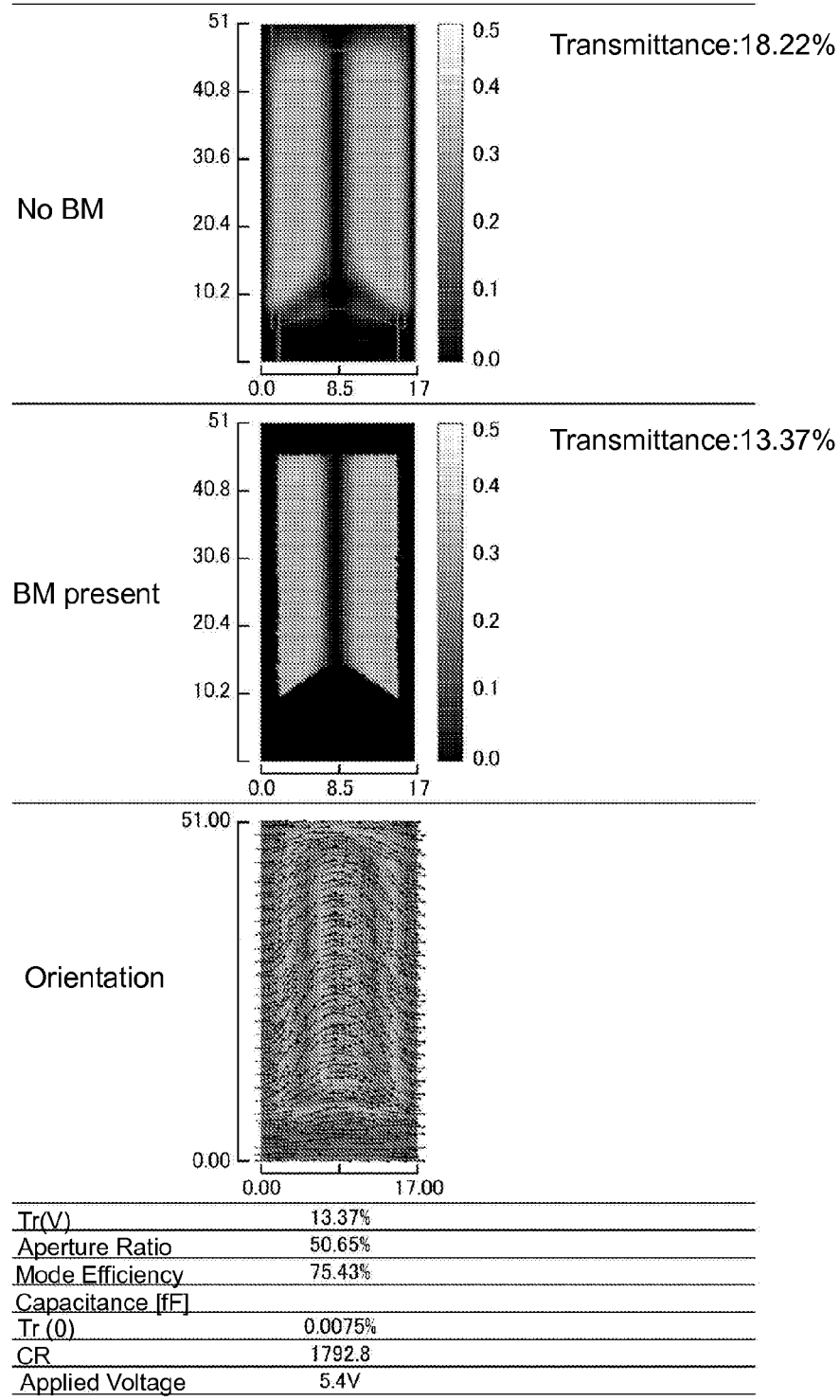
FIG. 29 shows simulation results of the first pixel structure.
Figure 30:
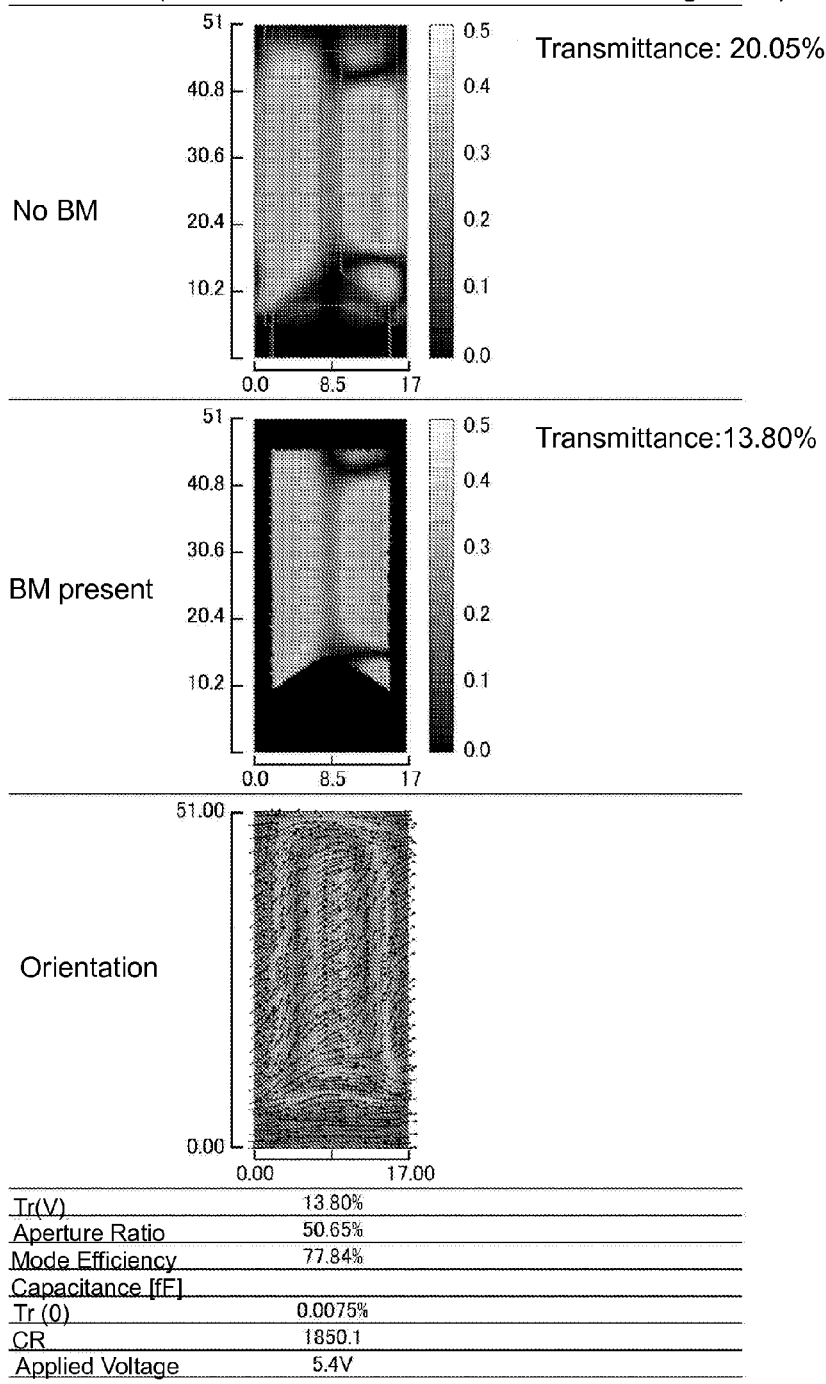
FIG. 30 shows simulation results of the first pixel structure.
Figure 31:
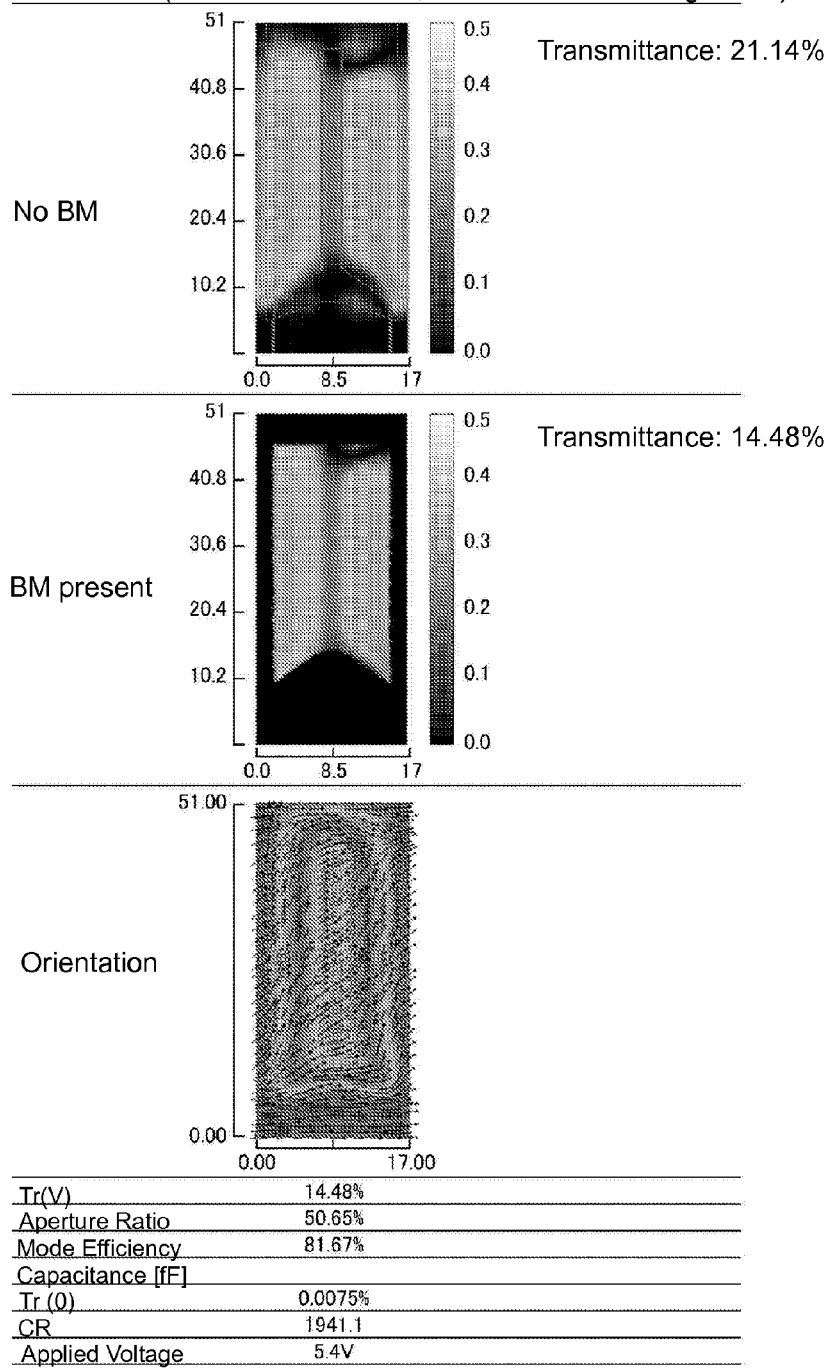
FIG. 31 shows simulation results of the first pixel structure.
Figure 32:
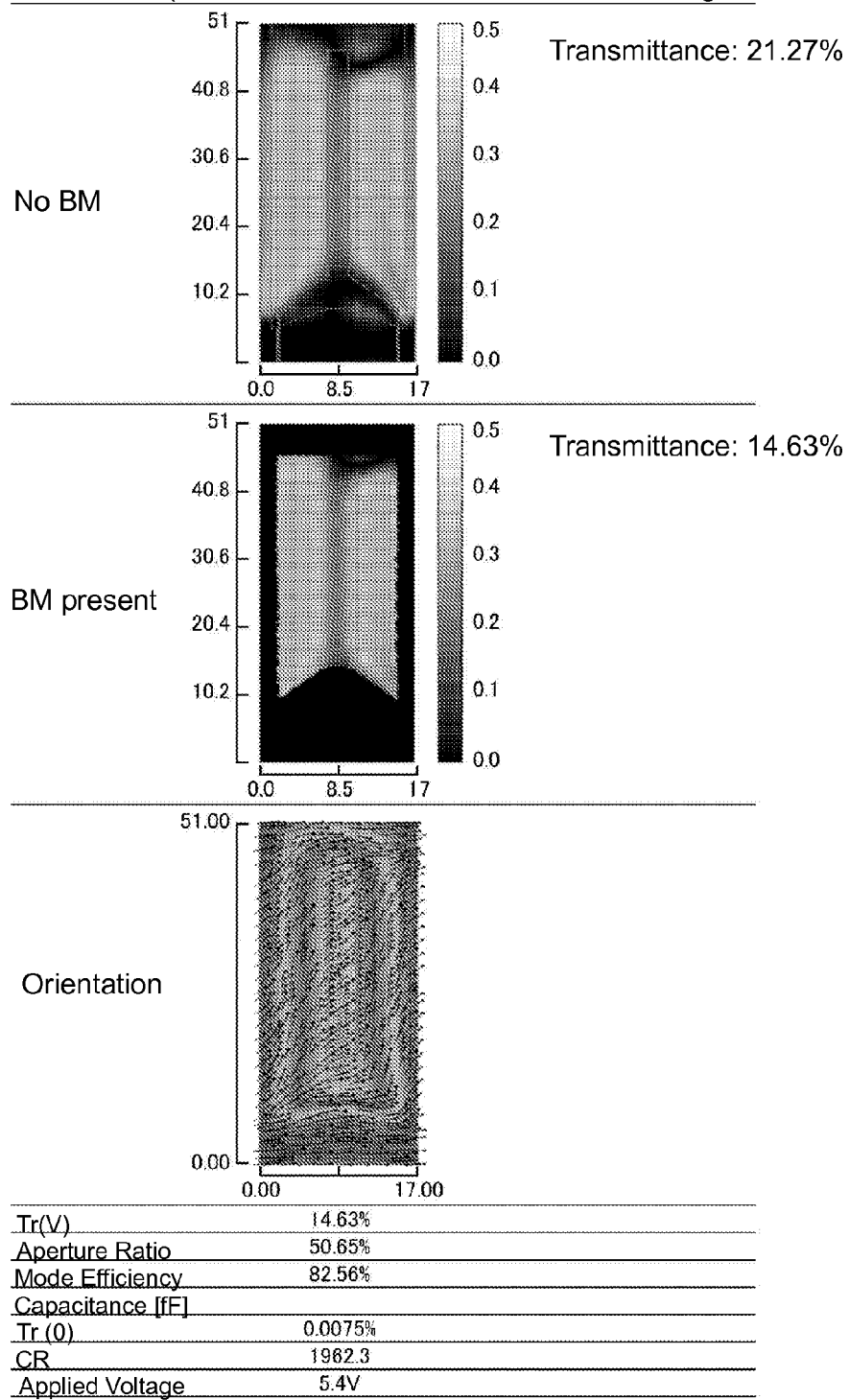
FIG. 32 shows simulation results of the first pixel structure.
Figure 33:
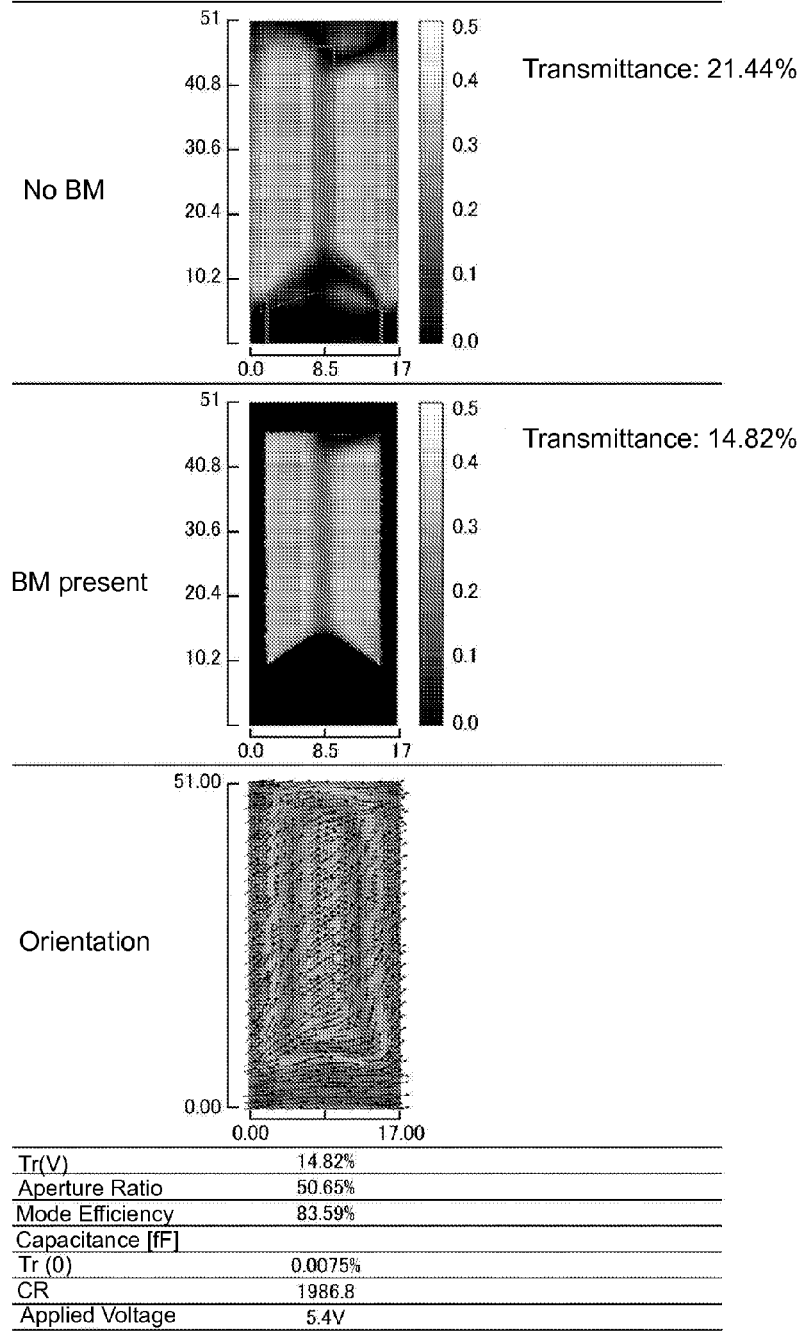
FIG. 33 shows simulation results of the first pixel structure.
Figure 34:
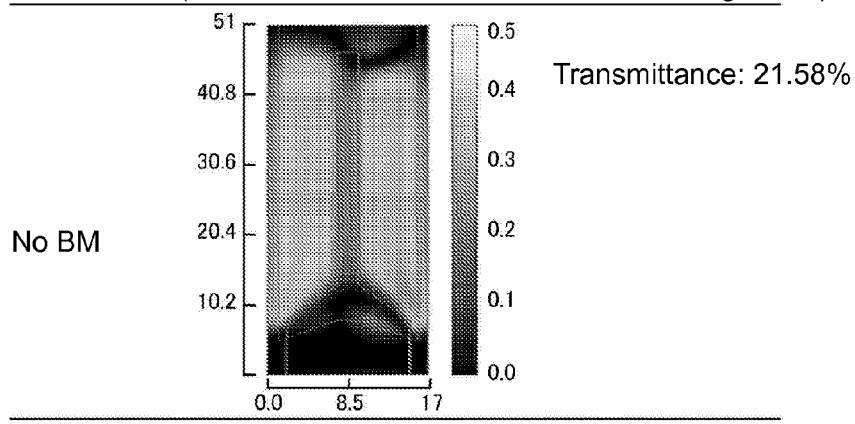
FIG. 34 shows simulation results of the first pixel structure.
Figure 34:
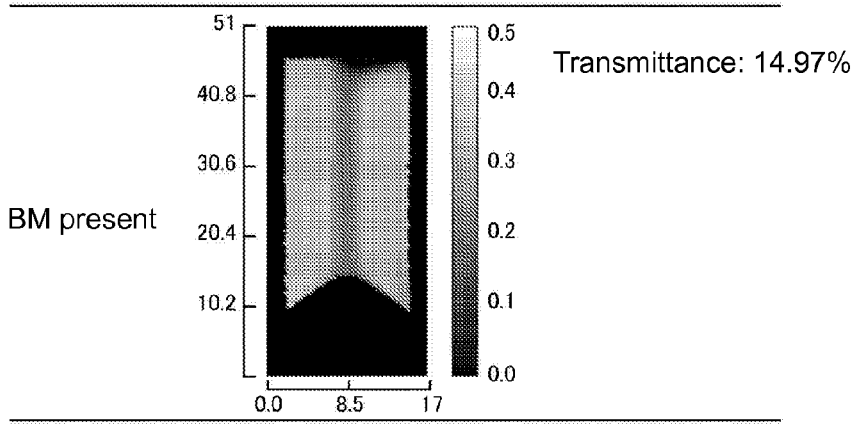
Figure 34:
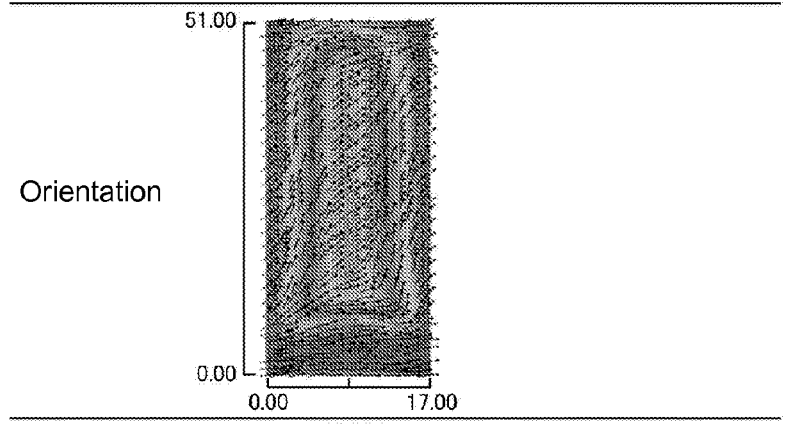
Figure 35:
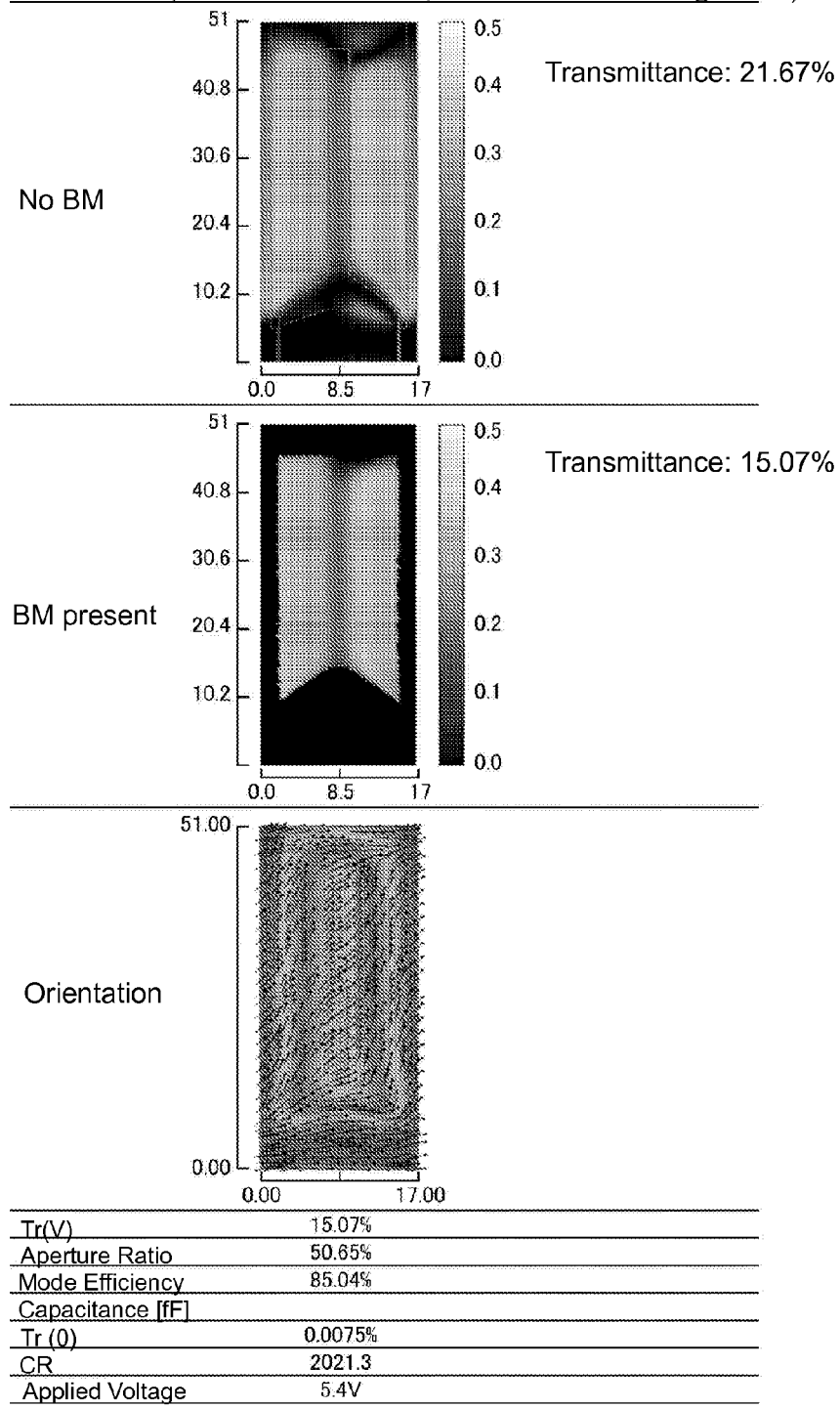
FIG. 35 shows simulation results of the first pixel structure.
Figure 36:
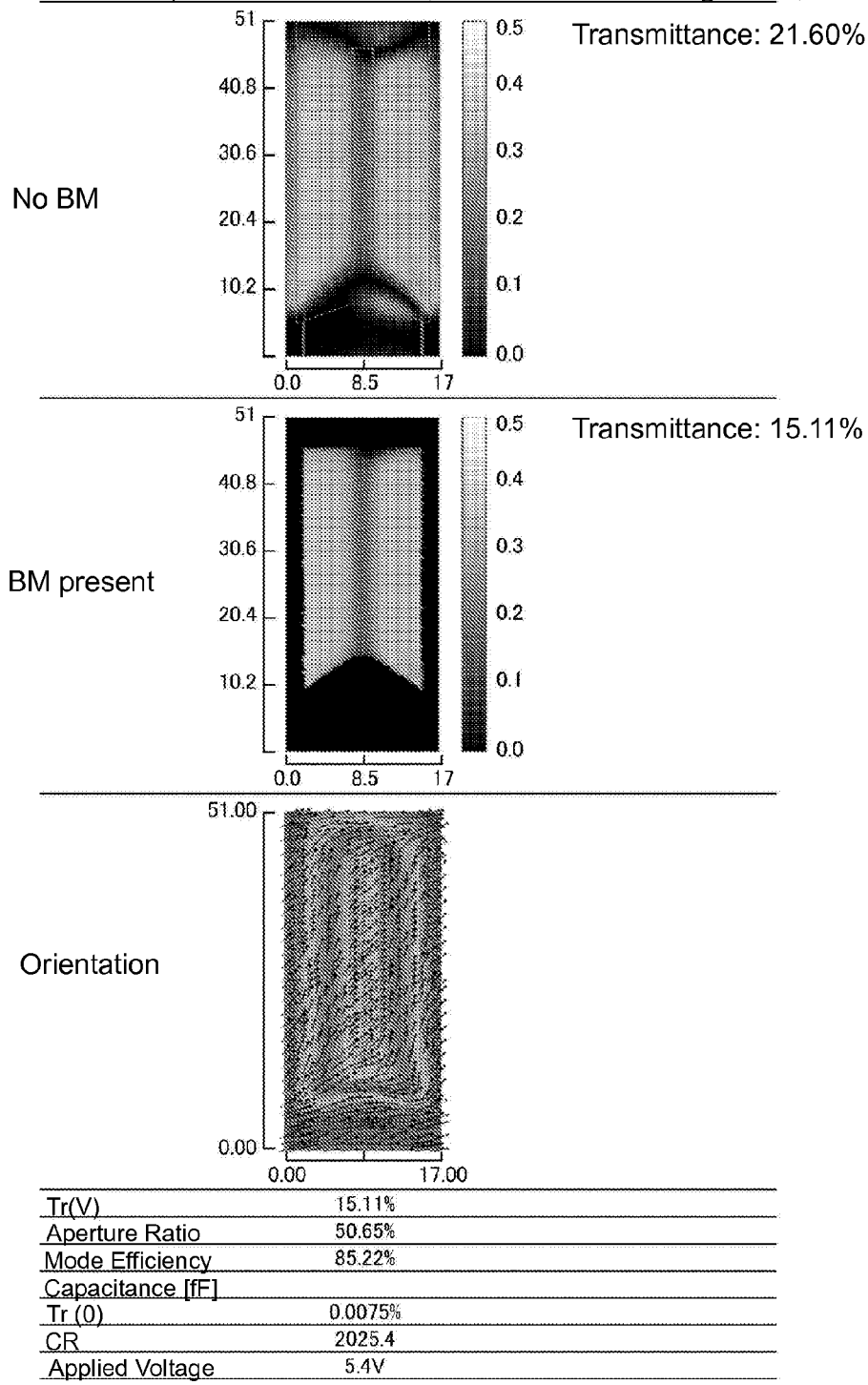
FIG. 36 shows simulation results of the first pixel structure.
Figure 37:
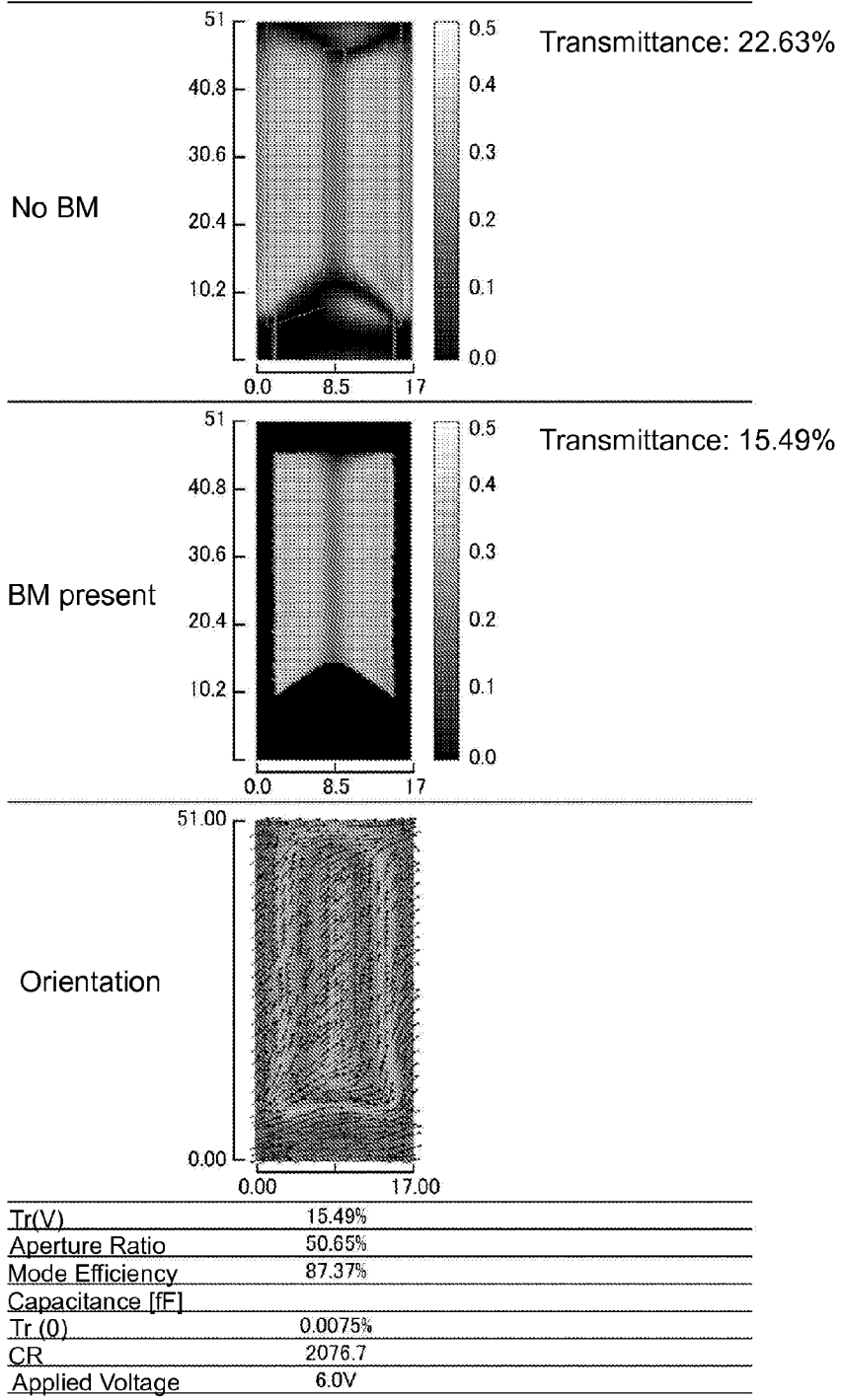
FIG. 37 shows simulation results of the first pixel structure.
Figure 38:
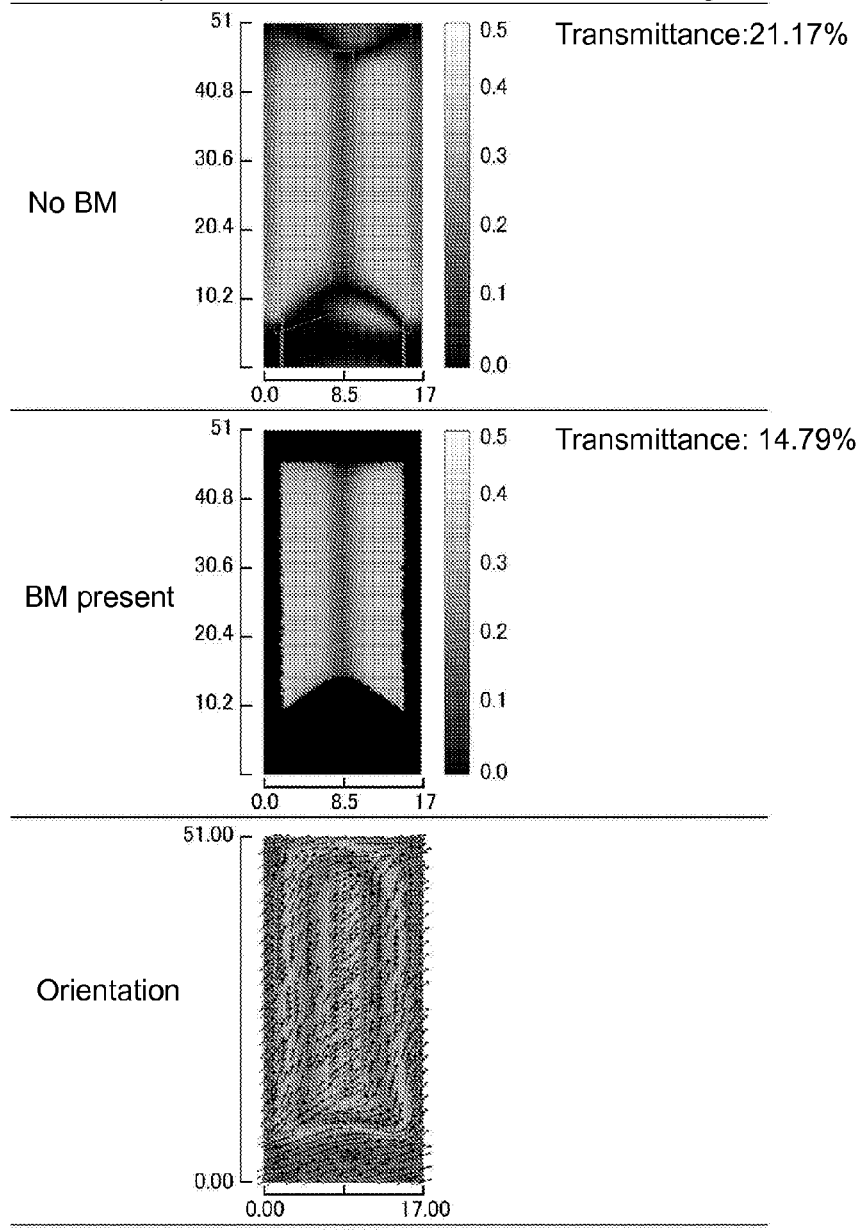
FIG. 38 shows simulation results of the first pixel structure.
Figure 39:
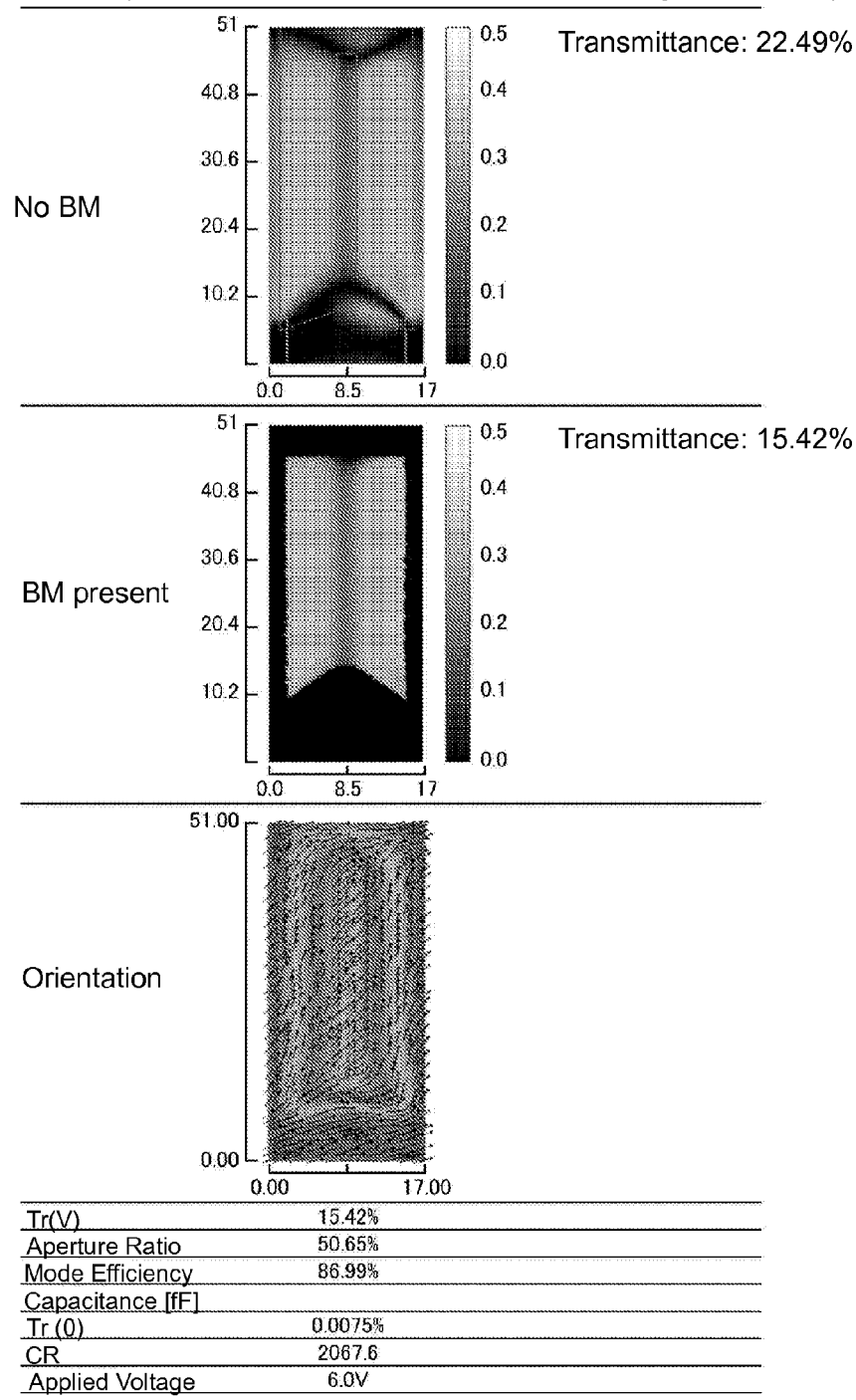
FIG. 39 shows simulation results of the first pixel structure.
Figure 40:
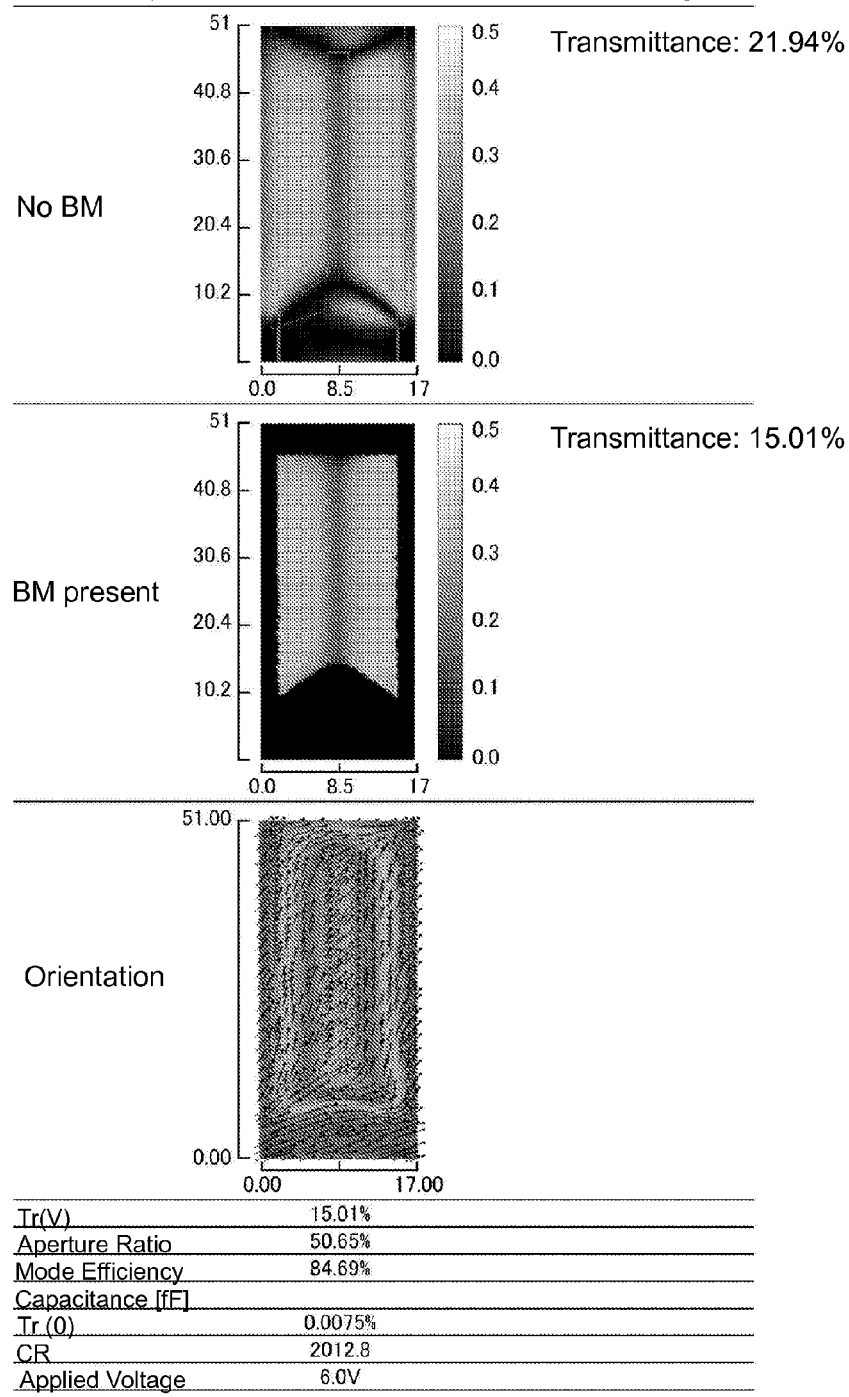
FIG. 40 shows simulation results of the first pixel structure.
Figure 41:
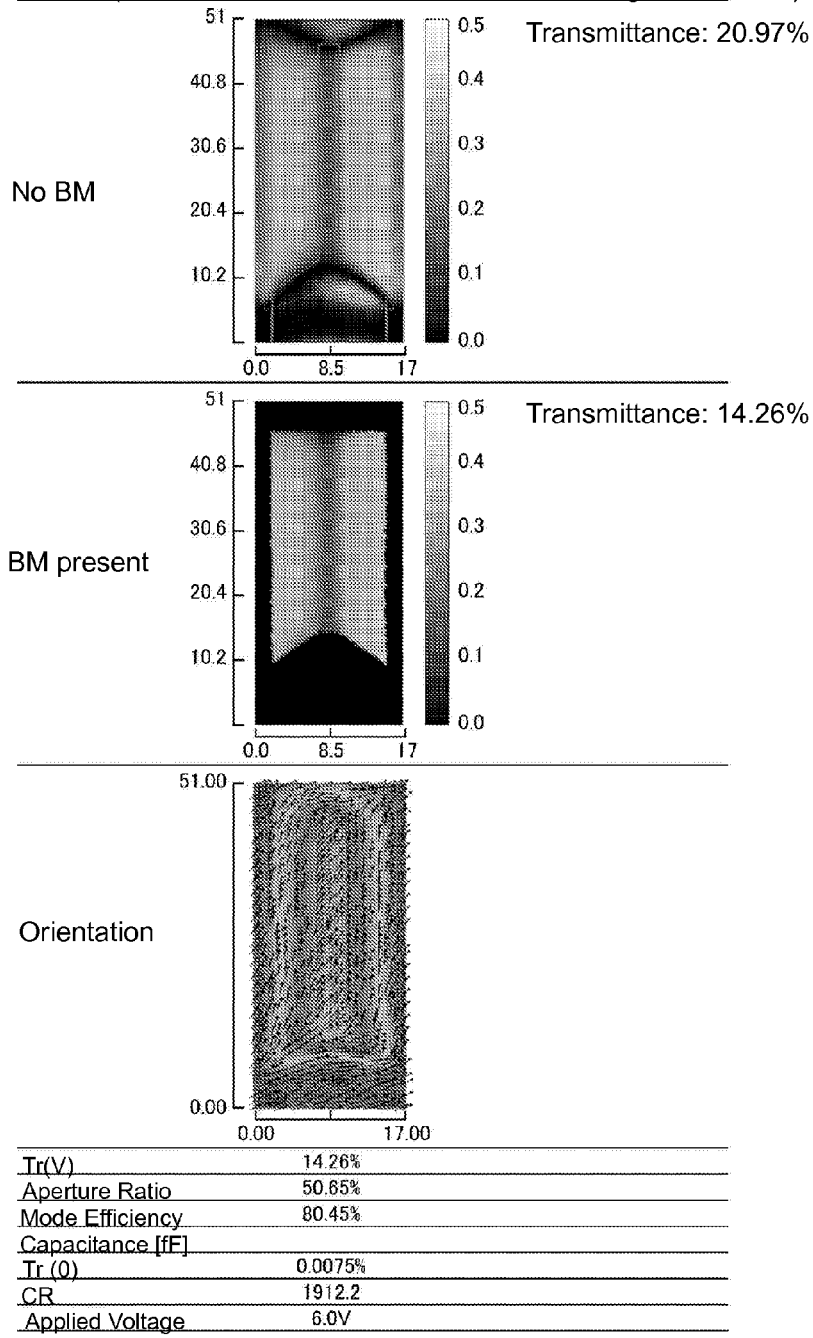
FIG. 41 shows simulation results of the first pixel structure.

All of FIGS. 28 to 41 show simulation results for the first pixel structure. FIGS. 28 and 29 show simulation results under exactly the same conditions other than that the calculation accuracy differing, and the calculation accuracy for only FIG. 28 was made higher than for FIGS. 29 to 41. From the results shown in FIGS. 28 to 41, it was found that it is possible to attain a higher transmittance than for the liquid crystal display of Comparison Example 1 as long as the initial orientation angle is 60° to 80° inclusive.

Next, in the present embodiment, the simulation results will be described for a case in which the shape of the first common electrode is changed. Specifically, a simulation was performed with an opening formed in the first common electrode in the first pixel structure.

Figure 42:
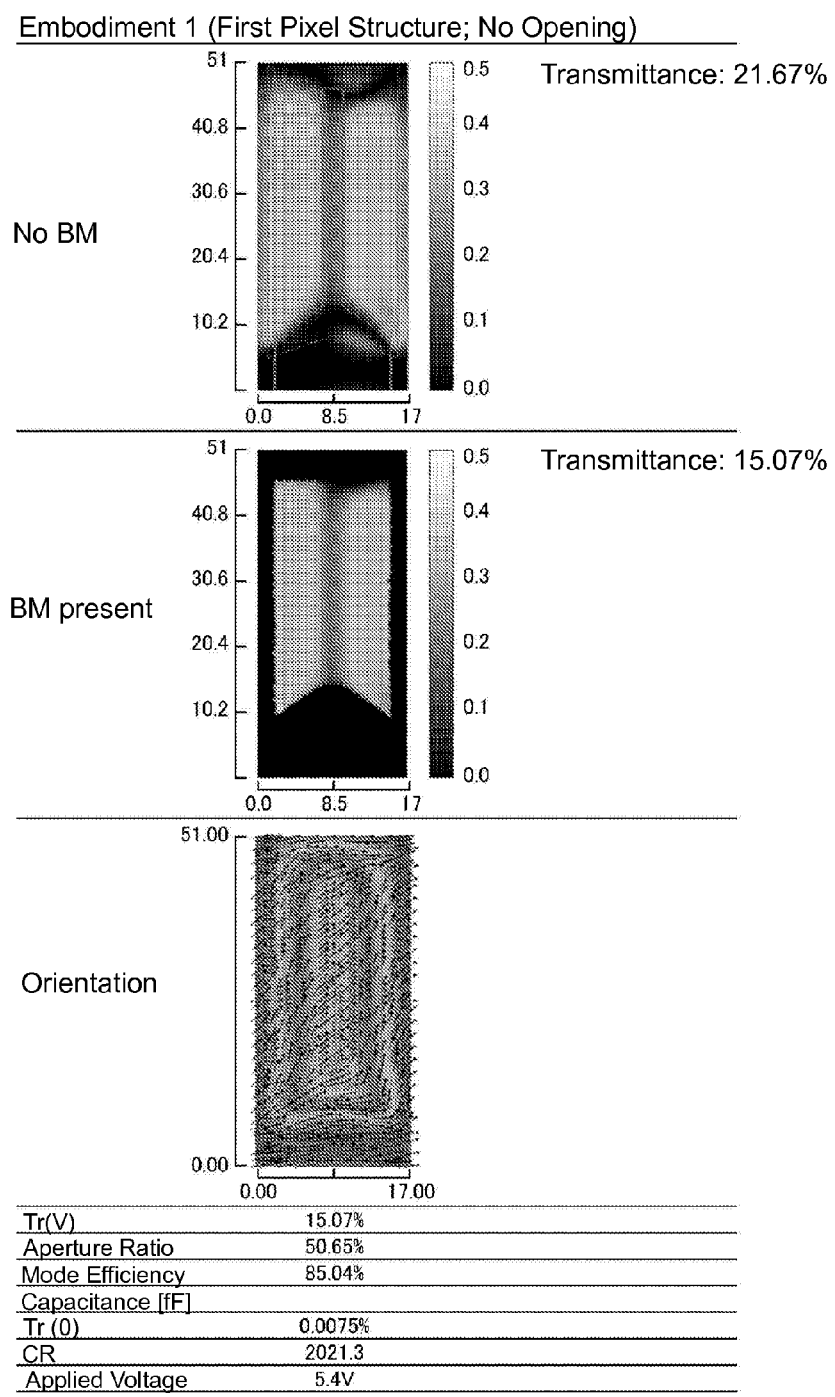
FIG. 42 shows simulation results of the first pixel structure.
Figure 43:
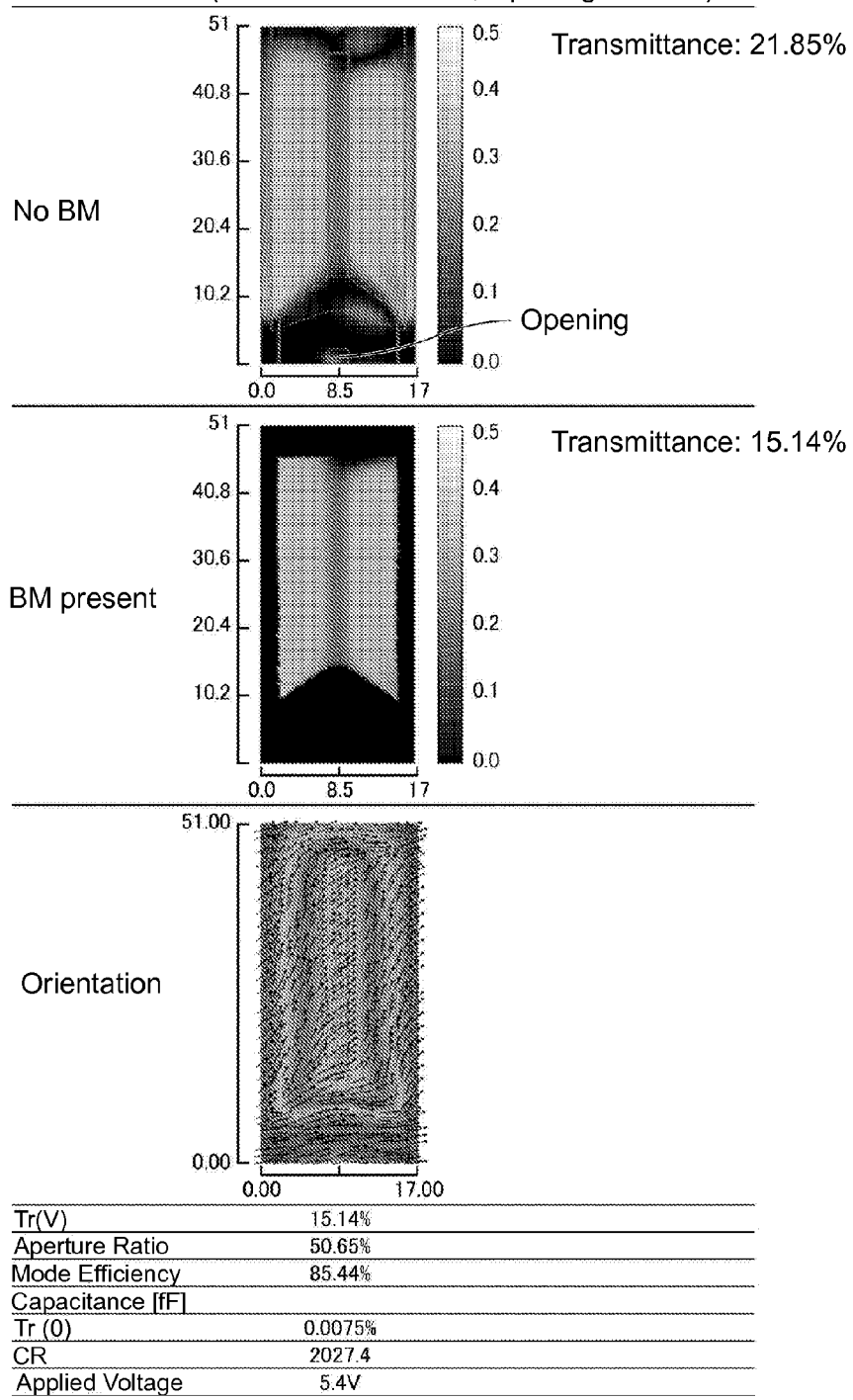
FIG. 43 shows simulation results of the first pixel structure.
Figure 44:
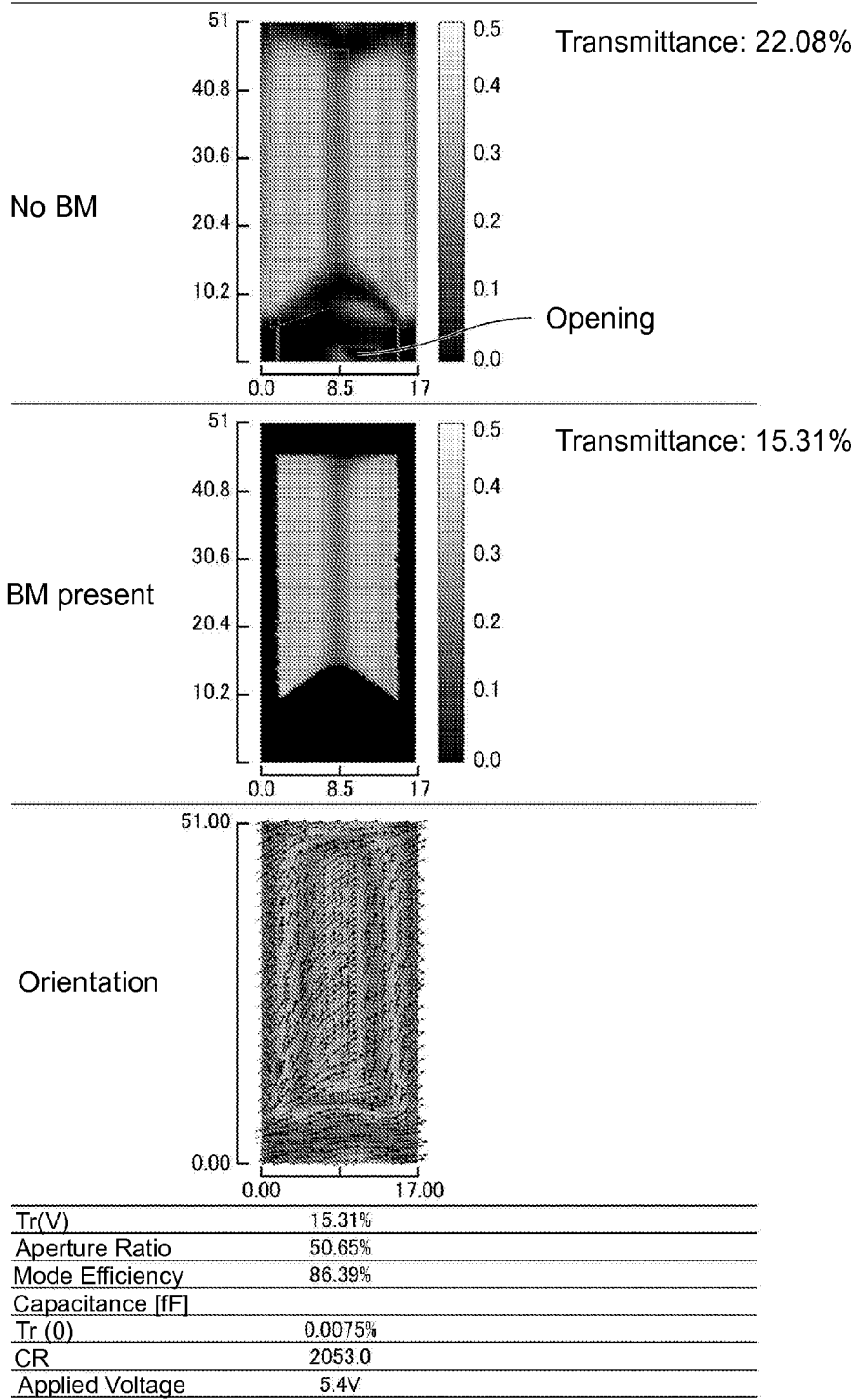
FIG. 44 shows simulation results of the first pixel structure.

All of FIGS. 42 to 44 show simulation results for the first pixel structure. FIG. 42 shows a case in which no opening was formed in the first common electrode, and FIGS. 43 and 44 show cases in which an opening was formed in the first common electrode. In both cases the initial orientation angle was set to 77°. As a result, it was found that high transmittance can be achieved even with the opening being provided.

Next, simulation results will be described in which the shape of the connecting portion of the pixel electrode and the shape of the connecting portions of the first and second common electrodes were changed in the present embodiment. Specifically, simulations were conducted for nine sub-pixel structures (fourth to twelfth pixel structures). The fourth to twelfth pixel structures are the same as the first pixel structure other than the shape of the pixel electrode and the shape of the first and second common electrodes being different. Even in the fourth to twelfth pixel structures, the second common electrode has the same shape and size as the first common electrode.

Figure 45:
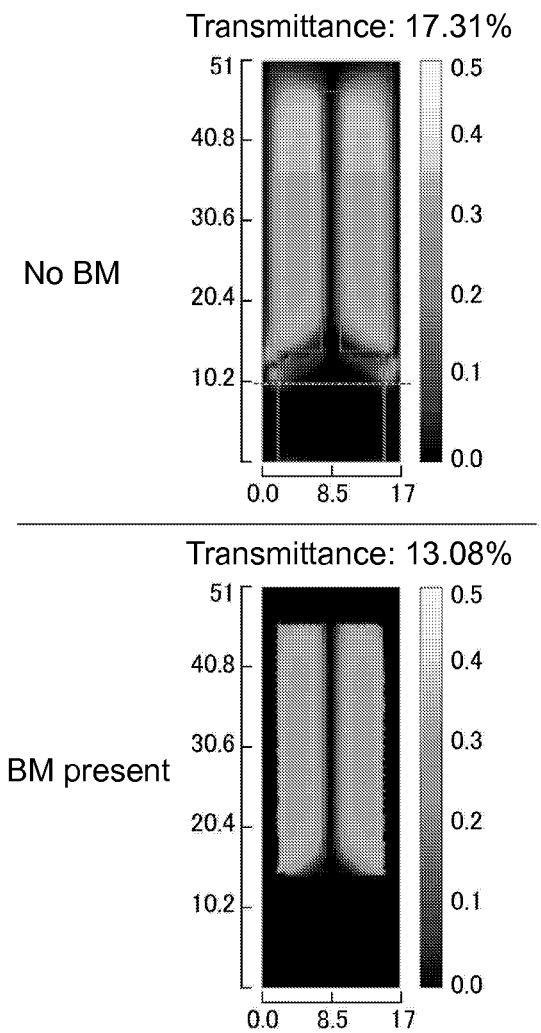
FIG. 45 shows simulation results of the fourth pixel structure.

FIG. 45 shows simulation results of the fourth pixel structure. In the fourth pixel structure, both the connecting portion of the pixel electrode and the connecting portion of the first common electrode are rectangular.

Figure 46:
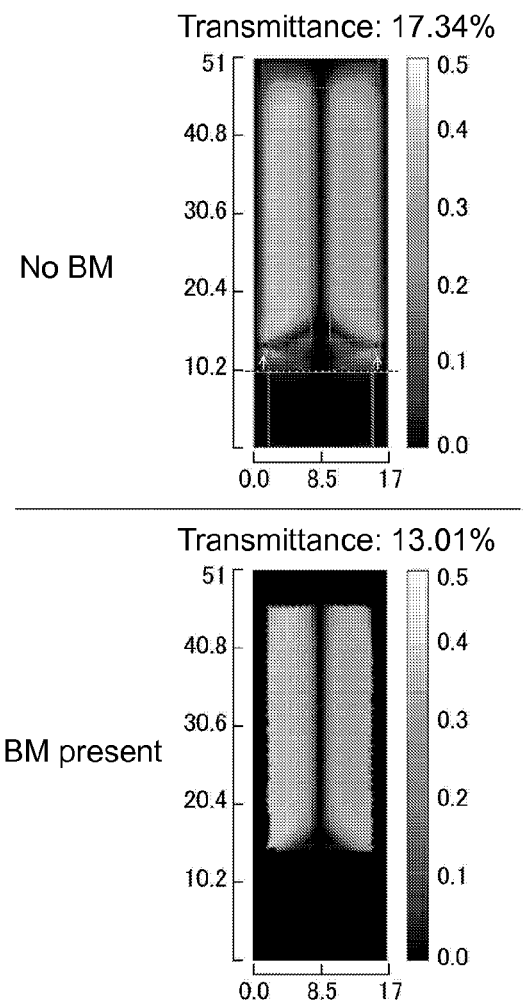
FIG. 46 shows simulation results of the fifth pixel structure.

FIG. 46 shows simulation results of the fifth pixel structure. In the fifth pixel structure, the edge portions of the connecting portion of the first common electrode are given a V shape in order to increase capacitance of the storage capacitor.

Figure 47:
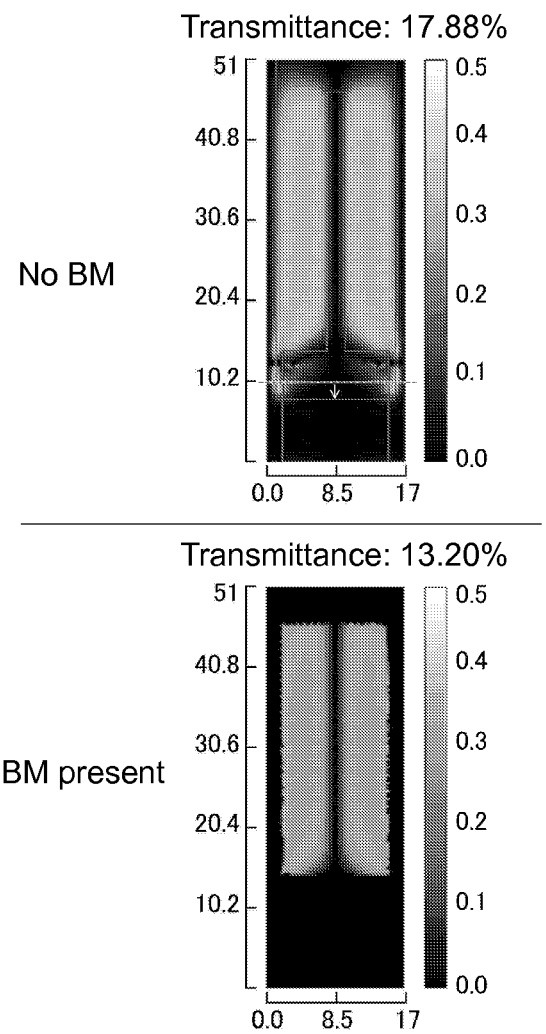
FIG. 47 shows simulation results of the sixth pixel structure.

FIG. 47 shows simulation results of the sixth pixel structure. In the sixth pixel structure, the storage capacitance is reduced by pulling back the connecting portion of the first common electrode in order to improve transmittance.

Figure 48:
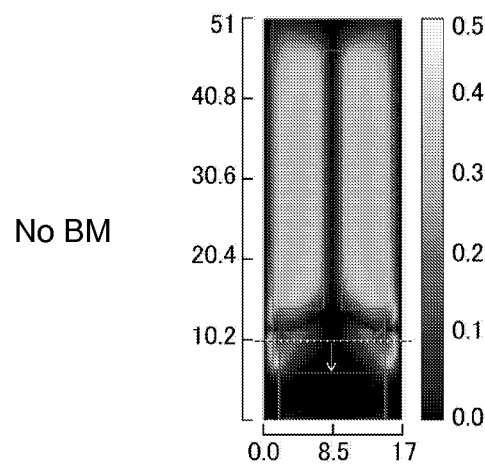
FIG. 48 shows simulation results of the seventh pixel structure.
Figure 48:
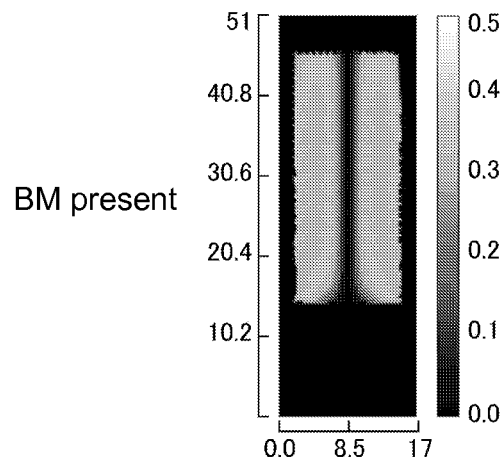

FIG. 48 shows simulation results of the seventh pixel structure. In the seventh pixel structure, the storage capacitance is further reduced by further pulling back the connecting portion of the first common electrode in order to further improve transmittance.

Figure 49:
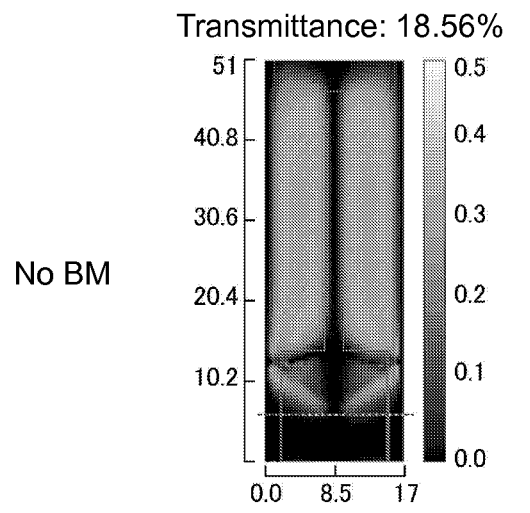
FIG. 49 shows simulation results of the eighth pixel structure.
Figure 49:
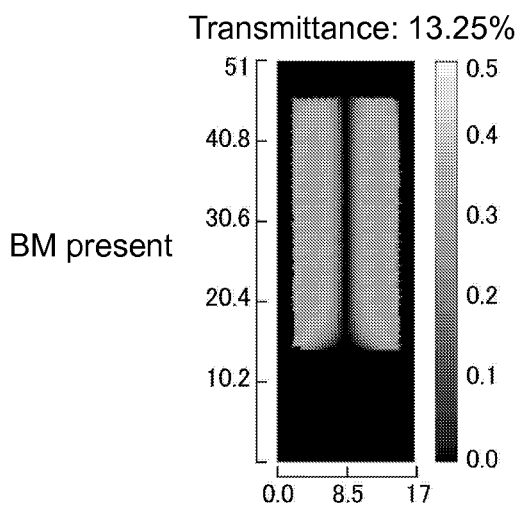

FIG. 49 shows simulation results of the eighth pixel structure. In the eighth pixel structure, the edge portions of the connecting portion of the first common electrode are given a V shape in order to increase capacitance of the storage capacitor.

Figure 50:
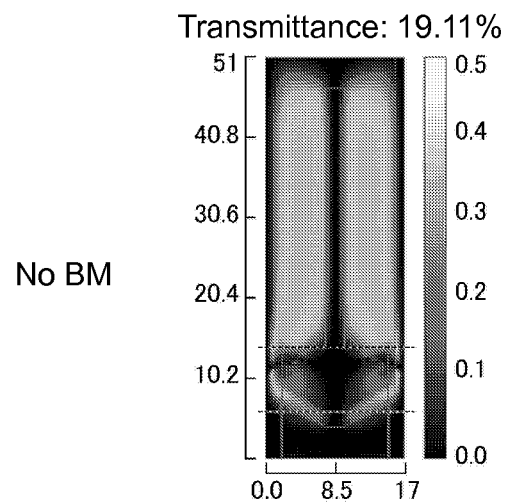
FIG. 50 shows simulation results of the ninth pixel structure.
Figure 50:
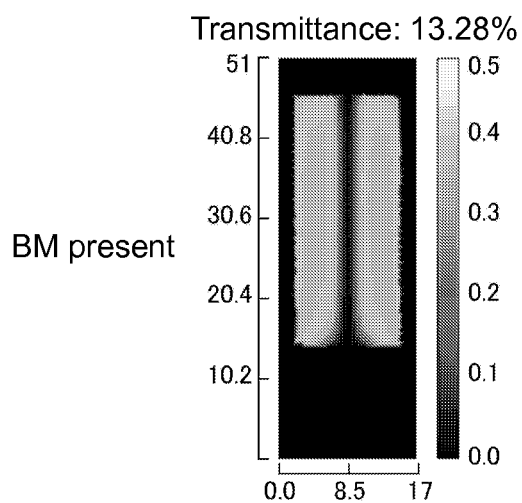

FIG. 50 shows simulation results of the ninth pixel structure. In the ninth pixel structure, the connecting portion of the first common electrode is pulled back in order to further improve transmittance.

Figure 51:
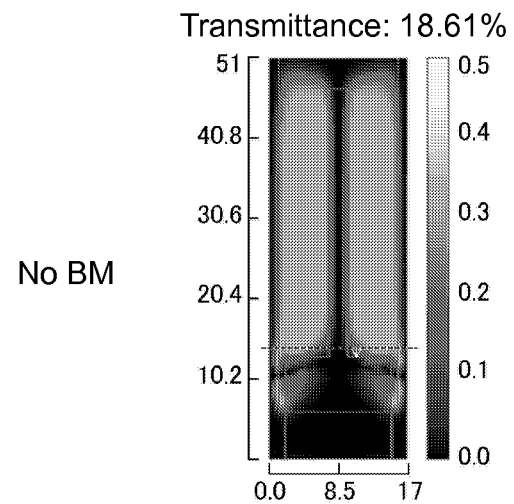
FIG. 51 shows simulation results of the tenth pixel structure.
Figure 51:
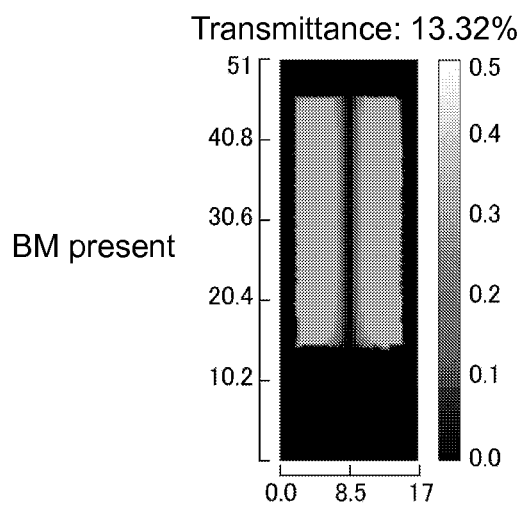

FIG. 51 shows simulation results of the tenth pixel structure. In the tenth pixel structure, the height of the connecting portion of the pixel electrode is reduced by only 1 μm compared to the seventh pixel structure in order to improve transmittance.

Figure 52:
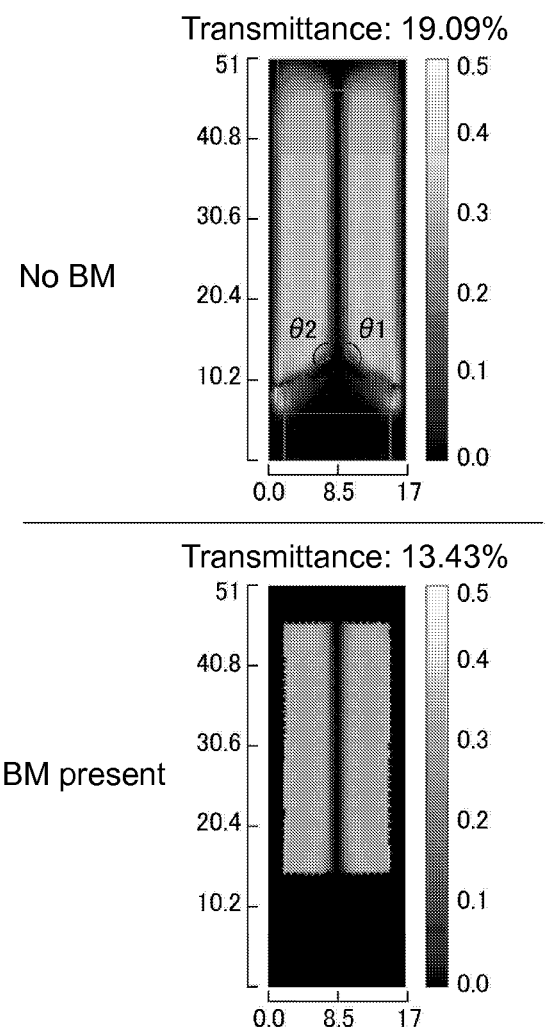
FIG. 52 shows simulation results of the eleventh pixel structure.

FIG. 52 shows simulation results of the eleventh pixel structure. In the eleventh pixel structure, the edge portions of the connecting portion of the pixel electrode are changed to a mountain shape (reverse V shape) in order to improve transmittance. In the pixel electrode, the angles θ1 and θ2 between the linear portion and the left and right edge portions (first and second edge portions) of the connecting portion connected thereto were both set to 135°.

Figure 53:
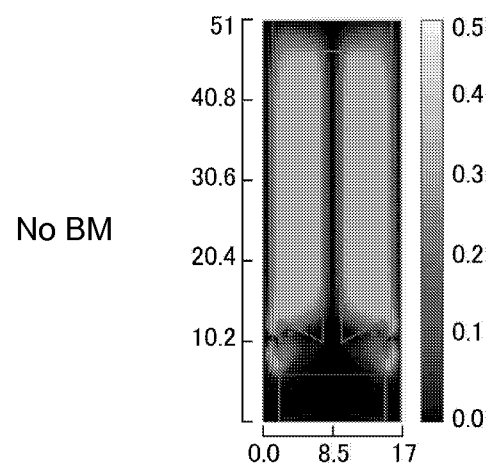
FIG. 53 shows simulation results of the twelfth pixel structure.
Figure 53:
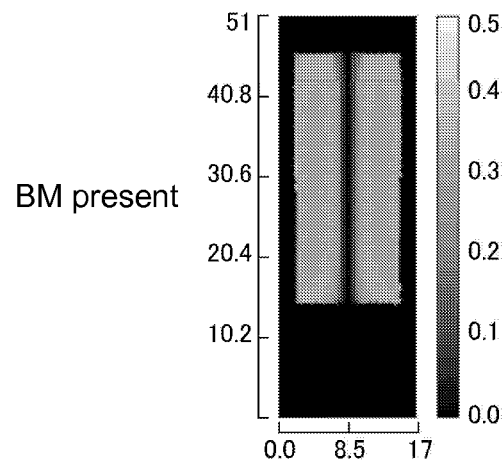

FIG. 53 shows simulation results of the twelfth pixel structure. In the twelfth pixel structure, the edge portions of the connecting portion of the pixel electrode are changed to a V shape.

From the results above, it was found that it is preferable that θ1 and θ2 both be greater than 90°.

In all of the pixel structures, a characteristic triangular dark portion occurs, and thus, it is preferable that the BM have a shape matching the dark portion. As a result, it is possible to optimize the shape of the BM and mitigate a decrease in aperture ratio.

Figure 54:
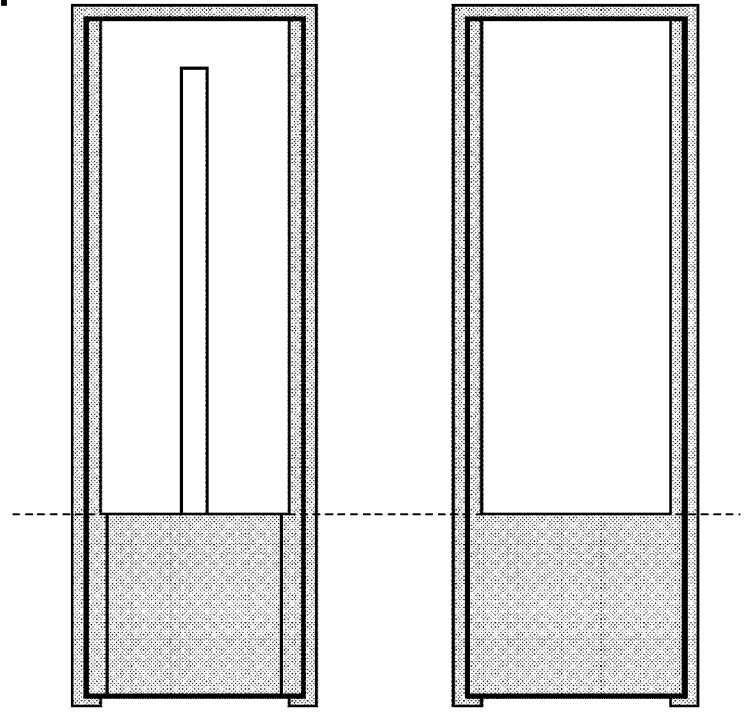
FIG. 54 is a schematic plan view of a thirteenth pixel structure of Embodiment 1 used in a simulation; the left side shows a pixel electrode and the first common electrode, and the right side shows the first common electrode.
Figure 55:
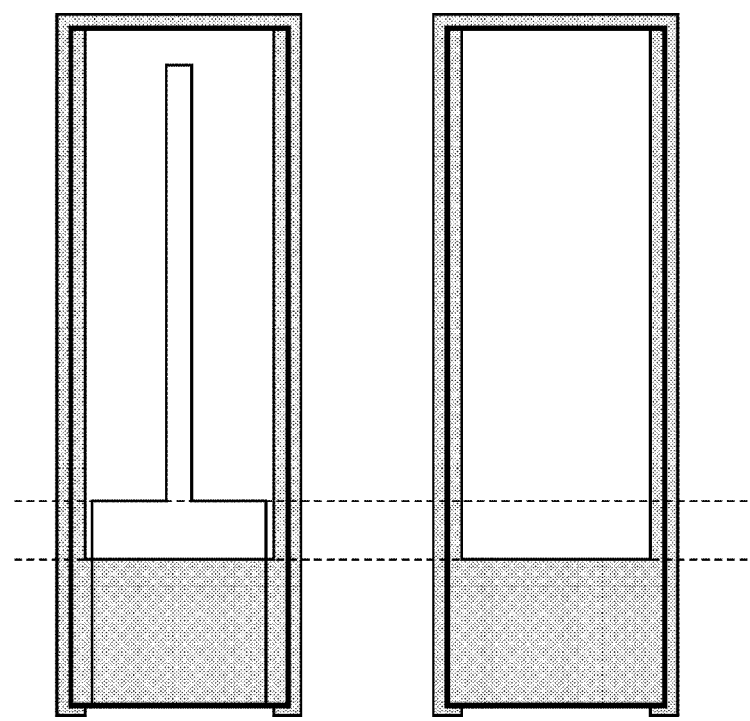
FIG. 55 is a schematic plan view of a fourteenth pixel structure of Embodiment 1 used in a simulation; the left side shows a pixel electrode and the first common electrode, and the right side shows the first common electrode.

Next, in the present embodiment, the simulation results will be described for a case in which the shapes of the connecting portions of the first and second common electrodes are changed. Specifically, simulations were conducted for two sub-pixel structures (thirteenth and fourteenth pixel structures). The thirteenth and fourteenth pixel structures are the same as the first pixel structure other than the shape of the connecting portion of the pixel electrode and the shape of the connecting portions of the first and second common electrodes being different. Even in the thirteenth and fourteenth pixel structures, the second common electrode has the same shape and size as the first common electrode. FIG. 54 is a schematic plan view of the thirteenth pixel structure of Embodiment 1 used in a simulation; the left side shows a pixel electrode and the first common electrode, and the right side shows the first common electrode. FIG. 55 is a schematic plan view of the fourteenth pixel structure of Embodiment 1 used in a simulation; the left side shows a pixel electrode and the first common electrode, and the right side shows the first common electrode.

Figure 56:
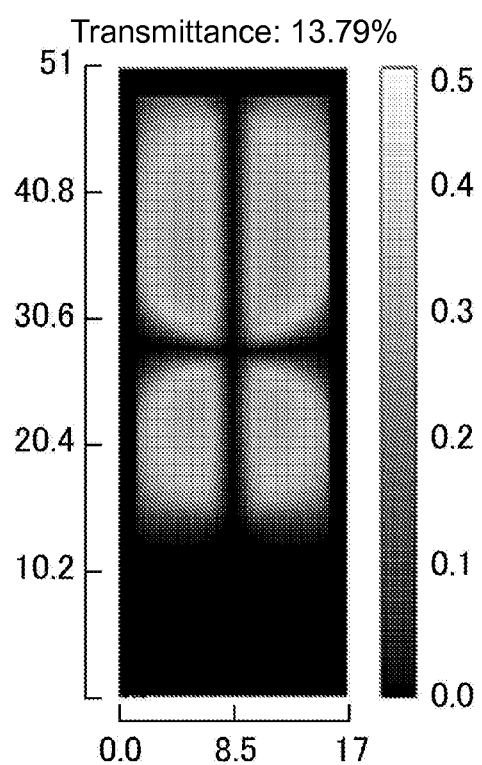
FIG. 56 shows simulation results of the thirteenth pixel structure.
Figure 57:
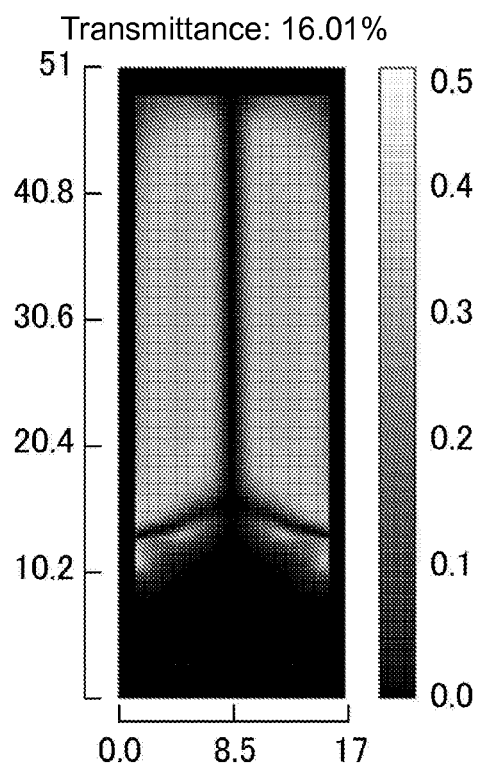
FIG. 57 shows simulation results of the fourteenth pixel structure.

FIGS. 56 and 57 show simulation results of the thirteenth and fourteenth pixel structures. As shown in FIG. 56, if the positions of the edge portions of the connecting portion of the first common electrode matched the positions of the edge portions of the connecting portion of the pixel electrode, then a thick dark line appeared in the center of the sub-pixel. On the other hand, as shown in FIG. 57, if the connecting portion of the first common electrode was pulled back from the connecting portion of the pixel electrode, then the dark line moved to the end of the sub-pixel, thereby allowing transmittance to be improved.

Next, a case in which positive nematic liquid crystal is used as the liquid crystal material in the present embodiment will be described. Here, a simulation was performed while changing the initial orientation angle within a range of 0° to 30° in the first pixel structure. Below, the liquid crystal material was a positive nematic liquid crystal (dielectric anisotropy $\Delta\varepsilon=7$, refractive index anisotropy $\Delta n=0.105$, refractive index for extraordinary light ne=1.592, refractive index for ordinary light no=1.487).

Figure 58:
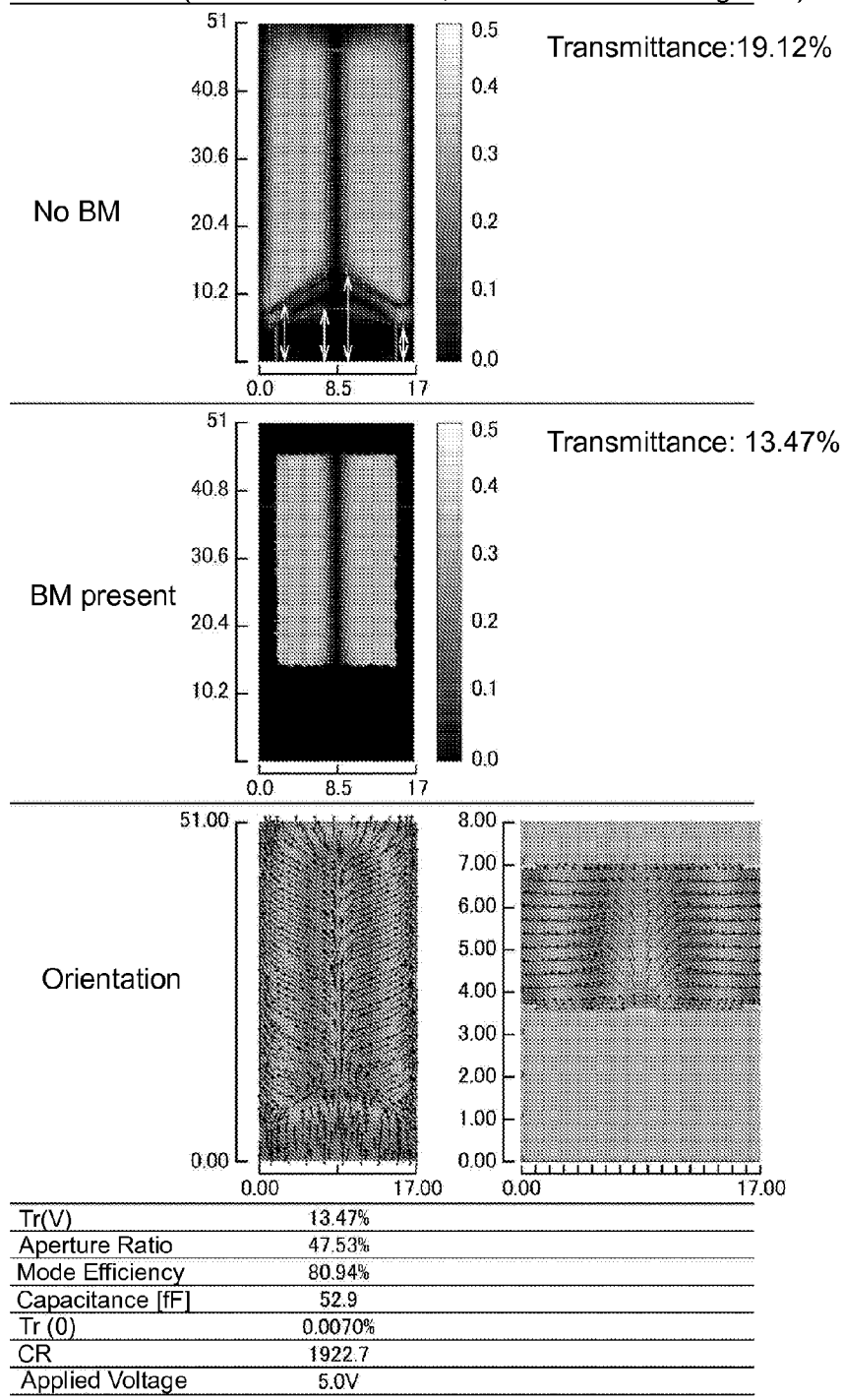
FIG. 58 shows simulation results of the first pixel structure.
Figure 59:
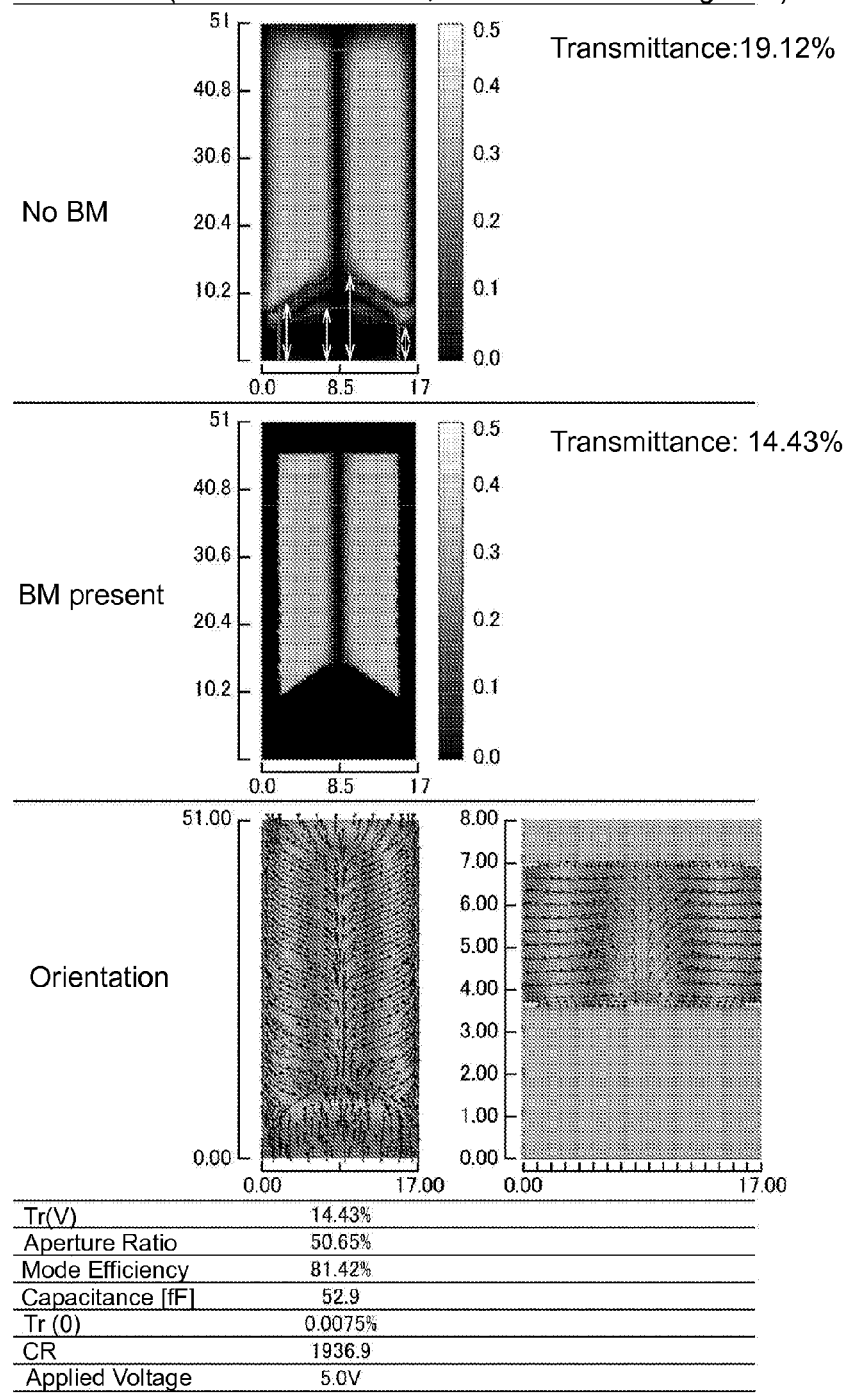
FIG. 59 shows simulation results of the first pixel structure.
Figure 60:
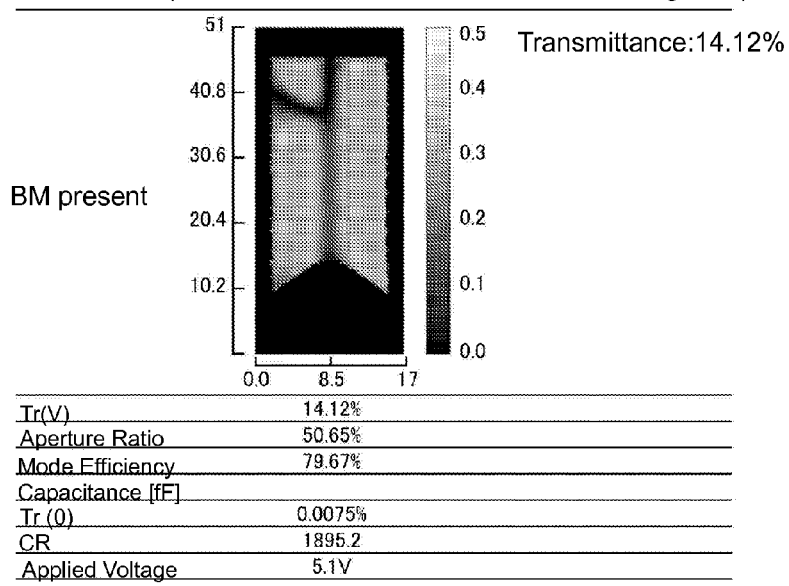
FIG. 60 shows simulation results of the first pixel structure.
Figure 61:
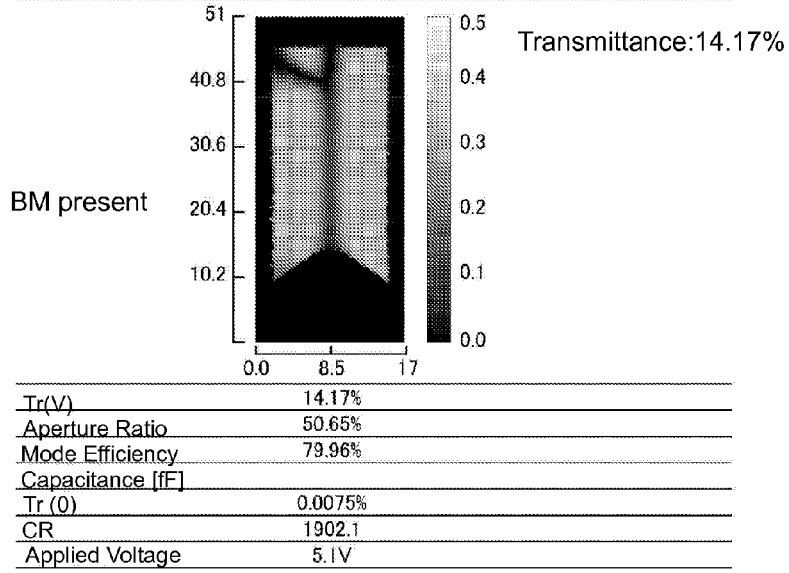
FIG. 61 shows simulation results of the first pixel structure.
Figure 62:
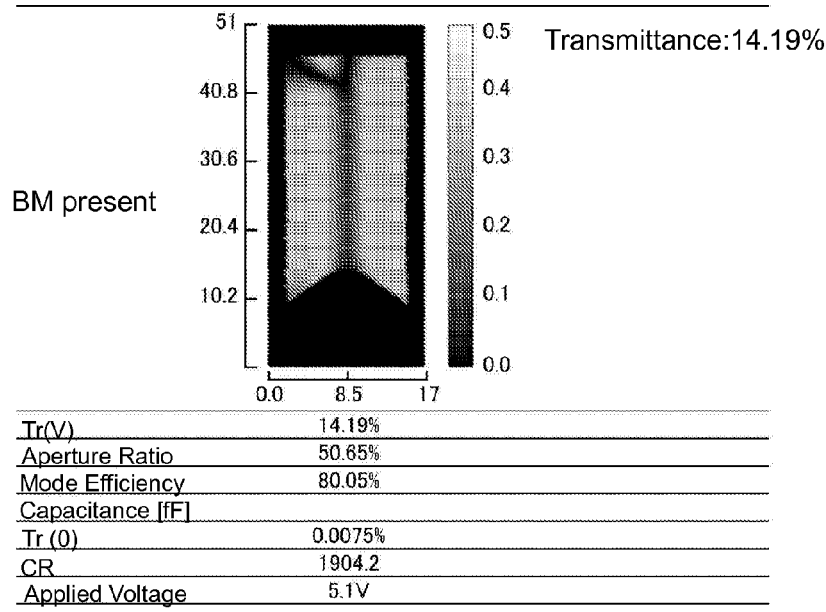
FIG. 62 shows simulation results of the first pixel structure.
Figure 63:
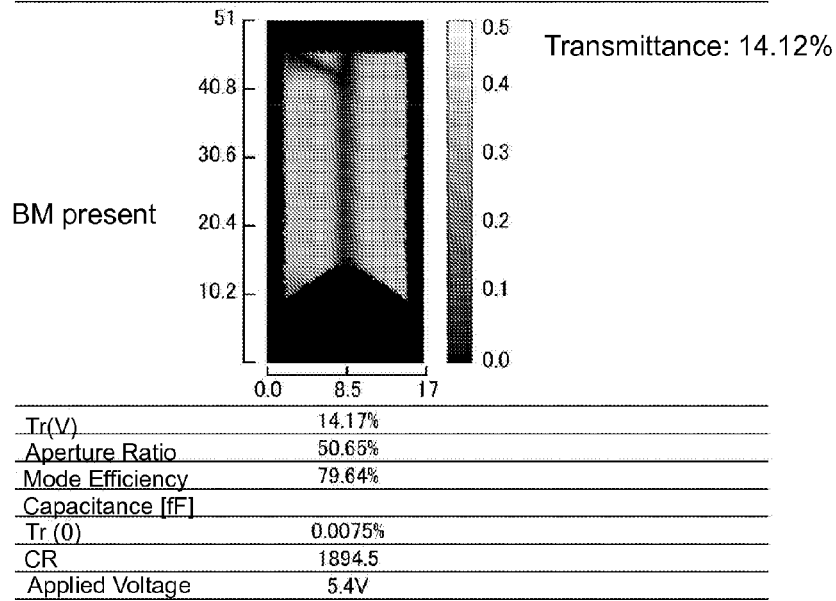
FIG. 63 shows simulation results of the first pixel structure.
Figure 64:
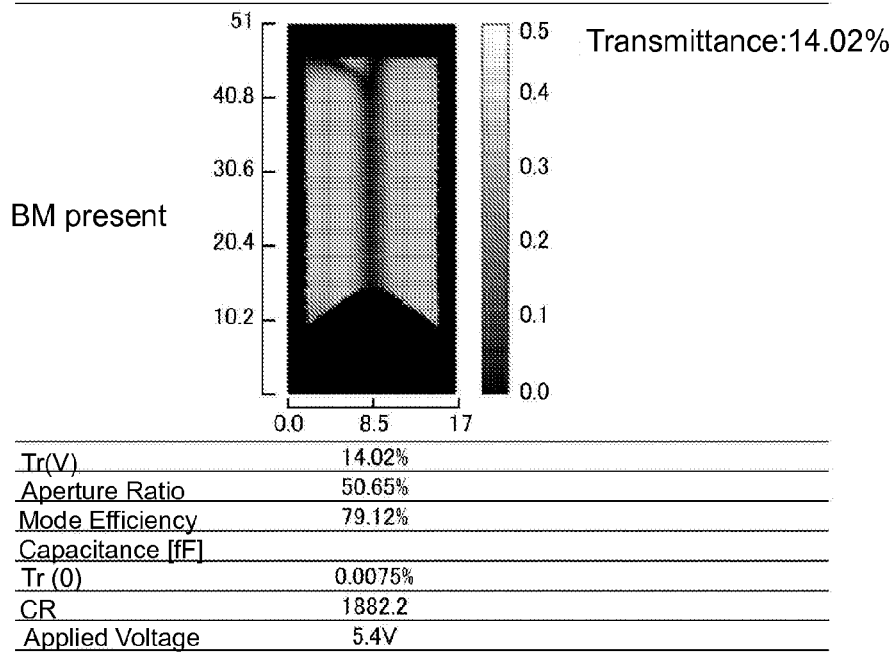
FIG. 64 shows simulation results of the first pixel structure.
Figure 65:
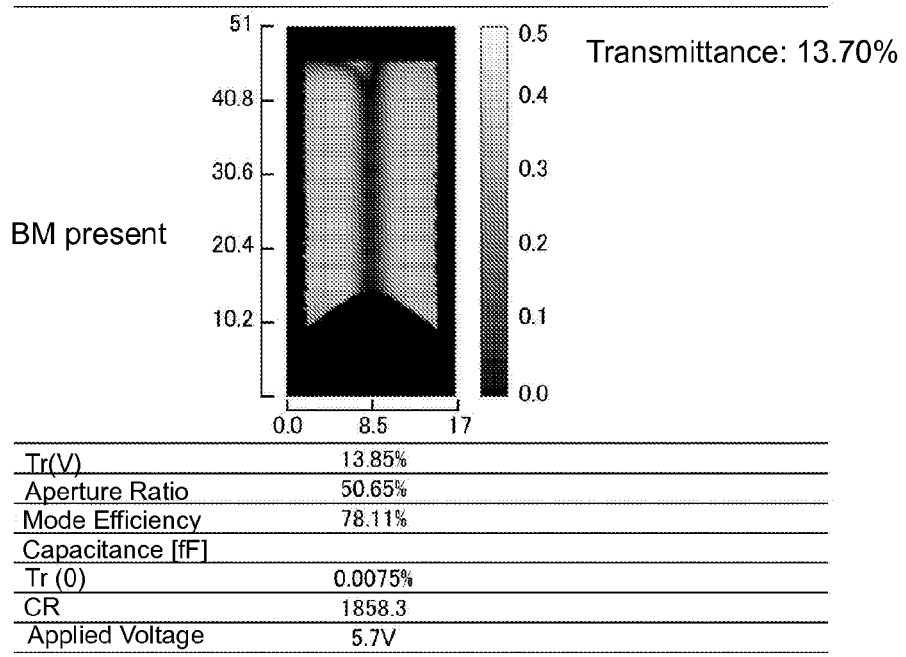
FIG. 65 shows simulation results of the first pixel structure.
Figure 66:
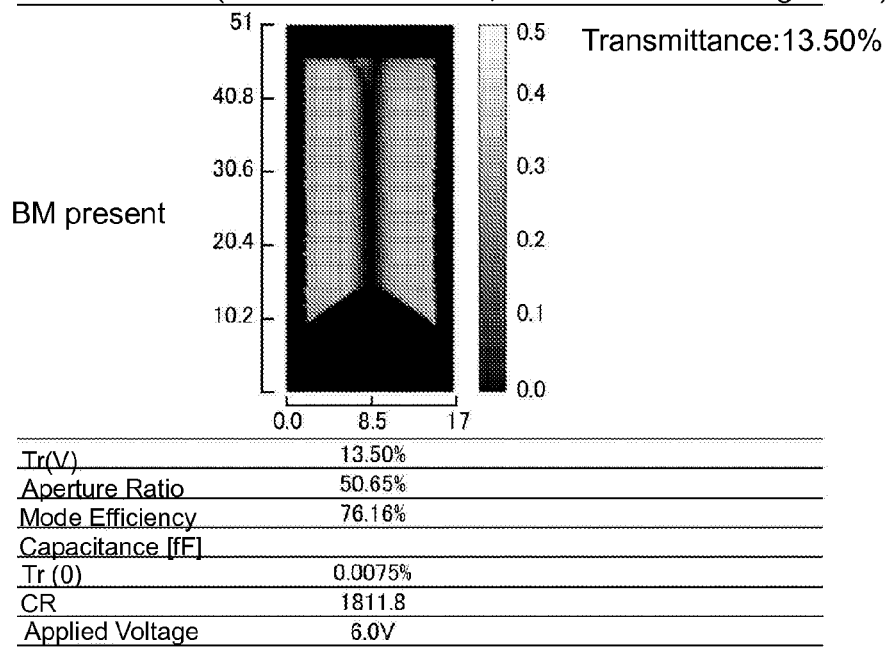
FIG. 66 shows simulation results of the first pixel structure.

All of FIGS. 58 to 66 show simulation results for the first pixel structure. FIGS. 58 and 59 show the results of simulations performed under exactly same conditions except for the shape of the BMs differing. As shown in FIGS. 58 to 66, if a positive nematic liquid crystal was used, there was a tendency for transmittance and mode efficiency to decrease as the initial orientation angle increased. Thus, in this case, it is preferable that the initial orientation angle be 0°.

Figure 67:
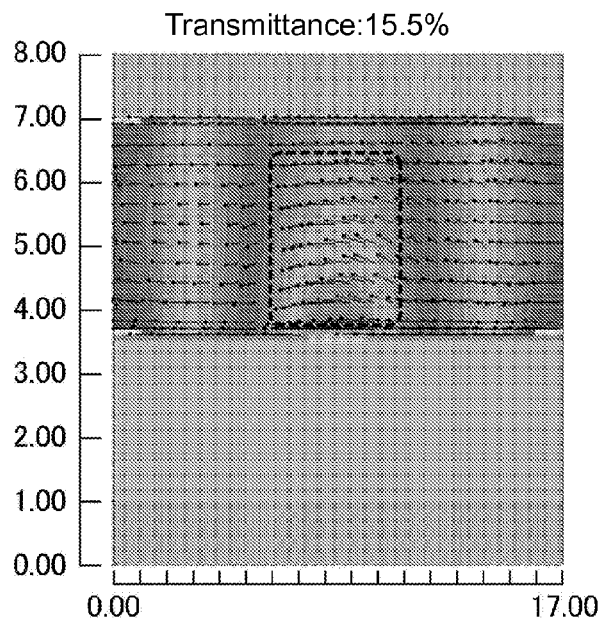
FIG. 67 shows alignment directions for a case in which a negative type nematic liquid crystal is used in Embodiment 1.
Figure 68:
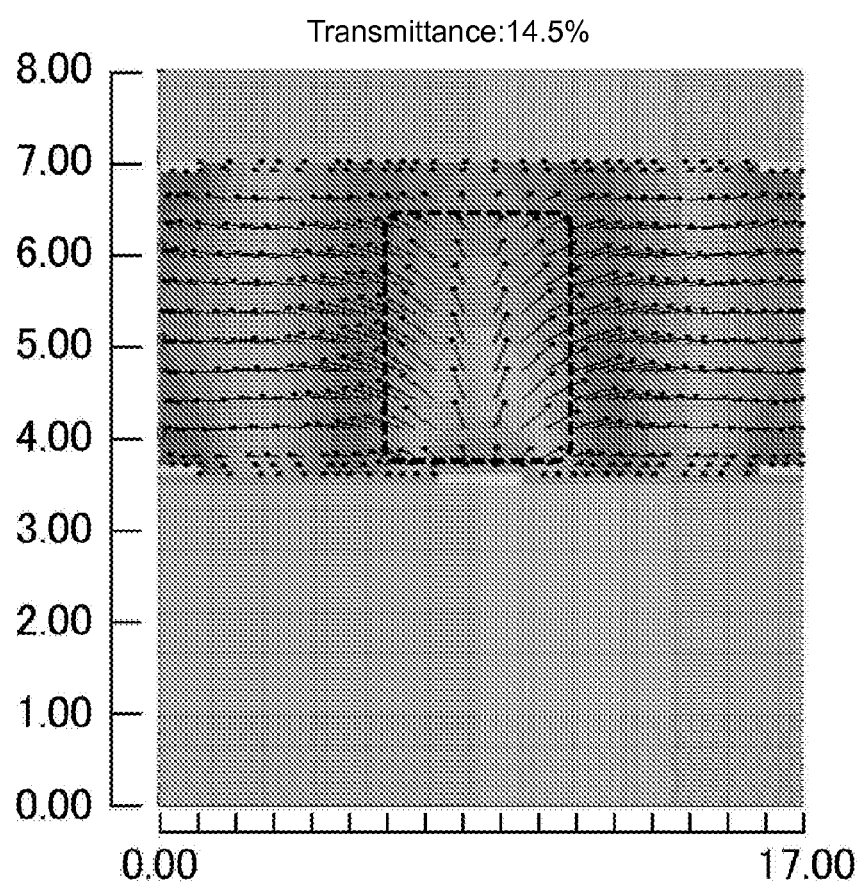
FIG. 68 shows alignment directions for a case in which a positive type nematic liquid crystal is used in Embodiment 1.

FIG. 67 shows alignment directions for a case in which a negative type nematic liquid crystal is used in Embodiment 1. FIG. 68 shows alignment directions for a case in which a positive type nematic liquid crystal is used in Embodiment 1. In both drawings, a cross-section perpendicular to the linear portion of the pixel electrode is shown at maximum transmittance.

In the present embodiment, an electric field can occur in the vertical direction (thickness direction of the liquid crystal layer) over the linear portion of the pixel electrode, but as shown in FIGS. 67 and 68, there are fewer director components oriented in the vertical direction due to the vertical electric field in the negative nematic liquid crystal as compared to the positive nematic liquid crystal. This is because in the negative nematic liquid crystal, the permittivity is greater in the short axis direction than the long axis direction of the liquid crystal molecules, and thus, the directors are not susceptible to the effect of the vertical electric field. Thus, in the present embodiment, it is possible for light to be transmitted more efficiently in negative nematic liquid crystal compared to positive nematic liquid crystal, and thus, transmittance can be improved.

Next, simulation results will be described for a case in which the shape of the pixel electrode and the shape of the first and second common electrodes were changed in a case in which a positive nematic liquid crystal was used as the liquid crystal material. Specifically, simulations were conducted for four sub-pixel structures (fifteenth to eighteenth pixel structures) in addition to the first pixel structure. The fifteenth to eighteenth pixel structures are the same as the first pixel structure other than the shape of the pixel electrode and the shape of the first and second common electrodes being different. Even in the fifteenth to eighteenth pixel structures, the second common electrode has the same shape and size as the first common electrode. In both cases the initial orientation angle was set to 7°.

Figure 69:
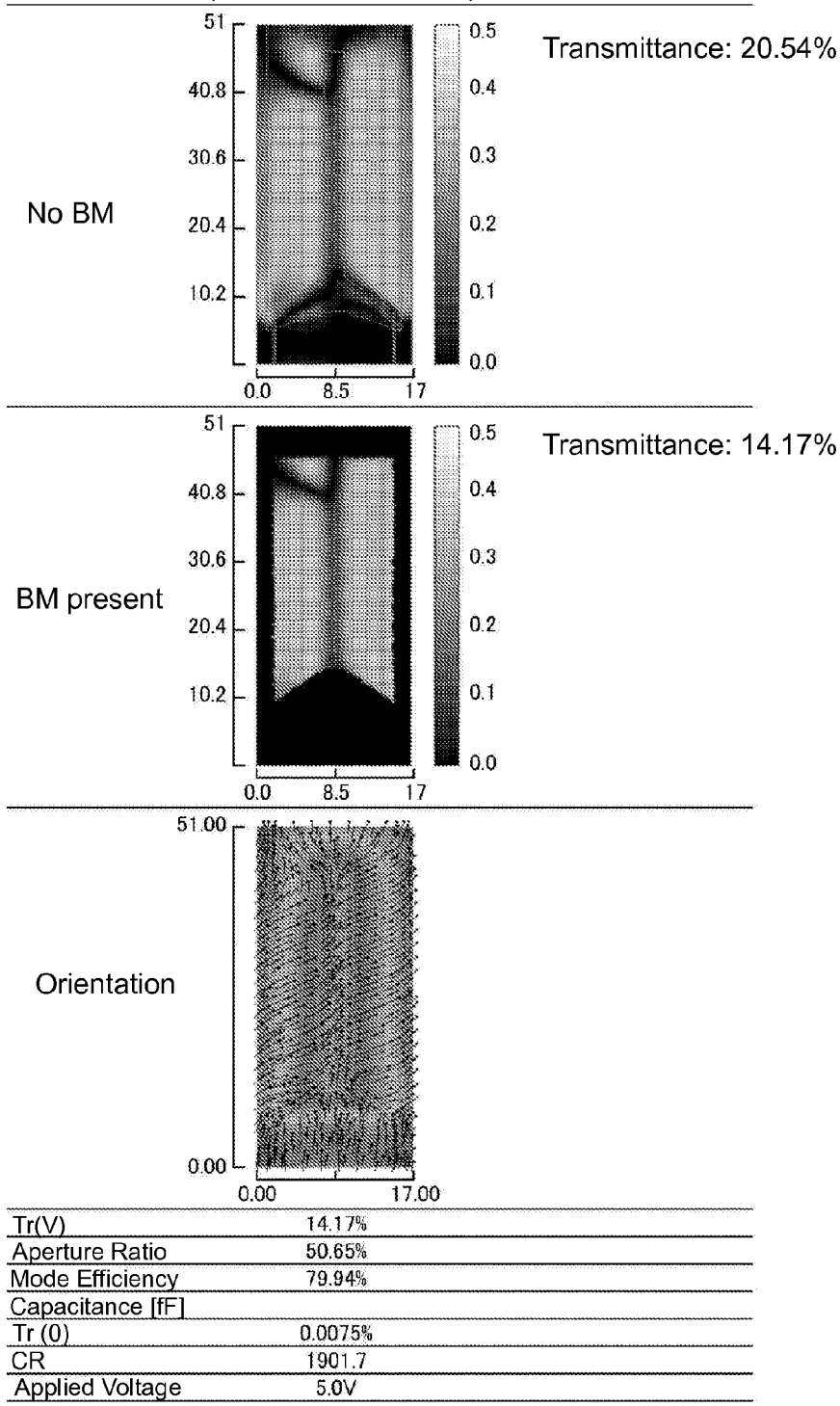
FIG. 69 shows simulation results of the first pixel structure.

FIG. 69 shows simulation results of the first pixel structure. As shown in FIG. 69, if a positive nematic liquid crystal was used as the liquid crystal material and the orientation direction of the liquid crystal molecules was made to be diagonal in the first pixel structure, a dark line occurred in the vicinity of the edge portions of the linear portion of the pixel electrode.

Figure 70:
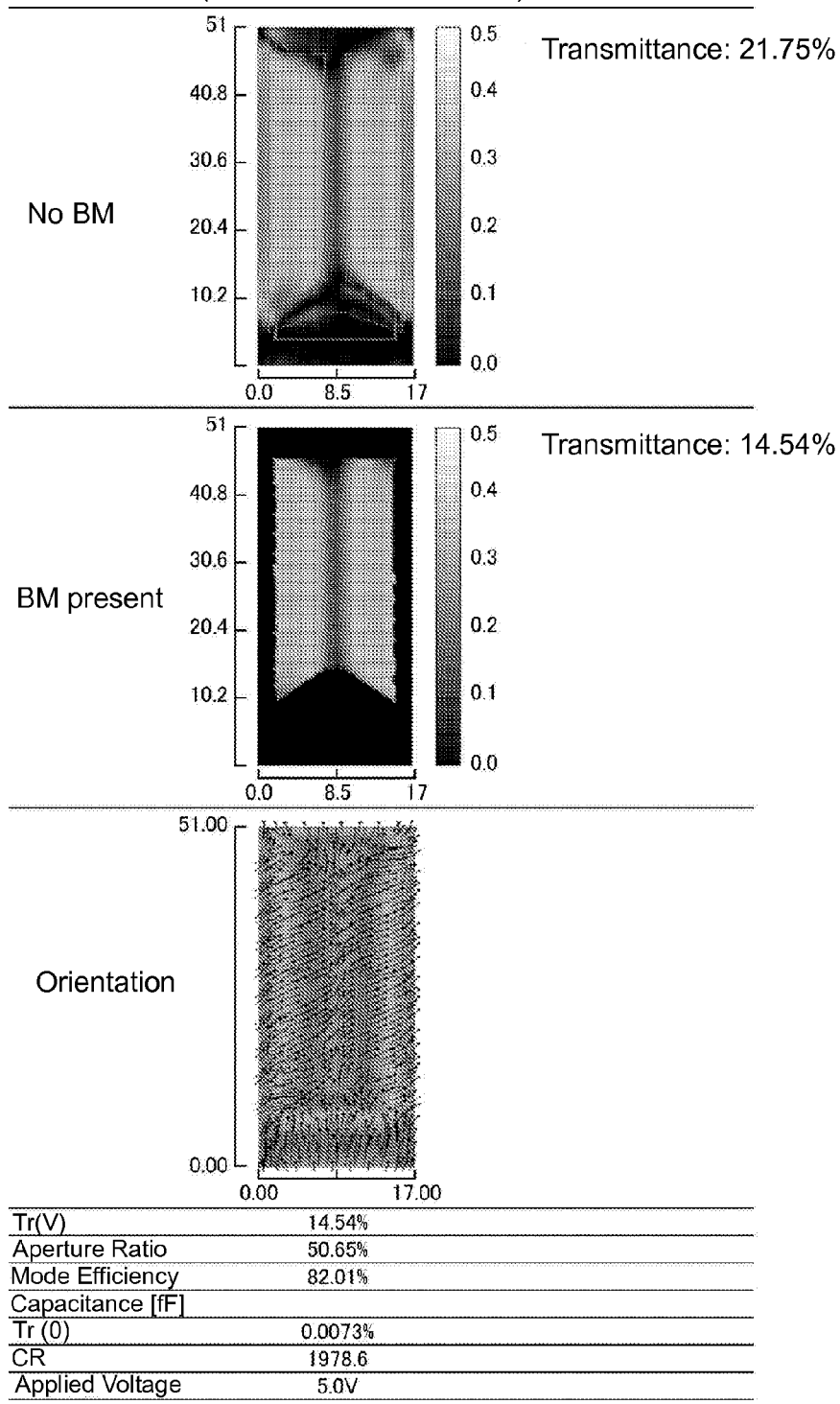
FIG. 70 shows simulation results of the fifteenth pixel structure.

FIG. 70 shows simulation results of the fifteenth pixel structure. In the fifteenth pixel structure, the connecting portion of the pixel electrode is made to be small, and on the side opposite thereto, a rectangular portion is formed.

Figure 71:
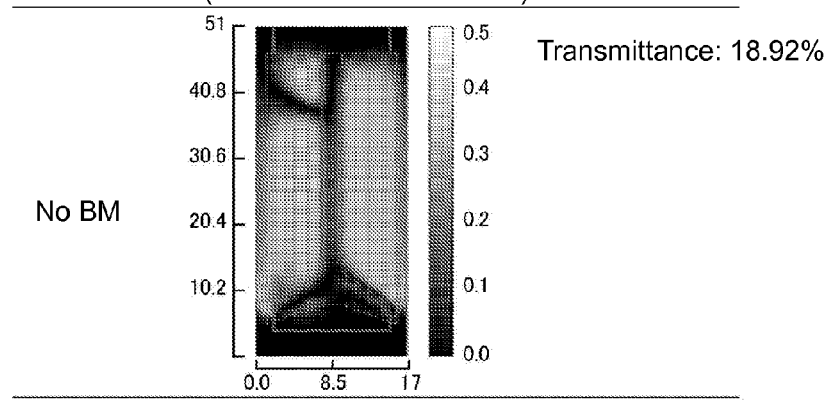
FIG. 71 shows simulation results of the sixteenth pixel structure.
Figure 71:
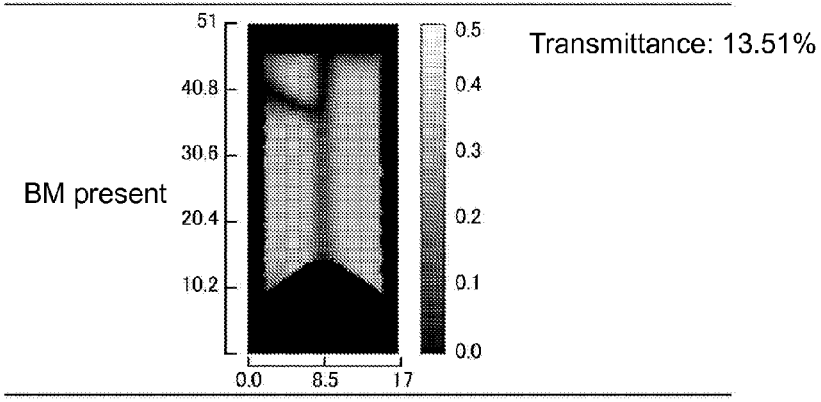
Figure 71:
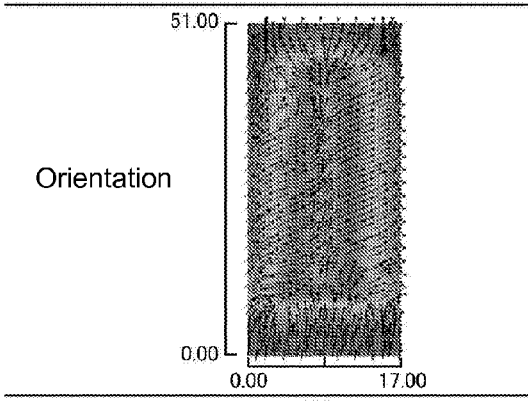

FIG. 71 shows simulation results of the sixteenth pixel structure. In the sixteenth pixel structure, the first and second common electrodes are made to overlap the rectangular portion.

Figure 72:
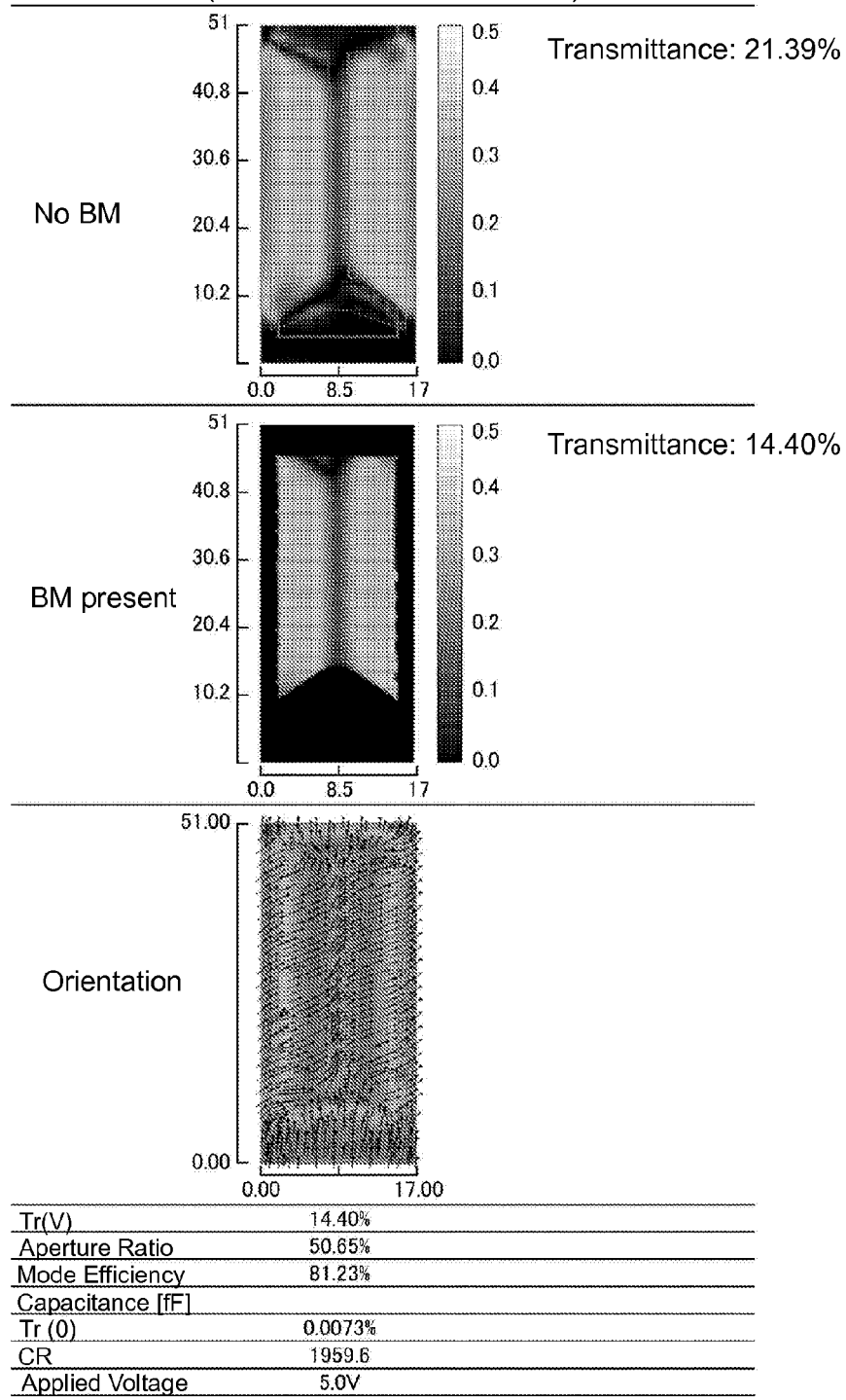
FIG. 72 shows simulation results of the seventeenth pixel structure.

FIG. 72 shows simulation results of the seventeenth pixel structure. In the seventeenth pixel structure, the overlap between the rectangular portion and the first and second common electrodes is made to be small.

Figure 73:
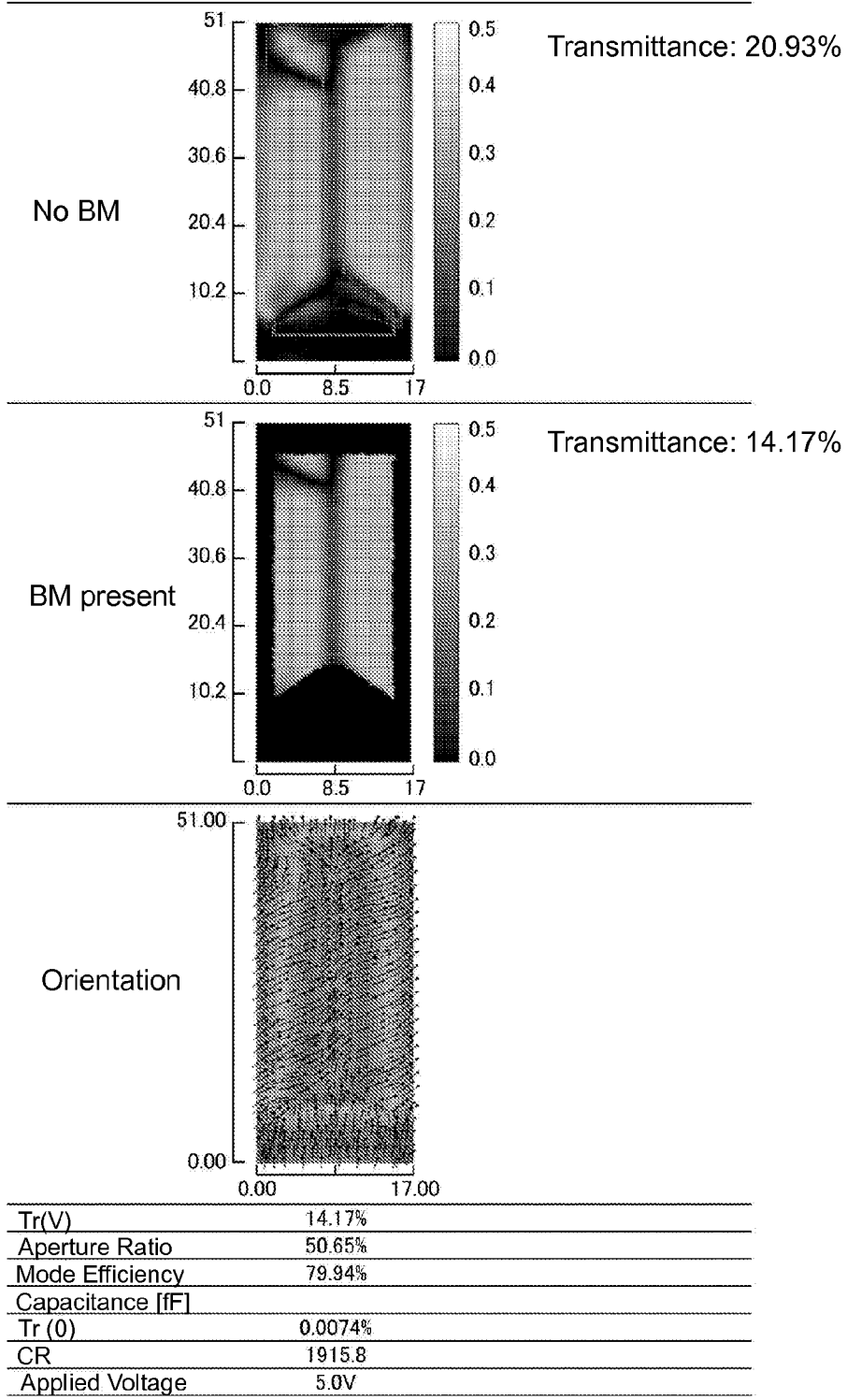
FIG. 73 shows simulation results of the eighteenth pixel structure.

FIG. 73 shows simulation results of the eighteenth pixel structure. In the eighteenth pixel structure, the shape of the rectangular portion was changed to be an inverted triangle.

From the results of FIGS. 69 to 73, it was found that if a positive nematic liquid crystal is used, and the initial orientation angle is made to be greater than 0°, then no great improvement in transmittance and mode efficiency results from changing the electrode shapes. Thus, in the case of a positive nematic liquid crystal, from the perspective of transmittance and mode efficiency, it is preferable that the configuration shown in FIGS. 58 and 59 be used, or in other words, a configuration in which the initial orientation angle in the first pixel structure is set to 0° be used.

As described above, in the present embodiment, the transmittance changes due to various conditions such as electrode shape, liquid crystal material, and initial orientation angle, but overall, it is possible to attain a higher transmittance compared to typical IPS mode devices. This is because light can be efficiently transmitted even in high resolution due to the fact that only one transparent linear portion of the pixel electrode is disposed per sub-pixel, and due to the fact that the linear portions of the common electrode are disposed over the source bus lines. In addition, in the present embodiment, by optimizing the various conditions, a higher transmittance than Comparison Example 1 can be achieved.

(Embodiment 2)

The present embodiment is substantially the same as Embodiment 1 except that the structure of each sub-pixel differs. Thus, in the present embodiment, special characteristics thereof will mainly be described, and portions already described in Embodiment 1 will be omitted. Moreover, members having the same or similar functions (parts thereof are included) in the present embodiment and Embodiment 1 are assigned the same reference characters, and descriptions of such members are omitted from the present embodiment.

Figure 74:
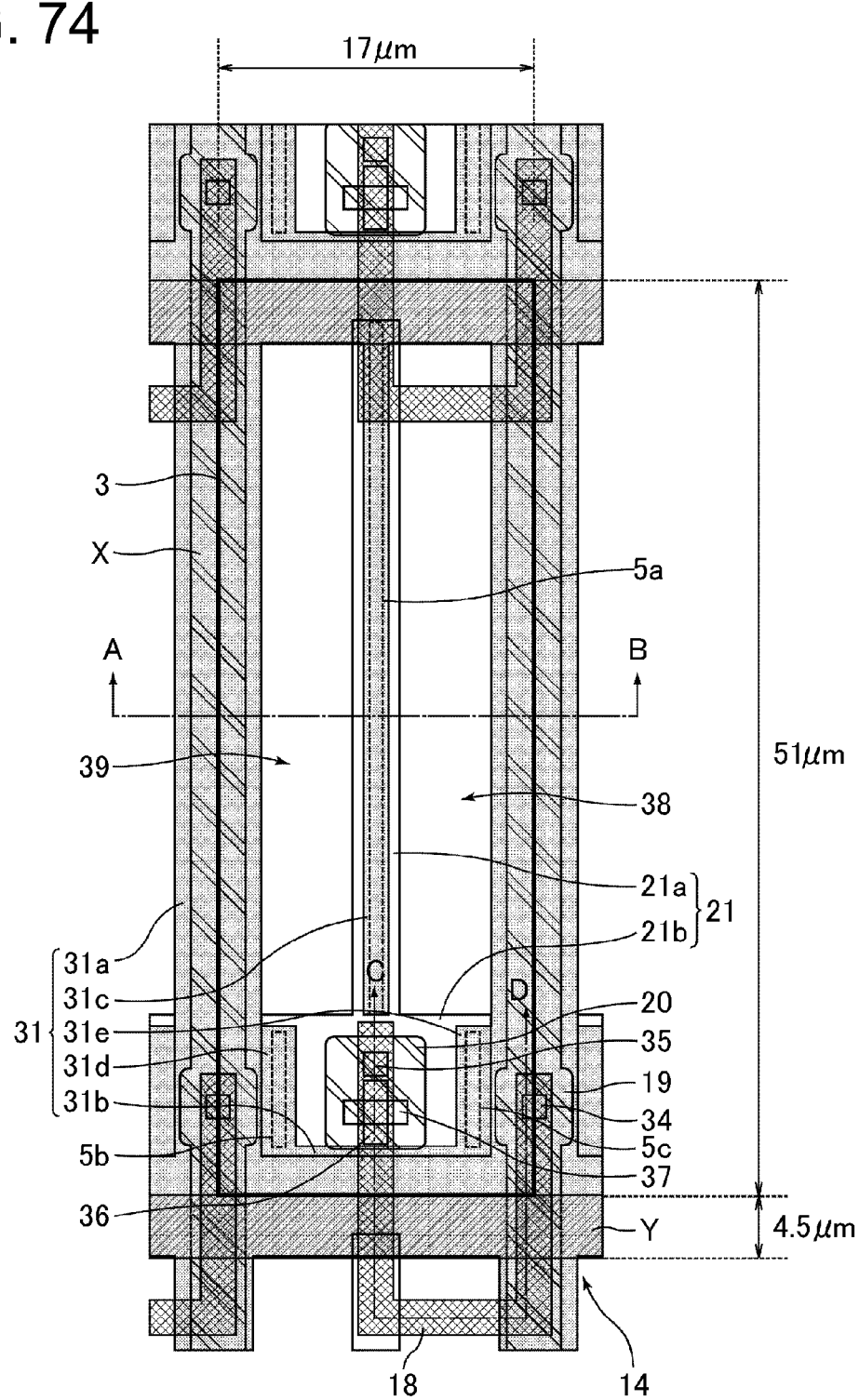
FIG. 74 is a schematic plan view showing the structure of a sub-pixel in a liquid crystal display of Embodiment 2, and shows the internal structure of an array substrate.
Figure 75:
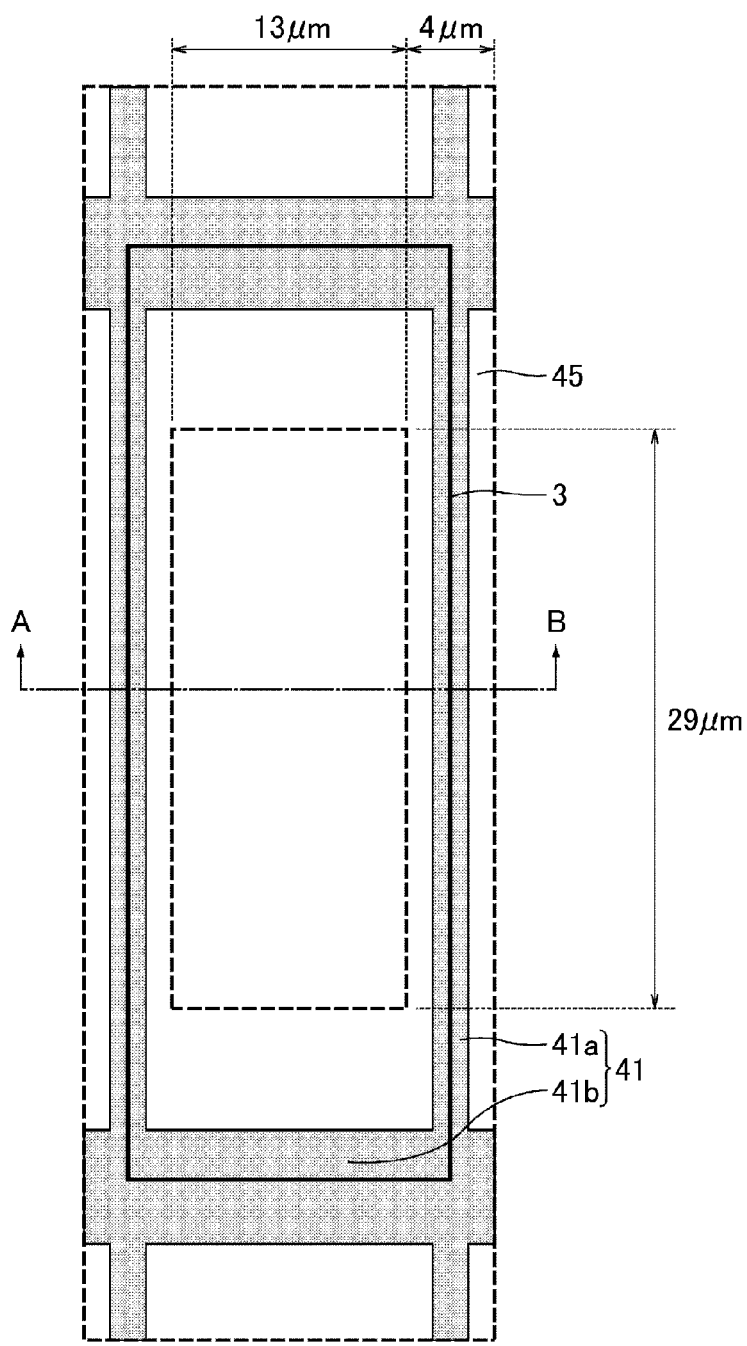
FIG. 75 is a schematic plan view showing the structure of a sub-pixel in a liquid crystal display of Embodiment 2, and shows the internal structure of an opposite substrate.
Figure 76:
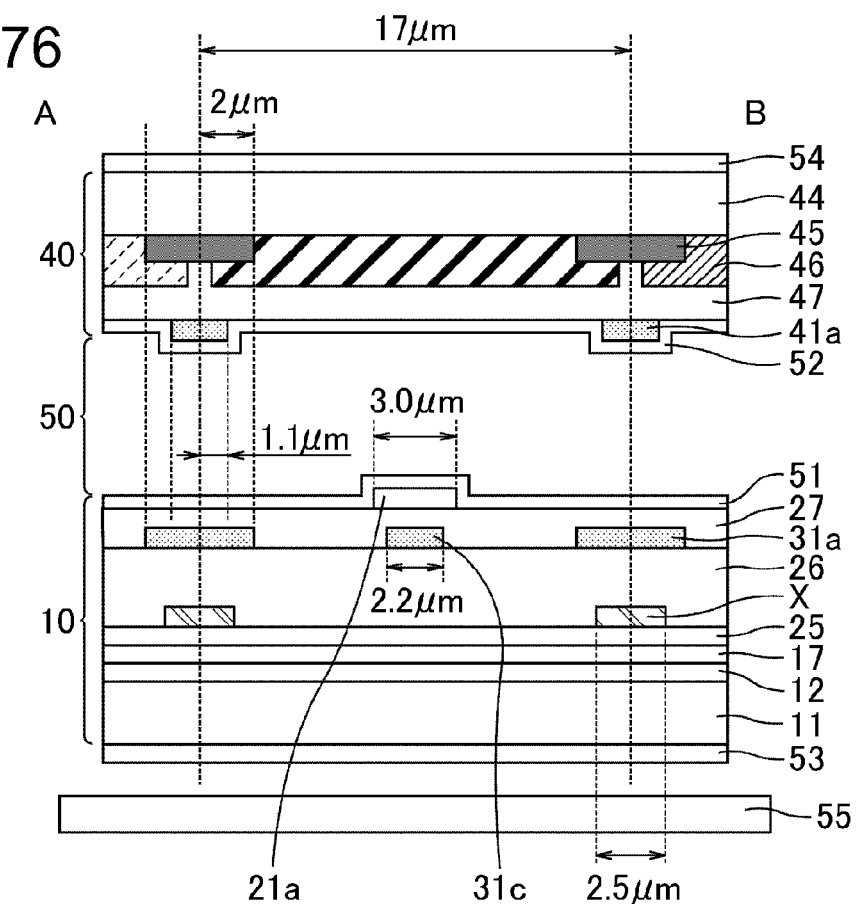
FIG. 76 is a schematic view showing the cross-sectional structure of the liquid crystal display of Embodiment 2, and shows the cross-sectional structure along the line A-B of FIGS. 74 and 75.
Figure 77:
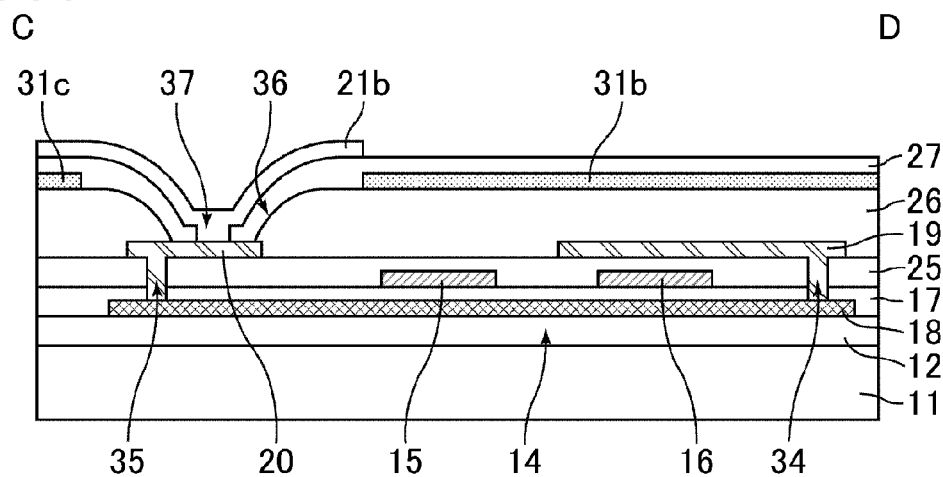
FIG. 77 is a schematic view showing the cross-sectional structure of the array substrate in the liquid crystal display of Embodiment 2, and shows the cross-sectional structure along the line C-D of FIG. 74.

FIG. 74 is a schematic plan view showing the structure of a sub-pixel in a liquid crystal display of Embodiment 2, and shows the internal structure of an array substrate. FIG. 75 is a schematic plan view showing the structure of a sub-pixel in a liquid crystal display of Embodiment 2, and shows the internal structure of an opposite substrate. FIG. 76 is a schematic view showing the cross-sectional structure of the liquid crystal display of Embodiment 2, and shows the cross-sectional structure along the line A-B of FIGS. 74 and 75. FIG. 77 is a schematic view showing the cross-sectional structure of the array substrate in the liquid crystal display of Embodiment 2, and shows the cross-sectional structure along the line C-D of FIG. 74. FIGS. 74 to 77 show an example of dimensions of the respective members in the present embodiment. The dimensions assume a resolution of 550 ppi.

As shown in FIGS. 74 to 77, the liquid crystal display of the present embodiment includes a liquid crystal panel and a backlight unit 55, and the liquid crystal panel includes an array substrate 10, an opposite substrate 40, and a horizontal orientation-type liquid crystal layer 50. Optical elements 53 and 54 are bonded respectively to the main surfaces of the array substrate 10 and the opposite substrate 40 opposite to the surfaces thereof facing the liquid crystal layer 50.

The array substrate 10 has a structure in which an insulating substrate 11, a base insulating film 12, a semiconductor layer 18 of each TFT 14, a gate insulating film 17, a gate layer including gate bus lines Y, an interlayer insulating film 25, a source layer including source bus lines X, an interlayer insulating film 26 including a photosensitive resin film, a lower conductive layer, an interlayer insulating film 27, an upper conductive layer, and a first alignment film 51 are layered in this order.

One of the main characteristics of the present embodiment is that the first common electrode 31 is provided in the lower conductive layer and the pixel electrode 21 is provided in the upper conductive layer. A contact hole 37 penetrating the interlayer insulating film 27 is formed in a position overlapping a contact hole 36 penetrating the interlayer insulating film 26, and the pixel electrode 21 is electrically connected to the drain electrode 20 through these contact holes.

Each pixel electrode 21 has a linear portion 21a corresponding to the second linear portion, and a connecting portion 21b corresponding to the second connecting portion. The linear portion 21a is transparent and is formed linearly (preferably in a straight line), and is disposed in parallel with the column direction. The connecting portion 21b is transparent, is disposed so as to cover the drain electrode 20 of the TFT 14, and is connected to one end (the lower end, for example) of the linear portion 21a.

The first common electrode 31 has a plurality of linear portions 31a corresponding to the first linear portion, a connecting portion 31b corresponding to the first connecting portion and connecting adjacent linear portions 31a, a capacitance electrode portion 31c corresponding to the capacitance electrode portion, and capacitance electrode portions 31d and 31e. The linear portion 31a is transparent and formed linearly (preferably in a straight line), and is disposed in parallel with the column direction. All of the linear portions 31a are disposed to overlap and be in parallel with the source bus lines X. The connecting portion 31b is transparent and faces the gate bus line Y but has almost no overlap with the connecting portion 21b of the pixel electrode 21.

In each sub-pixel 3, an opening region 38 is formed between the linear portion 21a of the pixel electrode 21 and the linear portion 31a to the right thereof, and between the linear portion 21a and the linear portion 31a to the left thereof, an opening region 39 is formed. The connecting portion 21b of the pixel electrode 21 is formed to be wider than the linear portion 21a. The connecting portion 21b is formed in a rectangular shape.

The capacitance electrode portion 31c is transparent and formed in a linear fashion (preferably in a straight line). The capacitance electrode portion 31c is arranged below the linear portion 21a and parallel thereto, and the linear portion 21a overlaps the capacitance electrode portion 31c through the interlayer insulating film 27. The storage capacitor 5a is formed by the capacitance electrode portion 31c, the linear portion 21a, and the interlayer insulating film 27 therebetween. One of the edge portions (upper edge portion, for example) of the capacitance electrode portion 31c is connected to the connecting portion 31b.

The capacitance electrode portions 31d and 31e are transparent, face the connecting portion 21b, and overlap a portion of the connecting portion 21b across the interlayer insulating film 27. The storage capacitor 5b is formed by the capacitance electrode portion 31d, the connecting portion 21b, and the interlayer insulating film 27 therebetween, and the storage capacitor 5c is formed by the capacitance electrode portion 31e, the connecting portion 21b, and the interlayer insulating film 27 therebetween. The capacitance electrode portions 31d and 31e are respectively arranged adjacent to intersections between the linear portions 31a and the connecting portion 31b, and are connected to the linear portions 31a and the connecting portion 31b.

Meanwhile, the opposite substrate 40 includes the insulating substrate 44, the black matrix 45 (BM), the color filters 46 of a plurality of colors, the overcoat film 47, the second common electrode 41, the plurality of columnar spacers (not shown), and the second alignment film 52.

As shown in FIG. 75, the second common electrode 41 has a plurality of linear portions 41a facing the linear portion 31a of the first common electrode 31, the linear portions 41a corresponding to the third linear portion, and a connecting portion 41b that connects adjacent linear portions 41a to each other. The linear portion 41a is transparent and is formed linearly (preferably in a straight line), and is disposed in parallel with the column direction so as to face the source bus line X. The connecting portion 41b is transparent and faces the connecting portion 31b of the first common electrode 31.

In the present embodiment, the linear portion 21a of the pixel electrode 21 is provided in the upper conductive layer and the linear portion 31a of the first common electrode 31 is provided in the lower conductive layer; thus, the linear portions 21a and 31a are formed in different conductive layers from each other. Therefore, there is no need to form the linear portions 21a and 31a by patterning the same conductive film. In addition, the linear portion 21a is provided between two adjacent linear portions 31a; thus, only one linear portion 21a is present per sub-pixel 3. All linear portions 31a are formed over the source bus lines X, and thus, there is no need to form the linear portions 31a and the source bus lines X by patterning the same conductive film. Thus, the liquid crystal display of the present embodiment has the advantage of higher resolution.

The linear portion 21a is transparent, and similar to Embodiment 1, regions where the linear portions 21a are present can also transmit light. Furthermore, the linear portions 31a are disposed over the source bus lines X so as to be parallel therewith, and thus, it is possible to widen the opening regions 38 and 39, which primarily contribute to transmittance. Thus, the liquid crystal display of the present embodiment can realize high transmittance.

If the capacitance electrode portion 31c is thin, the capacitance of the storage capacitor 5a is susceptible to variation due to the sub-pixels and/or the product, and if the capacitance electrode portion 31c is thick, then there is a need to form the linear portion 21a to also be thick, which results in dark lines forming on the linear portion 21a. Therefore, based on such factors, it is preferable that the width of the capacitance electrode portion 31c be 1.0 µm to 2.5 µm inclusive.

In addition, in order to prevent the electric field from the linear portion 21a from being pulled into the capacitance electrode portion 31c in each sub-pixel 3, it is necessary to have the linear portion 21a be larger than the capacitance electrode portion 31c, and furthermore, it is necessary to provide a margin of approximately 0.5 µm so that the capacitance electrode portion 31c does not protrude from under the linear portion 21a due to alignment offset during a photolithography step. Therefore, it is preferable that the width of each linear portion 21a be 1.5 µm to 3.0 µm inclusive.

Furthermore, in the liquid crystal display of the present embodiment, the linear portion 21a of the pixel electrode 21 and the linear portion 31a of the first common electrode 31 are formed on the same array substrate 10, and thus, it is possible to reduce the drive voltage compared to the liquid crystal display disclosed in Patent Document 3. Therefore, the liquid crystal display of the present embodiment has the advantage of lower power consumption than the liquid crystal display disclosed in Patent Document 3.

Moreover, in the present embodiment, the pixel electrode 21 is provided in the upper conductive layer, and the first common electrode 31 is provided in the lower conductive layer. Thus, there is a need to form the contact hole 37 for electrically connecting the pixel electrode 21 to the drain electrode 20 in the interlayer insulating film 27, and thus, it is not possible to use this portion as the storage capacitor. However, the capacitance electrode portion 31c is disposed below the linear portion 21a and parallel thereto, and thus, it is possible to ensure capacitance in the auxiliary capacitor.

In addition, the capacitance electrode portion 31c is disposed so as not to protrude from under the linear portion 21c in a plan view. If the capacitance electrode portion 31c protrudes from under the linear portion 21a, then most of the electric field generated by the linear portion 21a is pulled into the capacitance electrode portion 31c, and the electric field does not spread horizontally, which can reduce transmittance and mode efficiency. However, by arranging the capacitance electrode portion 31c as described above, it is possible for the electric field from the linear portion 21a to effectively spread horizontally, which can mitigate the risk of reduced transmittance and mode efficiency.

Furthermore, similar to Embodiment 1, the linear portions 41a of the second common electrode 41 are disposed to face the linear portion 31a of the first common electrode 31. Therefore, it is possible to further reduce drive voltage and further reduce power consumption.

In addition, the second common electrode 41 can double as the shield electrode, and thus, the liquid crystal display of the present embodiment need not include a shield electrode on the main surface of the opposite substrate 40 opposite to the liquid crystal layer 50.

Due to similar reasons to Embodiment 1, it is preferable that the liquid crystal molecules included in the liquid crystal layer 50 have negative dielectric anisotropy, and in such a case, it is preferable that the initial orientation angle be 60° to 80° inclusive.

(Embodiment 3)

The present embodiment is substantially the same as Embodiment 1 except that the structure of each sub-pixel differs. Thus, in the present embodiment, special characteristics thereof will mainly be described, and portions already described in Embodiment 1 will be omitted. In addition, members having the same or similar functions in the present embodiment and Embodiment 1 are assigned the same reference characters, and descriptions of such members are omitted from the present embodiment.

Figure 78:
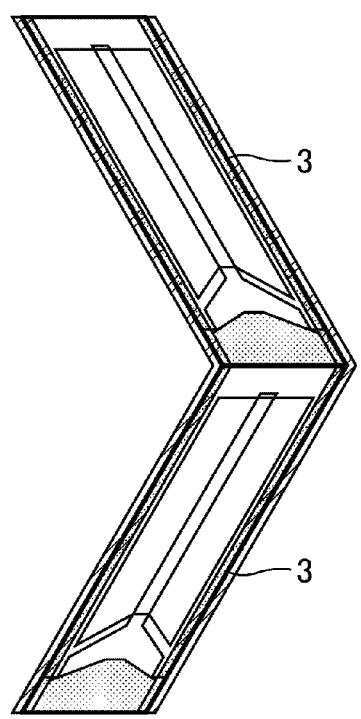
FIG. 78 is a schematic plan view that shows the structure of a sub-pixel in a liquid crystal display of Embodiment 3.
Figure 79:
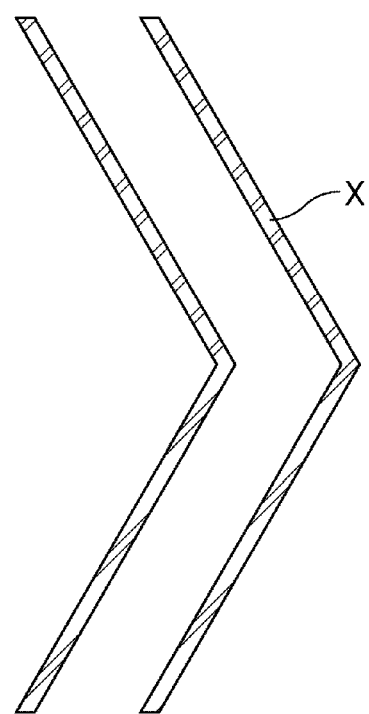
FIG. 79 is a schematic plan view of source bus lines in the liquid crystal display of Embodiment 3.
Figure 80:
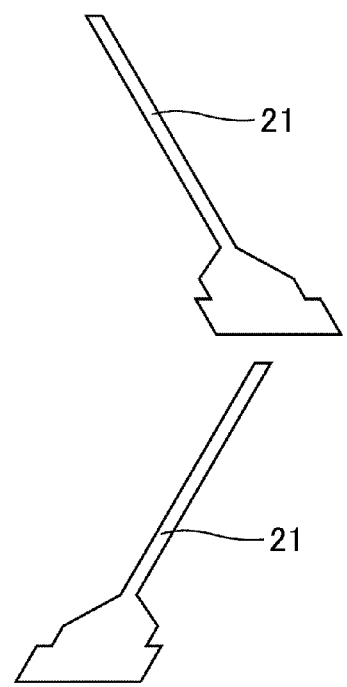
FIG. 80 is a schematic plan view of pixel electrodes in the liquid crystal display of Embodiment 3.
Figure 81:
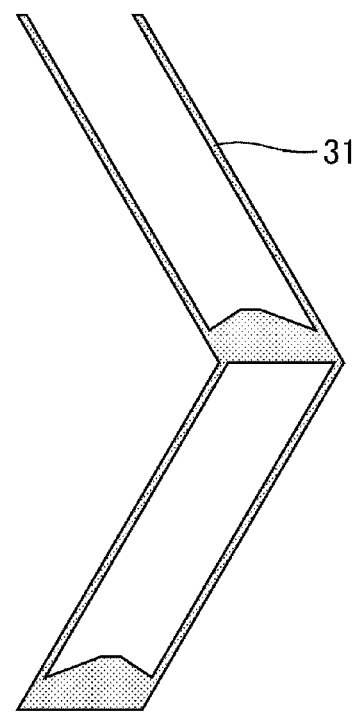
FIG. 81 is a schematic plan view of a first common electrode in the liquid crystal display of Embodiment 3.
Figure 82:
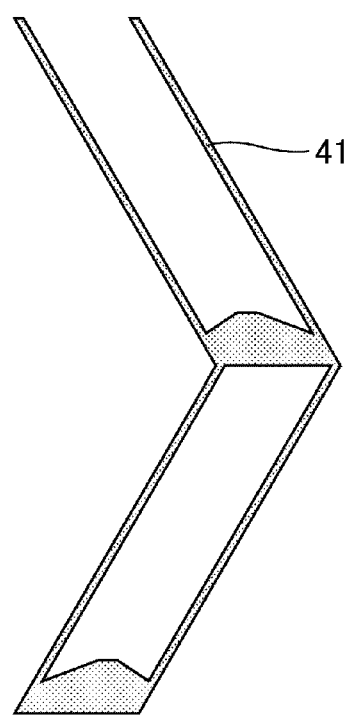
FIG. 82 is a schematic plan view of a second common electrode in the liquid crystal display of Embodiment 3.
Figure 83:
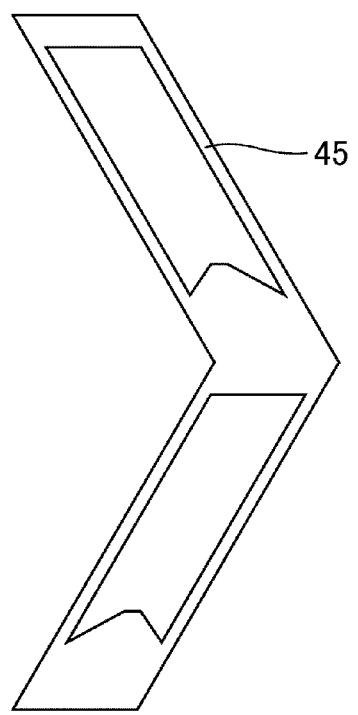
FIG. 83 is a schematic plan view of a BM in the liquid crystal display of Embodiment 3.

FIG. 78 is a schematic plan view that shows the structure of a sub-pixel in a liquid crystal display of Embodiment 3. FIG. 79 is a schematic plan view of source bus lines in the liquid crystal display of Embodiment 3. FIG. 80 is a schematic plan view of pixel electrodes in the liquid crystal display of Embodiment 3. FIG. 81 is a schematic plan view of a first common electrode in the liquid crystal display of Embodiment 3. FIG. 82 is a schematic plan view of a second common electrode in the liquid crystal display of Embodiment 3. FIG. 83 is a schematic plan view of a BM in the liquid crystal display of Embodiment 3.

As shown in FIGS. 78 to 83, in the present embodiment, the sub-pixel 3 is formed in a zigzag pattern in the column direction, and to match this, components such as the source bus lines X, the pixel electrode 21, the first common electrode 31, the second common electrode 41, and the BM 45 are also formed in a zigzag pattern.

In the present embodiment, if a voltage differing from the common electrodes 31 and 41 is applied to the pixel electrode 21, then the liquid crystal molecules rotate in opposite directions among two sub-pixels 3 adjacent to each other up and down. Thus, effects similar to a case in which two domains were formed in one sub-pixel can be attained. In other words, it is possible to mitigate changes in luminance, changes in contrast, and color shift when the display area is viewed diagonally.

Moreover, according to the present embodiment, effects similar to those of Embodiment 1 can be attained.

(Embodiment 4)

The present embodiment is substantially the same as Embodiment 1 except that the structure of each sub-pixel differs. Thus, in the present embodiment, special characteristics thereof will mainly be described, and portions already described in Embodiment 1 will be omitted. In addition, members having the same or similar functions in the present embodiment and Embodiment 1 are assigned the same reference characters, and descriptions of such members are omitted from the present embodiment.

Figure 84:
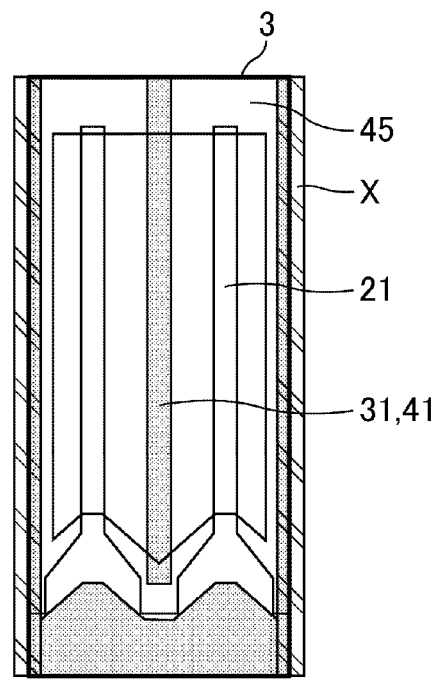
FIG. 84 is a schematic plan view of a pixel structure in a liquid crystal display of Embodiment 4.
Figure 85:
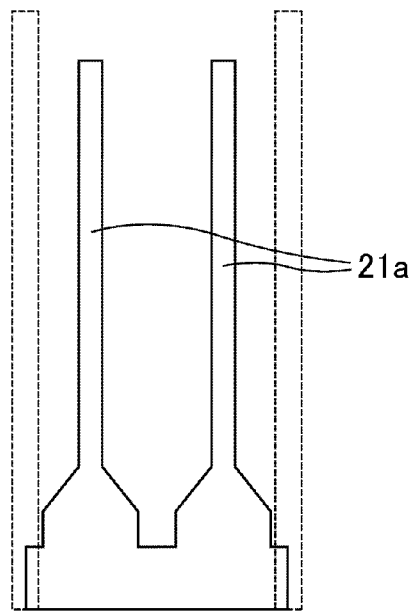
FIG. 85 is a schematic plan view of pixel electrodes in the liquid crystal display of Embodiment 4.
Figure 86:
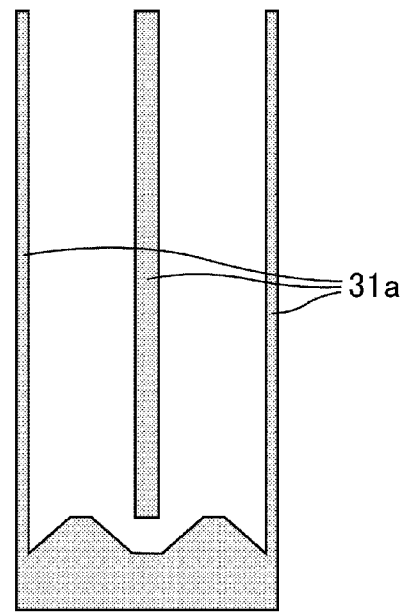
FIG. 86 is a schematic plan view of a first common electrode in the liquid crystal display of Embodiment 4.
Figure 87:
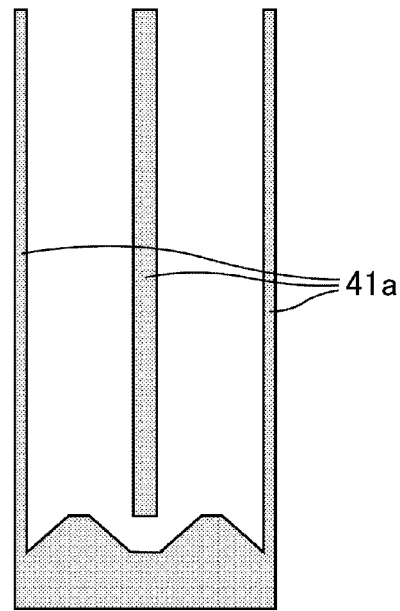
FIG. 87 is a schematic plan view of a second common electrode in the liquid crystal display of Embodiment 4.
Figure 88:
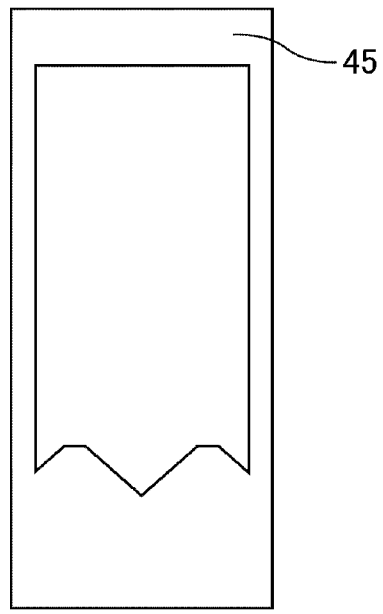
FIG. 88 is a schematic plan view of a BM in the liquid crystal display of Embodiment 4.

FIG. 84 is a schematic plan view of a pixel structure in a liquid crystal display of Embodiment 4. FIG. 85 is a schematic plan view of pixel electrodes in the liquid crystal display of Embodiment 4. FIG. 86 is a schematic plan view of a first common electrode in the liquid crystal display of Embodiment 4. FIG. 87 is a schematic plan view of a second common electrode in the liquid crystal display of Embodiment 4. FIG. 88 is a schematic plan view of a BM in the liquid crystal display of Embodiment 4. The broken lines in FIG. 85 show the source bus lines.

In Embodiments 1 to 3, a structure was described in which all of the linear portions 31a of the first common electrode 31 are disposed over the source bus lines X, and only one linear portion 21a of the pixel electrode 21 is provided per sub-pixel 3, but as shown in FIGS. 84 to 88, in the present embodiment, there are two or more linear portions 21a of the pixel electrode 21 provided per sub-pixel 3. Additionally, one or more linear portions 31a of the first common electrode 31 are added within each sub-pixel 3, and the linear portions 21a and the linear portions 31a are arranged alternately in the row direction. Every other two or more of the linear portions 31a are provided over the source bus lines X. The second common electrode 41 has the same shape and size as the first common electrode 31, and one or more linear portions 41a of the second common electrode 41 are added within each sub-pixel 3. The BM 45 is formed so as to cover linear portions 31a and 41a that face the source bus lines X. On the other hand, linear portions 31a and 41a not disposed over the source bus lines X are not covered by the BM 45.

The linear portions 21a and the linear portions 31a are formed in different conductive layers. In addition, at the boundaries between the sub-pixels 3, the linear portions 31a are formed over the source bus lines X, and thus, there is no need to form the linear portions 31a and the source bus lines X by patterning the same conductive film. Therefore, while the present embodiment poses disadvantages compared to Embodiments 1 to 3, the present embodiment has the advantage of higher resolution compared to typical IPS mode liquid crystal displays.

Furthermore, in the present embodiment, in order to increase resolution, there are typically two to four linear portions 21a for each pixel electrode 21 (preferably two to three), and every one to three linear portions 31a of the first common electrode 31 are provided over the source bus lines (preferably every one to two).

Accordingly, in the present embodiment, other effects described in Embodiment 1 can be attained.

(Embodiment 5)

The present embodiment is substantially the same as Embodiment 1 except that the structure of each sub-pixel differs. Thus, in the present embodiment, special characteristics thereof will mainly be described, and portions already described in Embodiment 1 will be omitted. In addition, members having the same or similar functions in the present embodiment and Embodiment 1 are assigned the same reference characters, and descriptions of such members are omitted from the present embodiment.

Figure 89:
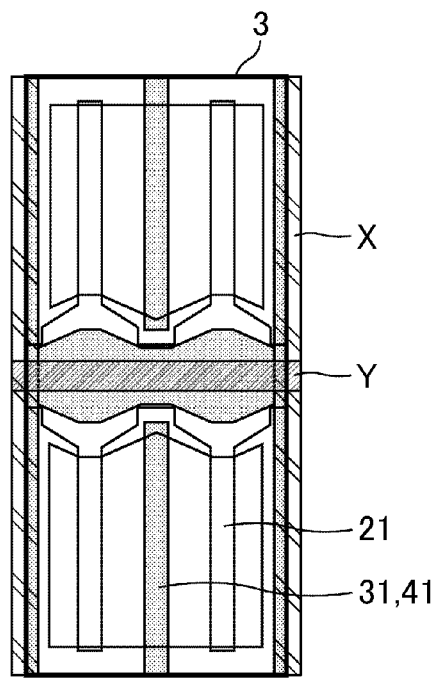
FIG. 89 is a schematic plan view of a pixel structure in a liquid crystal display of Embodiment 5.
Figure 90:
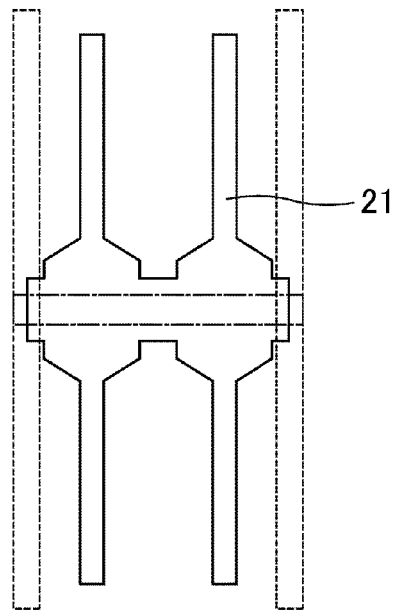
FIG. 90 is a schematic plan view of pixel electrodes in the liquid crystal display of Embodiment 5.
Figure 91:
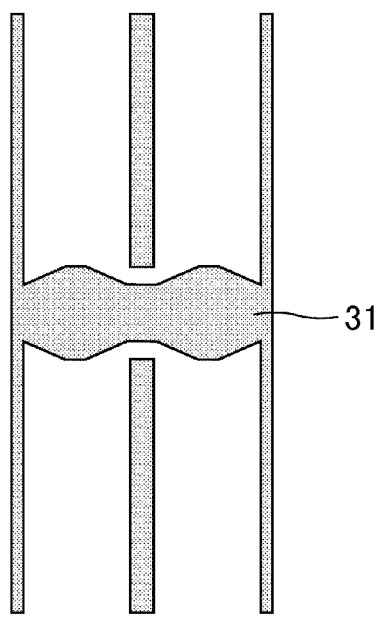
FIG. 91 is a schematic plan view of a first common electrode in the liquid crystal display of Embodiment 5.
Figure 92:
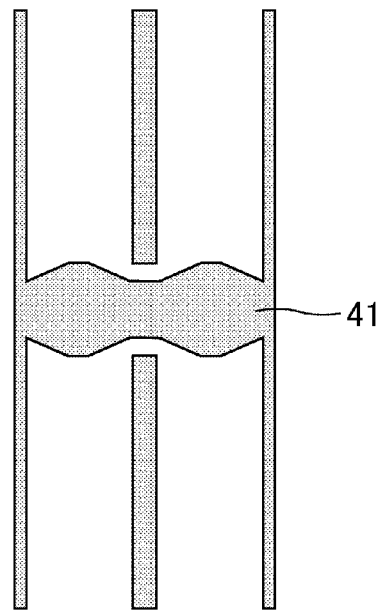
FIG. 92 is a schematic plan view of a second common electrode in the liquid crystal display of Embodiment 5.
Figure 93:
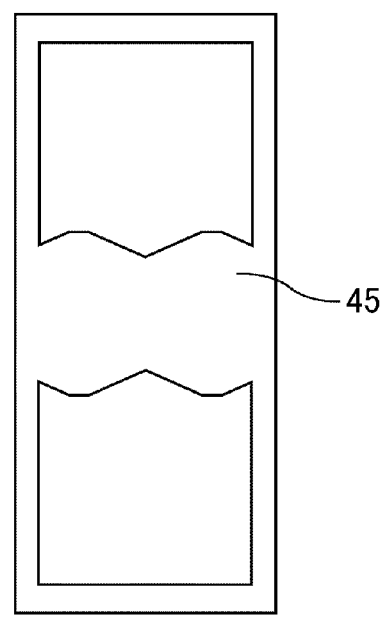
FIG. 93 is a schematic plan view of a BM in the liquid crystal display of Embodiment 5.

FIG. 89 is a schematic plan view of a pixel structure in a liquid crystal display of Embodiment 5. FIG. 90 is a schematic plan view of pixel electrodes in the liquid crystal display of Embodiment 5. FIG. 91 is a schematic plan view of a first common electrode in the liquid crystal display of Embodiment 5. FIG. 92 is a schematic plan view of a second common electrode in the liquid crystal display of Embodiment 5. FIG. 93 is a schematic plan view of a BM in the liquid crystal display of Embodiment 5. In FIG. 90, the broken lines and the one dot chain line respectively represent the source bus lines and the gate bus line.

In Embodiments 1 to 4, in each sub-pixel 3, the pixel electrode 21, the common electrodes 31 and 41, and the BM 45 are formed to be symmetrical left and right but asymmetrical up and down, and thus, there is a possibility that display characteristics differ when viewing the display area from above as compared to viewing the display area from below. By contrast, in the present embodiment, as shown in FIGS. 89 to 93, in each sub-pixel 3, the pixel electrode 21, the common electrodes 31 and 41, and the BM 45 are formed symmetrically both left and right and up and down. Thus, it is possible to mitigate variation in display characteristics between when the display area is viewed from above and when the display area is viewed from below, and it is possible to improve the viewing angle.

Thus, according to the present embodiment, other effects described in Embodiment 1 can be attained.

Furthermore, in Embodiments 1 to 4, a structure was described in which the gate bus line Y is disposed between adjacent sub-pixels 3, but in the present embodiment, the gate bus line Y is arranged to pass through the center of the sub-pixel 3, and the sub-pixel 3 is split into two regions up and down by the gate bus line Y. In addition, the linear portions 21a of the pixel electrode 21 extend from the center of the sub-pixel 3 to these two regions.

(Embodiment 6)

The present embodiment is substantially the same as Embodiment 1 except that the structure of each sub-pixel differs. Thus, in the present embodiment, special characteristics thereof will mainly be described, and portions already described in Embodiment 1 will be omitted. In addition, members having the same or similar functions in the present embodiment and Embodiment 1 are assigned the same reference characters, and descriptions of such members are omitted from the present embodiment.

Figure 94:
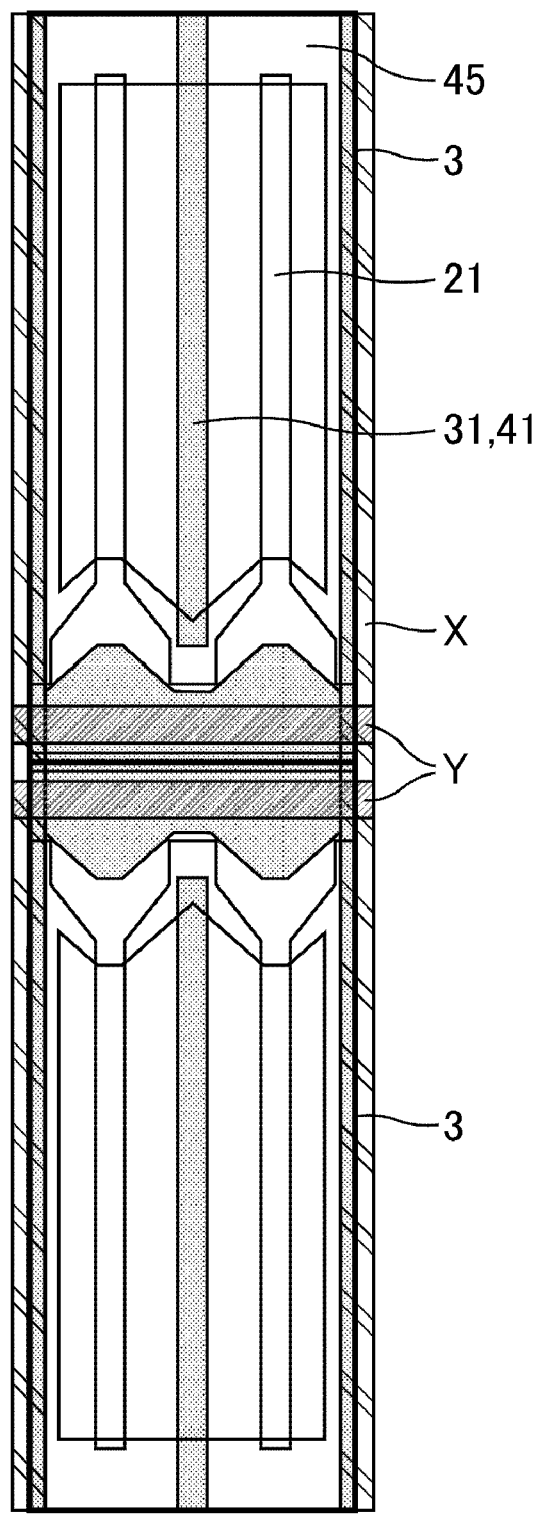
FIG. 94 is a schematic plan view of a pixel structure in a liquid crystal display of Embodiment 6.
Figure 95:
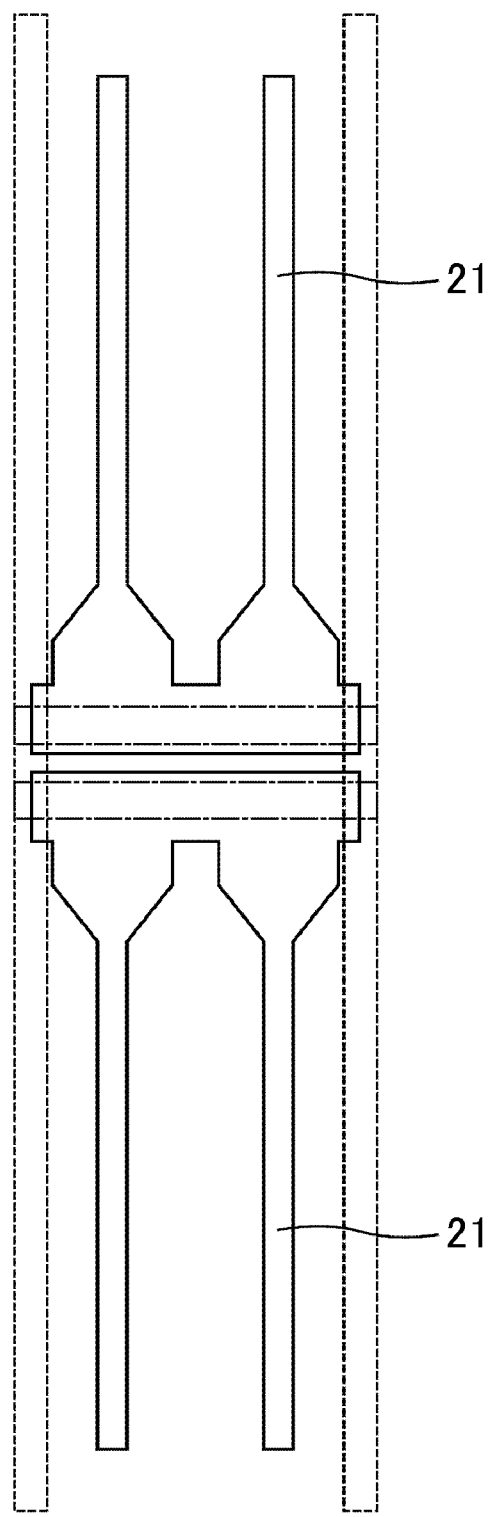
FIG. 95 is a schematic plan view of pixel electrodes in the liquid crystal display of Embodiment 6.
Figure 96:
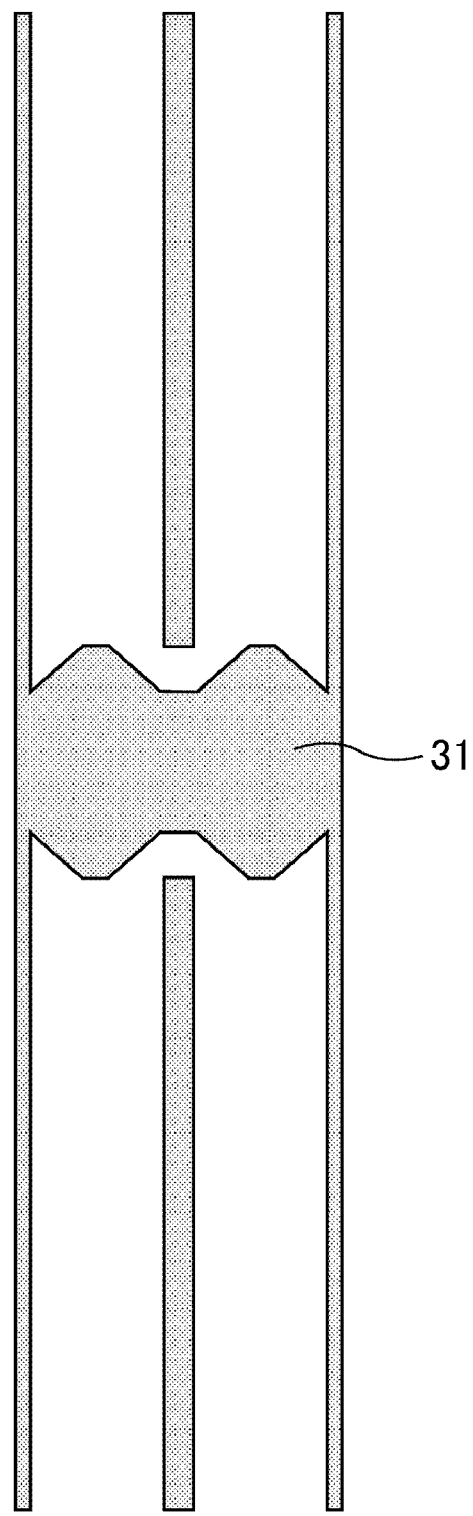
FIG. 96 is a schematic plan view of a first common electrode in the liquid crystal display of Embodiment 6.
Figure 97:
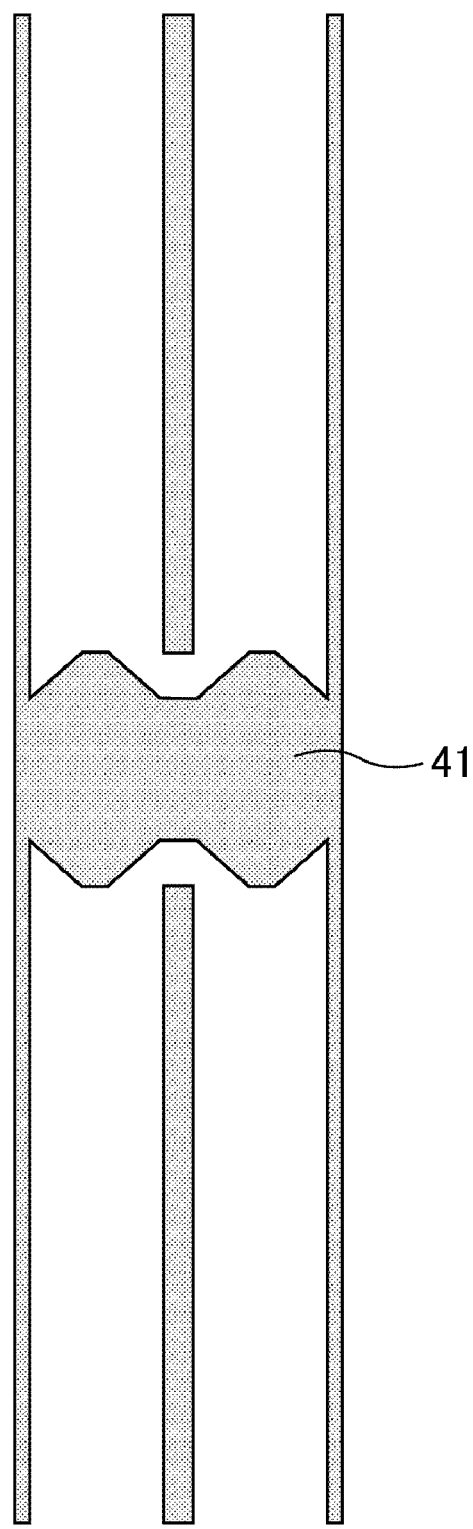
FIG. 97 is a schematic plan view of a second common electrode in the liquid crystal display of Embodiment 6.
Figure 98:
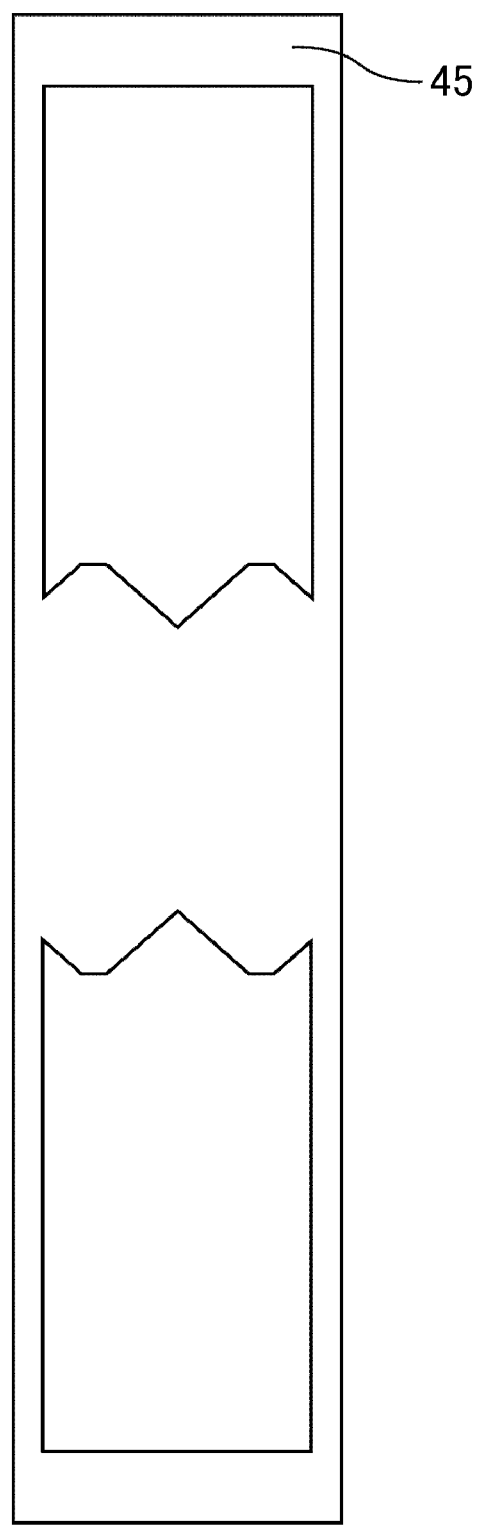
FIG. 98 is a schematic plan view of a BM in the liquid crystal display of Embodiment 6.

FIG. 94 is a schematic plan view of a pixel structure in a liquid crystal display of Embodiment 6. FIG. 95 is a schematic plan view of pixel electrodes in the liquid crystal display of Embodiment 6. FIG. 96 is a schematic plan view of a first common electrode in the liquid crystal display of Embodiment 6. FIG. 97 is a schematic plan view of a second common electrode in the liquid crystal display of Embodiment 6. FIG. 98 is a schematic plan view of a BM in the liquid crystal display of Embodiment 6. In FIG. 95, the broken lines and the one dot chain line respectively represent the source bus lines and the gate bus line.

As shown in FIGS. 94 to 98, in the present embodiment, the pixel electrode 21, the common electrodes 31 and 41, and the BM 45 are formed symmetrically up and down between two sub-pixels 3 adjacent to each other up and down. Thus, similar to Embodiment 5, it is possible to mitigate variation in display characteristics between when the display area is viewed from above and when the display area is viewed from below, and it is possible to improve the viewing angle.

Thus, according to the present embodiment, other effects described in Embodiment 1 can be attained.

Hence, like Embodiments 1 to 5, within each sub-pixel 3, the pixel electrode 21, the common electrodes 31 and 41, and the BM 45 are formed to be symmetrical left and right in the present embodiment.

As described above, in Embodiments 1 to 6, the so-called top gate TFTs were described in which the semiconductor layer is disposed between the insulating substrate and the gate electrode, and the source electrode and the drain electrode are disposed above the gate electrode across the interlayer insulating film, but in the respective embodiments, there are no special limitations on the type of TFT, which can be selected as appropriate. TFTs of the so-called bottom gate type in which the gate electrode is disposed between the insulating substrate and the semiconductor layer may be used, for example.

In Embodiments 1 to 6, a structure was described in which the linear portions of the pixel electrodes and the linear portions of the first common electrode are arranged at substantially even intervals, but the linear portions need not be arranged at even intervals. For example, if the gaps the linear portion of each pixel electrode and the linear portions of the first common electrode to the left and right thereof are respectively S1 and S2, then S1:S2 may be 1:2.

In Embodiments 1 to 6, a structure was described in which the linear portions of the pixel electrodes and the linear portions of the first common electrode are arranged in parallel with each other, but the linear portions need not be arranged in parallel. The linear portions of the respective pixel electrodes may have bends and/or curves, and may be formed in a V shape rotated 90°, for example. The linear portions of the first and second common electrodes may have bends and/or curves, and may be formed in a V shape rotated 90°, for example. However, it is preferable that the angle formed between the lengthwise direction of the linear portion of each pixel electrode and the lengthwise direction of the linear portions of the first common electrode to the left and right thereof be 0° to 20° inclusive, and it is even more preferable that the maximum angle be 10°.

Furthermore, in Embodiments 1 to 6, a vertically long sub-pixel was described in which the linear portion of the pixel electrode and the linear portions of the first and second common electrodes are parallel to the source bus lines, but each sub-pixel may be horizontally long with the linear portions being parallel to the gate bus line instead of the source bus line. In this manner, the linear portions of the first common electrode may all be arranged on the gate bus lines or every other two or more of such linear portions may be arranged on the gate bus lines. The linear portion of the pixel electrode and the linear portions of the first and second common electrodes may be parallel to the row direction or column direction.

The liquid crystal display of Embodiments 1 to 6 may be a monochromatic liquid crystal display, and each pixel need not be divided into a plurality of sub-pixels.

Furthermore, in Embodiments 1 to 6, a transmissive liquid crystal display was described, but the liquid crystal panel of each liquid crystal display may be provided with a reflective display unit that displays images by reflecting external light.

The respective embodiments mentioned above may be appropriately combined within a scope that does not depart from the gist of the present invention. In addition, modification examples of the respective embodiments may be combined with other embodiments.

Figure 99:
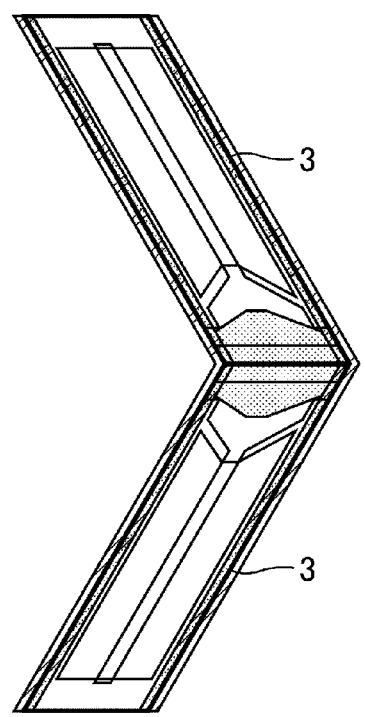
FIG. 99 is a schematic plan view of a pixel structure in a liquid crystal display of an embodiment formed by combining Embodiments 3 and 6.
Figure 100:
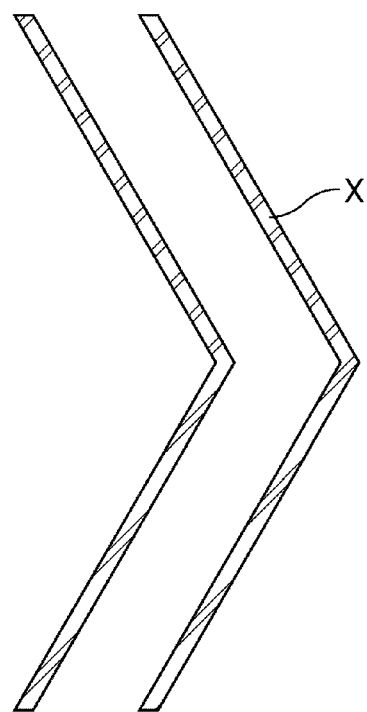
FIG. 100 is a schematic plan view of source bus lines in the liquid crystal display of the embodiment formed by combining Embodiments 3 and 6.
Figure 101:
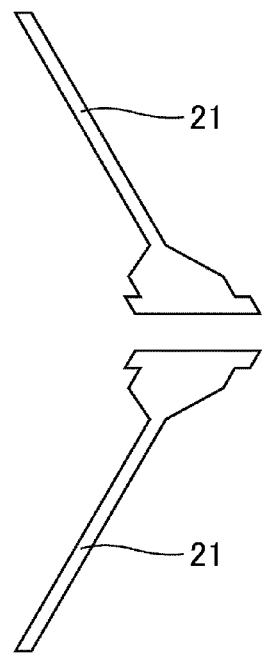
FIG. 101 is a schematic plan view of pixel electrodes in a liquid crystal display of the embodiment formed by combining Embodiments 3 and 6.
Figure 102:
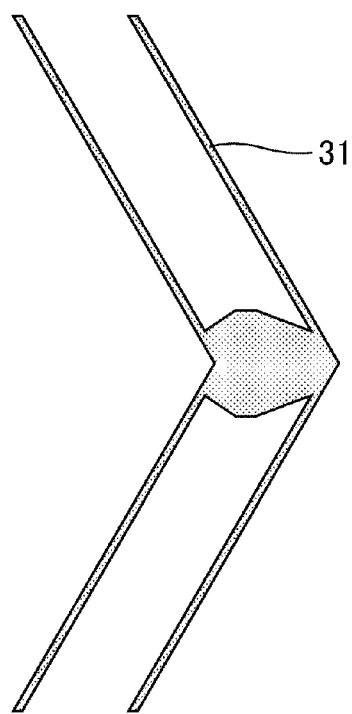
FIG. 102 is a schematic plan view of a first common electrode in the liquid crystal display of the embodiment formed by combining Embodiments 3 and 6.
Figure 103:
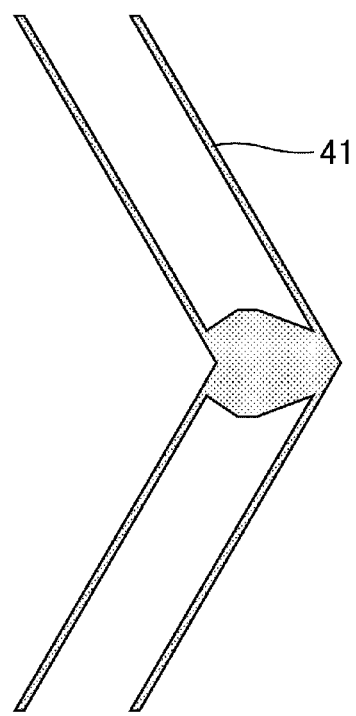
FIG. 103 is a schematic plan view of a second common electrode in the liquid crystal display of the embodiment formed by combining Embodiments 3 and 6.
Figure 104:
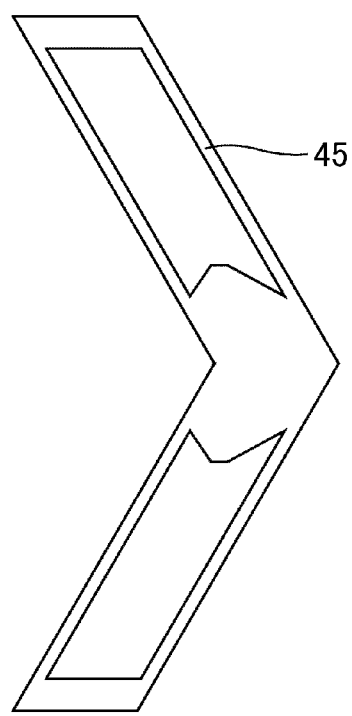
FIG. 104 is a schematic plan view of a BM in the liquid crystal display of the embodiment formed by combining Embodiments 3 and 6.

For example, Embodiment 3 may be combined with Embodiment 6. FIG. 99 is a schematic plan view of a pixel structure in a liquid crystal display of an embodiment formed by combining Embodiments 3 and 6. FIG. 100 is a schematic plan view of source bus lines in the liquid crystal display of the embodiment formed by combining Embodiments 3 and 6. FIG. 101 is a schematic plan view of pixel electrodes in a liquid crystal display of the embodiment formed by combining Embodiments 3 and 6. FIG. 102 is a schematic plan view of a first common electrode in the liquid crystal display of the embodiment formed by combining Embodiments 3 and 6. FIG. 103 is a schematic plan view of a second common electrode in the liquid crystal display of the embodiment formed by combining Embodiments 3 and 6. FIG. 104 is a schematic plan view of a BM in the liquid crystal display of the embodiment formed by combining Embodiments 3 and 6.

As shown in FIGS. 99 to 104, in the present embodiment, the sub-pixels 3 are arranged in a zigzag pattern in the column direction, and furthermore, the pixel electrode 21, the common electrodes 31 and 41, and the BM 45 are formed symmetrically up and down between two sub-pixels 3 adjacent to each other up and down. Thus, according to the present embodiment, effects similar to Embodiment 3 and effects similar to Embodiment 6 can be attained.

DESCRIPTION OF REFERENCE CHARACTERS 1 liquid crystal panel
2 display area
3 sub-pixel
4 liquid crystal capacitor
5, 5a, 5b, 5c storage capacitor (pixel auxiliary capacitor)
6 gate driver
7 source driver
8 controller
9 driver circuit region
10 array substrate
11 insulating substrate
12 base insulating film
14 thin film transistor (TFT)
15, 16 gate electrode
17 gate insulating film
18 semiconductor layer
19 source electrode
20 drain electrode
21 pixel electrode
21a linear portion
21b connecting portion
25, 26, 27 interlayer insulating film
28 first edge portion
29 second edge portion
31 first common electrode
31a linear portion
31b connecting portion
31c, 31d, 31e capacitance electrode portion
34, 35, 36, 37 contact hole
38, 39 opening region
40 opposite substrate
41 second common electrode
41a linear portion
41b connecting portion
44 insulating substrate
45 black matrix (BM)
46 color filter
47 overcoat film
50 liquid crystal layer
51 first alignment film
52 second alignment film
53, 54 optical element
55 backlight unit
56 transmittance axis of polarizing plate
58, 59 rubbing direction
60, 61 pretilt direction of liquid crystal molecules
X source bus line
Y gate bus line

What is claimed is:
1. A liquid crystal display having a plurality of pixels arranged in a matrix, comprising:
a first substrate;
a second substrate facing the first substrate; and
a horizontal orientation-type liquid crystal layer sandwiched between the first substrate and the second substrate,
wherein the first substrate includes a plurality of source bus lines, a plurality of gate bus lines intersecting with the plurality of source bus lines, pixel electrodes, a first common electrode, a first interlayer insulating film provided on the plurality of source bus lines, and a second interlayer insulating film provided on the first interlayer insulating film, wherein the first common electrode includes a plurality of first linear portions having a linear shape, wherein the pixel electrodes each include one or more second linear portions having a linear shape, wherein the plurality of first linear portions of the first common electrode and the one or more second linear portions of the pixel electrodes are arranged alternately, wherein all or every other two or more of the plurality of first linear portions of the first common electrode are arranged on and along the plurality of source bus lines or the plurality of gate bus lines, wherein the plurality of first linear portions of the first common electrode are provided either between the first and second interlayer insulating films or on the second interlayer insulating film, wherein the one or more second linear portions of the pixel electrodes are transparent and provided on the second interlayer insulating film or between the first and second interlayer insulating film in which the plurality of first linear portions of the first common electrodes are absent, wherein the pixel electrodes are provided between the first and second interlayer insulating films, wherein the first common electrode is provided on the second interlayer insulating film, wherein the first common electrode includes a first connecting portion connected to the plurality of first linear portions, wherein each of the pixel electrodes includes a second connecting portion connected to one edge portion of the one or more second linear portions, wherein the first connecting portion overlaps a portion of the second connecting portion across the second interlayer insulating film, wherein the array substrate includes one or more first regions and one or more second regions, wherein the one or more first regions are each a region between the second linear portions and the first linear portions adjacent to each other, and are each located to one side of the second linear portions, wherein the one or more second regions are each a region between the second linear portions and the first linear portions adjacent to each other, and are each located to another side of the second linear portions, wherein the second connecting portions have one or more first edge portions respectively facing the one or more first regions, and one or more second edge portions respectively facing the one or more second regions, and wherein the first connecting portion is arranged in a position recessed from the one or more first edge portions and the one or more second edge portions.

2. The liquid crystal display according to claim 1, wherein an angle θ1 between each of the one or more first edge portions and the second linear portion immediately adjacent thereto is greater than 90°, and wherein an angle θ2 between each of the one or more second edge portions and the second linear portion immediately adjacent thereto is greater than 90°.

3. The liquid crystal display according to claim 1, wherein the array substrate includes thin film transistors having source electrodes and drain electrodes, wherein the first interlayer insulating film includes a photosensitive resin film having openings formed therein, and wherein the pixel electrodes are respectively connected electrically to the drain electrodes through the openings.

4. The liquid crystal display according to claim 1, wherein a width of each of the one or more second linear portions is 1 μm or greater.

5. The liquid crystal display according to claim 1, wherein a width of each of the one or more second linear portions is 2 μm or less.

6. The liquid crystal display according to claim 1,
wherein all of the plurality of first linear portions are arranged on the plurality of source bus lines or the plurality of gate bus lines, and
wherein the pixel electrodes include only one of said second linear portions between two adjacent said first linear portions.

7. The liquid crystal display according to claim 1, wherein the liquid crystal layer contains liquid crystal molecules having negative dielectric anisotropy.

8. The liquid crystal display according to claim 7, wherein an angle formed between a long axis direction of the liquid crystal molecules in a plan view when no voltage is being applied and a lengthwise direction of each of the one or more second linear portions is 60° to 80° inclusive.

9. The liquid crystal display according to claim 1,
wherein the second substrate includes a second common electrode,
wherein the second common electrode includes a plurality of third linear portions having a linear shape, and
wherein the plurality of third linear portions face the plurality of first linear portions.

10. The liquid crystal display according to claim 9, wherein a main surface of the second substrate opposite to a surface facing the liquid crystal layer does not include a shield electrode.

11. A liquid crystal display having a plurality of pixels arranged in a matrix, comprising:
a first substrate;
a second substrate facing the first substrate; and
a horizontal orientation-type liquid crystal layer sandwiched between the first substrate and the second substrate,
wherein the first substrate includes a plurality of source bus lines, a plurality of gate bus lines intersecting with the plurality of source bus lines, pixel electrodes, a first common electrode, a first interlayer insulating film provided on the plurality of source bus lines, and a second interlayer insulating film provided on the first interlayer insulating film,
wherein the first common electrode includes a plurality of first linear portions having a linear shape,
wherein the pixel electrodes each include one or more second linear portions having a linear shape,
wherein the plurality of first linear portions of the first common electrode and the one or more second linear portions of the pixel electrodes are arranged alternately,
wherein all or every other two or more of the plurality of first linear portions of the first common electrode are arranged on and along the plurality of source bus lines or the plurality of gate bus lines,
wherein the plurality of first linear portions of the first common electrode are provided either between the first and second interlayer insulating films or on the second interlayer insulating film,
wherein the one or more second linear portions of the pixel electrodes are transparent and provided on the second interlayer insulating film or between the first and second interlayer insulating film in which the plurality of first linear portions of the first common electrodes are absent, wherein the pixel electrodes are provided on the second interlayer insulating film, wherein the first common electrode is provided between the first and second interlayer insulating films, wherein the first common electrode includes one or more capacitance electrode portions having a linear shape, and wherein the one or more capacitance electrode portions are each arranged to be parallel to and below the second linear portion corresponding thereto.

12. The liquid crystal display according to claim 11, wherein the one or more capacitance electrode portions are each arranged so as not to protrude from under the corresponding second linear portion in a plan view.

13. The liquid crystal display according to claim 11,
wherein all of the plurality of first linear portions are arranged on the plurality of source bus lines or the plurality of gate bus lines, and
wherein the pixel electrodes include only one of said second linear portions between two adjacent said first linear portions.

14. The liquid crystal display according to claim 11, wherein the liquid crystal layer contains liquid crystal molecules having negative dielectric anisotropy.

15. The liquid crystal display according to claim 14, wherein an angle formed between a long axis direction of the liquid crystal molecules in a plan view when no voltage is being applied and a lengthwise direction of each of the one or more second linear portions is 60° to 80° inclusive.

16. The liquid crystal display according to claim 11,
wherein the second substrate includes a second common electrode,
wherein the second common electrode includes a plurality of third linear portions having a linear shape, and
wherein the plurality of third linear portions face the plurality of first linear portions.

17. The liquid crystal display according to claim 16, wherein a main surface of the second substrate opposite to a surface facing the liquid crystal layer does not include a shield electrode.

* * * * *